United States Patent [19]
Egawa et al.

[11] Patent Number: 5,481,323
[45] Date of Patent: Jan. 2, 1996

[54] CAMERA USING FILM WITH MAGNETIC STORAGE SECTION

[75] Inventors: Akira Egawa, Kawasaki; Chikara Aoshima, Zama, both of Japan

[73] Assignee: Canon Kabushiki Kaisha, Tokyo, Japan

[21] Appl. No.: 231,784

[22] Filed: Apr. 25, 1994

Related U.S. Application Data

[63] Continuation of Ser. No. 757,074, Sep. 9, 1991, abandoned, which is a continuation-in-part of Ser. No. 736,569, Jul. 26, 1991, abandoned.

[30] Foreign Application Priority Data

| Jul. 27, 1990 | [JP] | Japan | 2-200572 |
| Sep. 7, 1990 | [JP] | Japan | 2-235589 |
| Mar. 29, 1991 | [JP] | Japan | 3-089128 |
| Mar. 29, 1991 | [JP] | Japan | 3-089129 |

[51] Int. Cl.$^6$ ........................ G03B 17/24
[52] U.S. Cl. ........................ 354/106; 354/173.11
[58] Field of Search ........................ 354/21, 75, 105, 354/106, 173.1, 173.11, 218

[56] References Cited

U.S. PATENT DOCUMENTS

| 4,834,306 | 5/1989 | Robertson et al. | 242/71.1 |
| 4,864,332 | 9/1989 | Harvey | 354/21 |
| 4,933,780 | 6/1990 | Wash et al. | 358/909 |
| 4,963,985 | 10/1990 | Isoguchi et al. | 358/909 |

*Primary Examiner*—David M. Gray
*Attorney, Agent, or Firm*—Fitzpatrick, Cella, Harper & Scinto

[57] ABSTRACT

A camera using a film with a magnetic storage section comprises a feed unit for feeding the film, a working unit for writing or reading data to or from the magnetic storage section of the film during feeding of the film by the feed unit, and a control unit for controlling, the working unit after the feed speed of the film being fed by the feed unit has become stable.

33 Claims, 45 Drawing Sheets

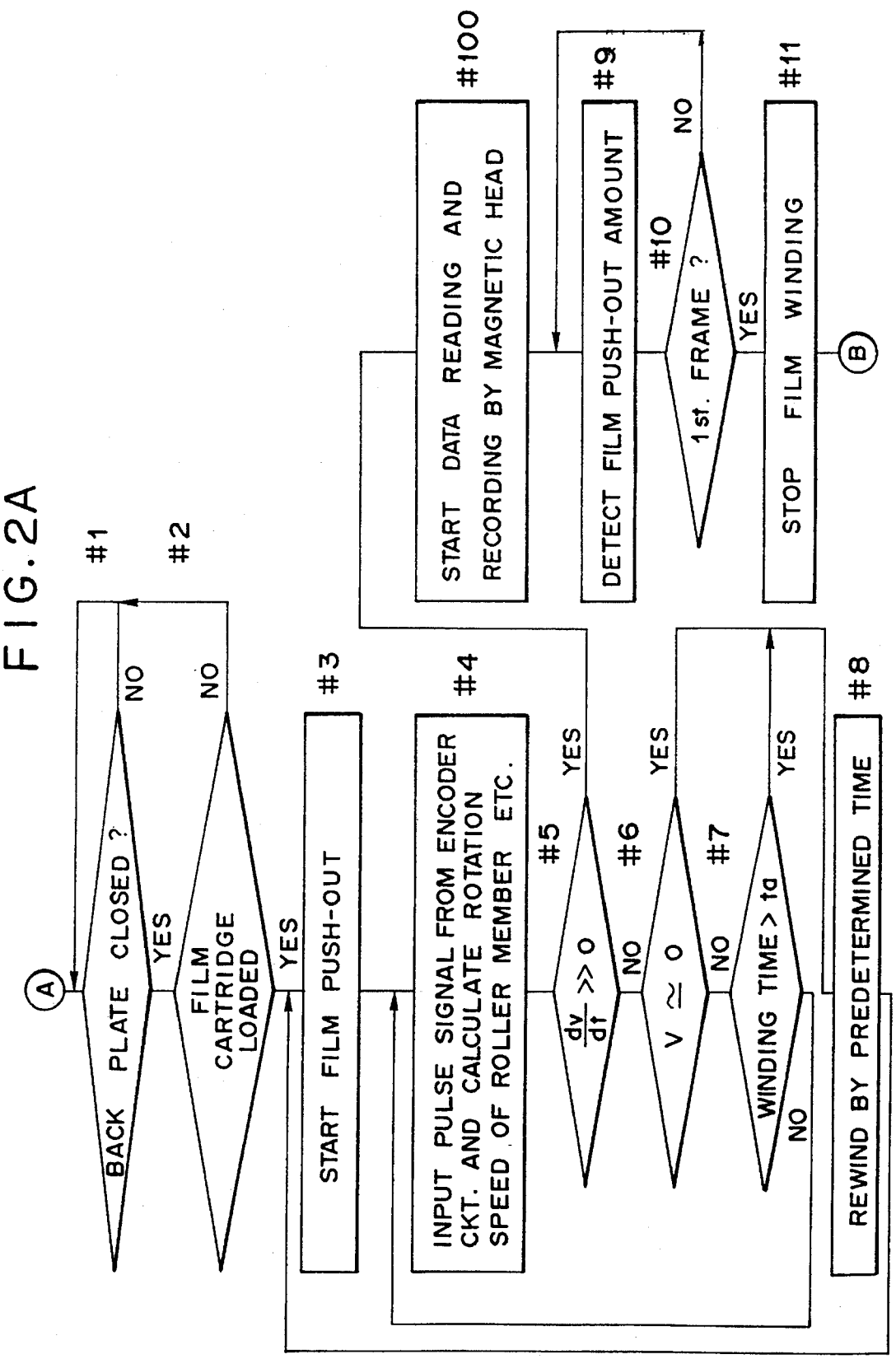

F I G. 37
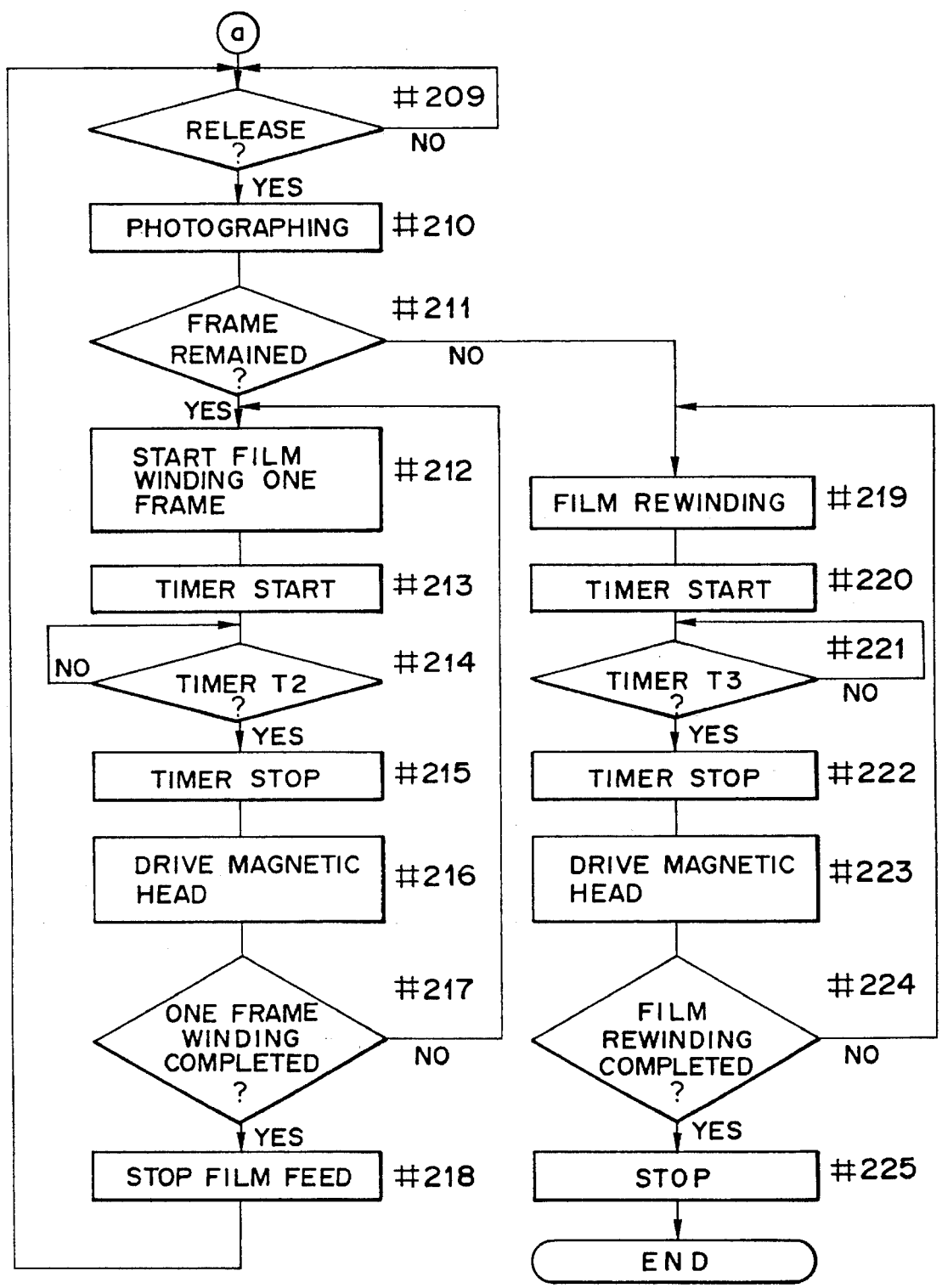

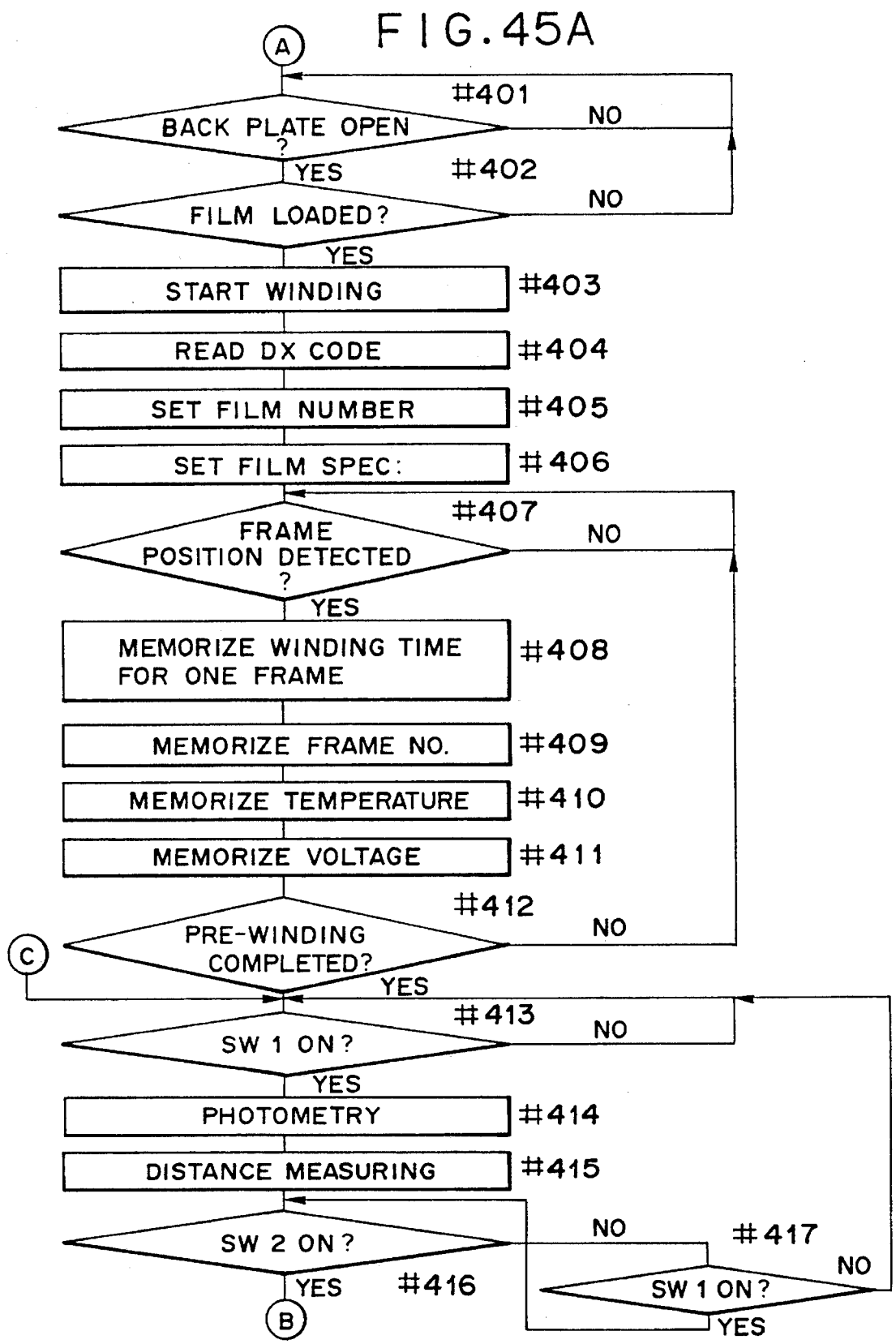

CAMERA USING FILM WITH MAGNETIC STORAGE SECTION

This application is a continuation of prior application Ser. No. 07/757,074 filed on Sep. 9, 1991, now abandoned, which is a continuation-in-part of prior application Ser. No. 07/736,569, filed Jul. 26, 1991 abandoned.

BACKGROUND OF THE INVENTION

1. Field of the Invention

The present invention relates to a camera which uses a film provided with a magnetic storage section in which data can be written or from which data is read.

2. Description of the Related Art

In conventional film feeders of cameras, a film is loaded in a camera by driving a sprocket or a film winding spool of the camera in the state wherein the tip-end (so-called leader portion) of the film projected from a film cartridge is engaged with the sprocket or the film winding spool of the camera. However, this type of film feeder has the fault that the user must perform the troublesome operation of setting the tip-end of a film, and if the film tip-end is placed at a wrong position, the film is loaded wrong. The film feeder also has the fault that if the film tip-end is carelessly pulled, the film is made unusable due to an unwanted exposure.

Thus U.S. Pat. No. 4,834,306 has recently proposed a new type of film cartridge that includes the following:

A film cartridge comprising a film passing slit, a film which has an end fixed to a supply spool and which is wound on the supply spool, a pressure member which is coaxially disposed on the supply spool and which has a regulation section for regulating the radial expansion of the film winding so as to prevent the outermost periphery of the film winding from substantially contacting with the innner wall of the film cartridge, a release section for partially deforming the pressure member so as to continuously release the outermost periphery of the film winding from the radial regulation by the pressure member, and a guide section for guiding the portion of the film which is released from the regulation to the film passing slit. The film winding is outwardly expanded due to the loosening of the film caused by the rotation of the supply spool in the direction of film push-out so that the pressure member does not slip on the outer periphery of the film winding, whereby the film can be pushed out of the film cartridge by applying driving force to the film in the direction of push-out. This type of film cartridge in which the film can be discharged by rotation of the supply spool is referred to as "push-out type film cartridge" hereinafter.

FIGS. 24 to 26 show such a push-out type film cartridge, in which FIG. 24 is a longitudinally sectional view, FIG. 25 is a cross-sectional view and FIG. 26 is a side view of a principal portion.

In the drawings, reference numeral 301 denotes a film; reference numeral 302, a push-out type film cartridge; reference numeral 303, a film passing slit; reference numeral 304, a supply spool; reference numeral 304a, a fixing section for fixing one end of the film 301; reference numeral 305, a pressure member; reference numeral 305a, a regulation section; reference numeral 306, a release section; and reference numeral 307, a guide section.

The use of the push-out type film cartridge 302 enables the realization of a configuration in which, after the film has been loaded in a camera, the film 301 is discharged and pushed out by rotating the supply spool 304 in the cartridge 302 using a fork until the film is wound on a film winding spool of the camera, and the film 301 is then pushed out by the film winding spool. Since there is no need for the user to contact the tip-end of the film 301, this type eliminates several of the faults of conventional cartridges.

A film provided with a magnetic storage section in which data can be written or from which data can be read by using a magnetic head in synchronism with the feeding of the film has recently been proposed as a film which can be received in the above-described type of film cartridge. For example, U.S. Pat. No. 4,864,332 disclose 8 a camera in which photographic data such as a shutter time by second, a diaphragm value, a date, a title and so on are written in the magnetic storage section, and the film sensitivity and the like, which are previously written therein, are read from the storage section by using a magnetic head.

However, a camera which uses the above push-out type film cartridge has the following inconvenience:

Although the feed speed of the film is low and stable until the tip-end of the film is wound on the film take-up spool of a camera after the film has been pushed out of the cartridge, the feed speed of the film abruptly increases after the tip-end of the film has been wound on the take-up spool. This causes erroneous operation if an attempt is made to write data in or read data from the magnetic storage section of the film in synchronism with the film feeding during the film feeding operation.

SUMMARY OF THE INVENTION

The present invention has been achieved in consideration of the above situation, and it is an object of the present invention to provide a camera which uses a film with a magnetic storage section comprising feed means for feeding the film, working means for writing data in or reading data from the magnetic storage section of the film during the feed of the film by the feed means, and control means for operating the working means after the speed of the film feed by the feed means becomes stable, so that data can be correctly written in or read from the magnetic storage section of the film.

Other objects of the present invention will be made clear by the embodiments described below.

BRIEF DESCRIPTION OF THE DRAWINGS

FIGS. 2A and 2B are flow charts showing the operation of the first embodiment;

FIG. 37 is a flow chart showing the operation continued from FIG. 36;

FIGS. 45A and 45B are flow charts showing the operation of the microcomputer shown in FIG. 43;

DETAILED DESCRIPTION OF THE PREFERRED EMBODIMENTS

An embodiment of the present invention is described in detail below with reference to the drawings.

Figure 11:
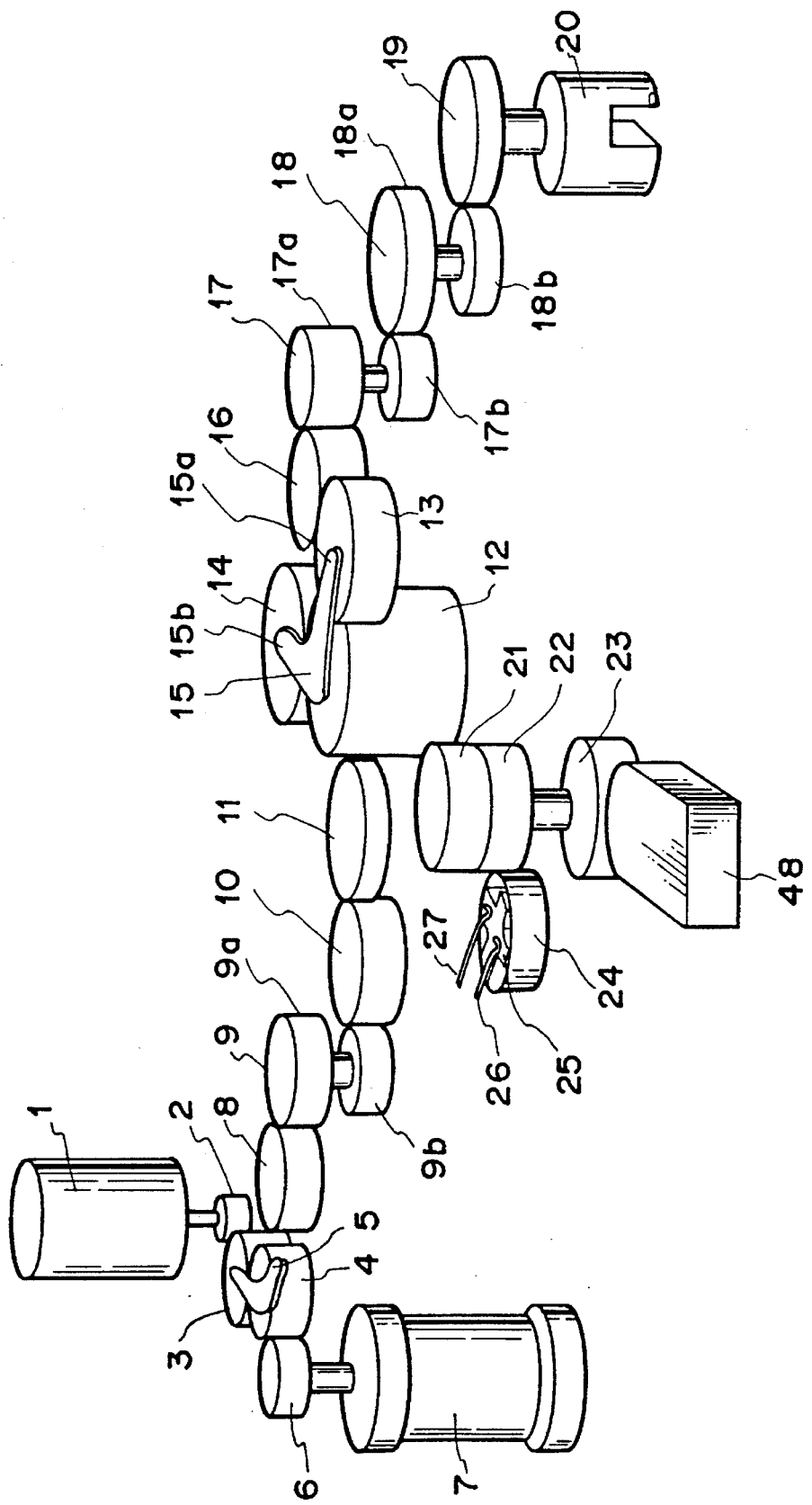
FIG. 11 is a perspective view of the film feed mechanism used in an embodiment of the present invention.
Figure 12:
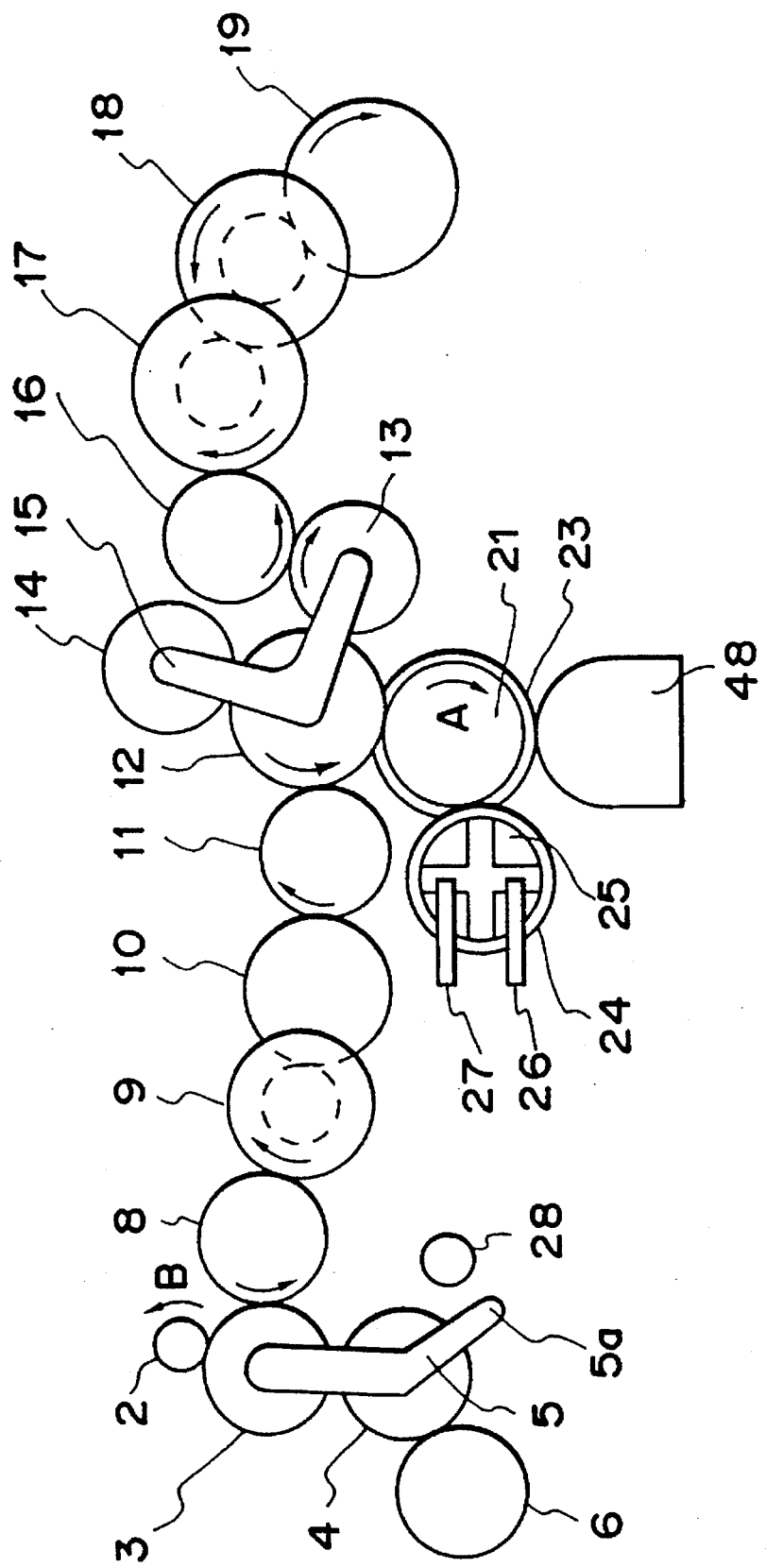
FIG. 12 is a plan view showing the gear train during winding of a film in the same film feed mechanism.
Figure 13:
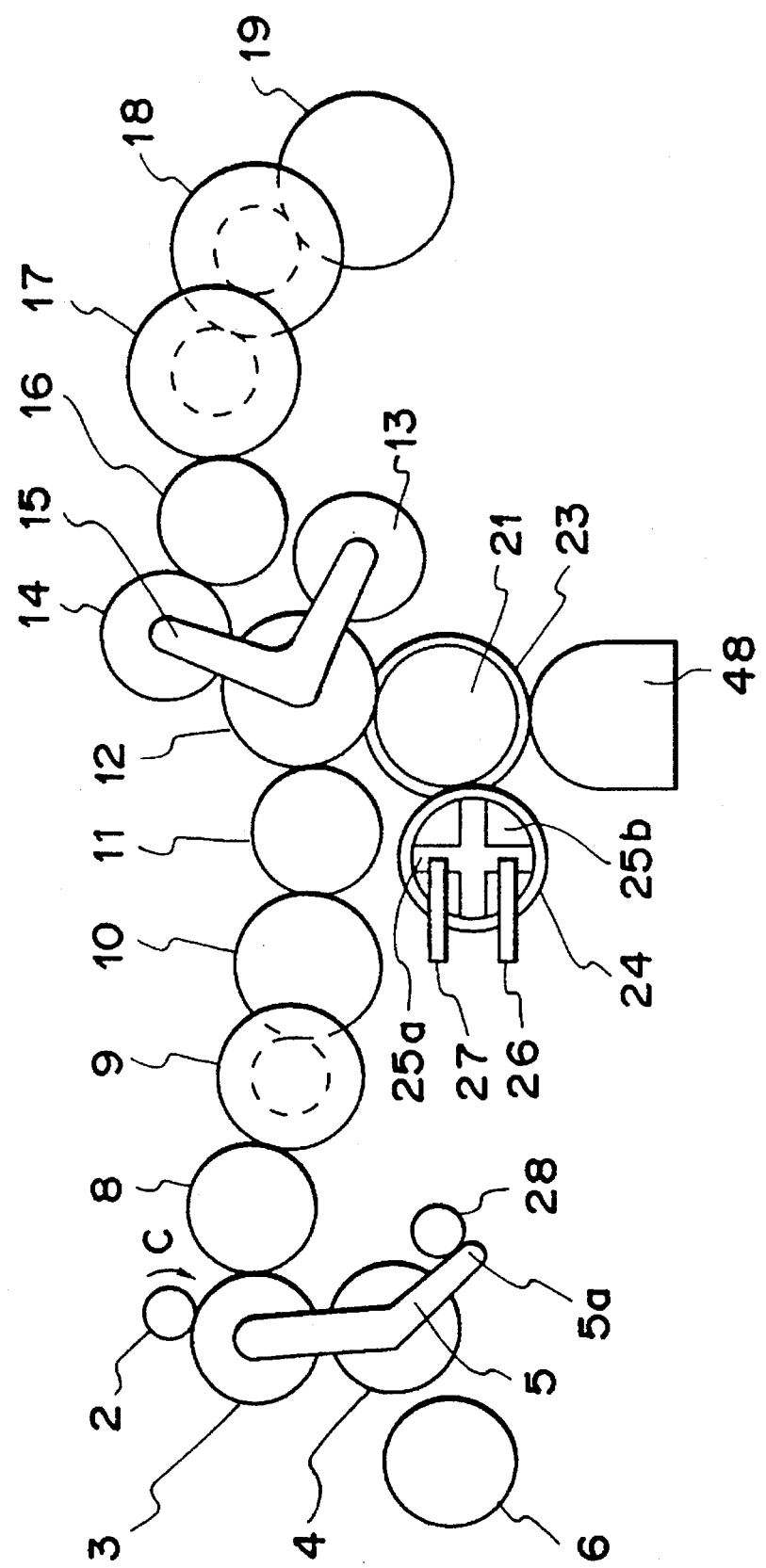
FIG. 13 is a plan view showing the gear train during rewinding of a film in the same film feed mechanism.
Figure 14:
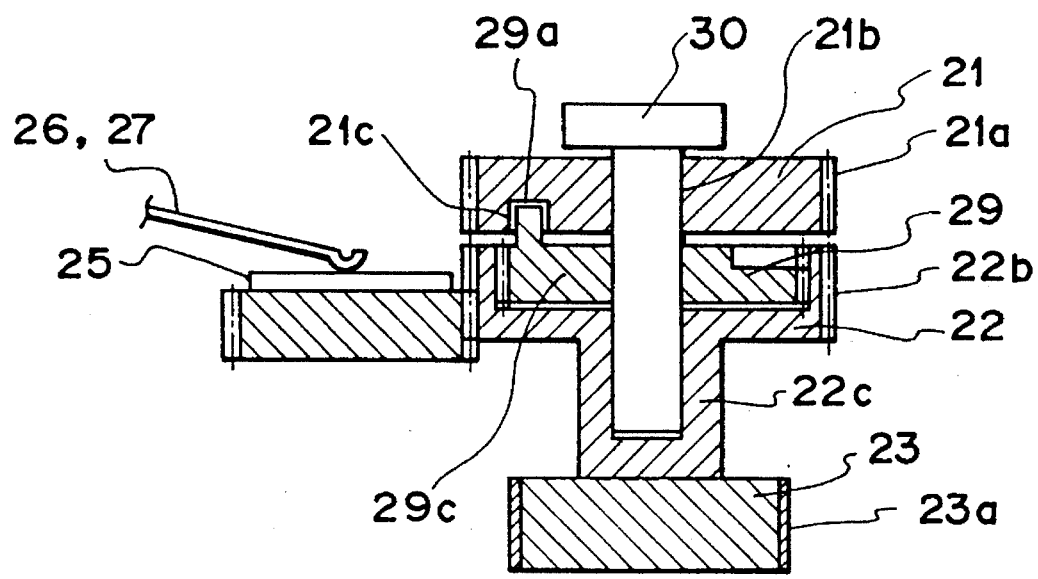
FIG. 14 is a longitudinally sectional view showing the one-way clutch mechanism shown in FIG. 11.
Figure 15:
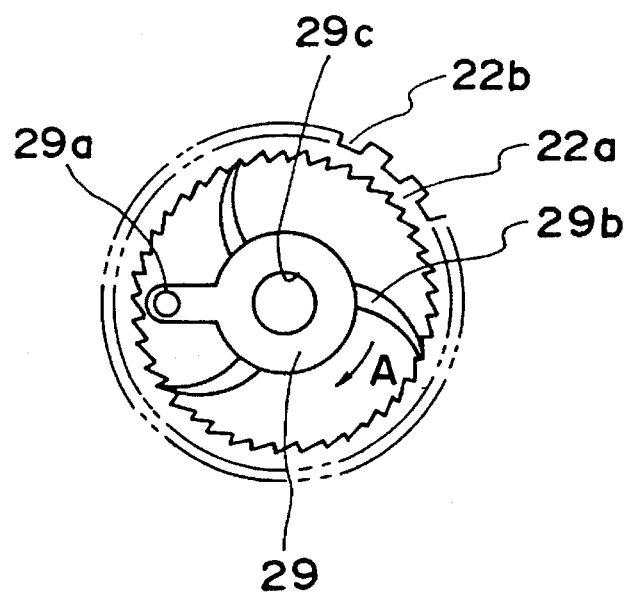
FIG. 15 is a plan view showing the basic arrangement of the one-way clutch mechanism shown in FIG. 11.
Figure 16:
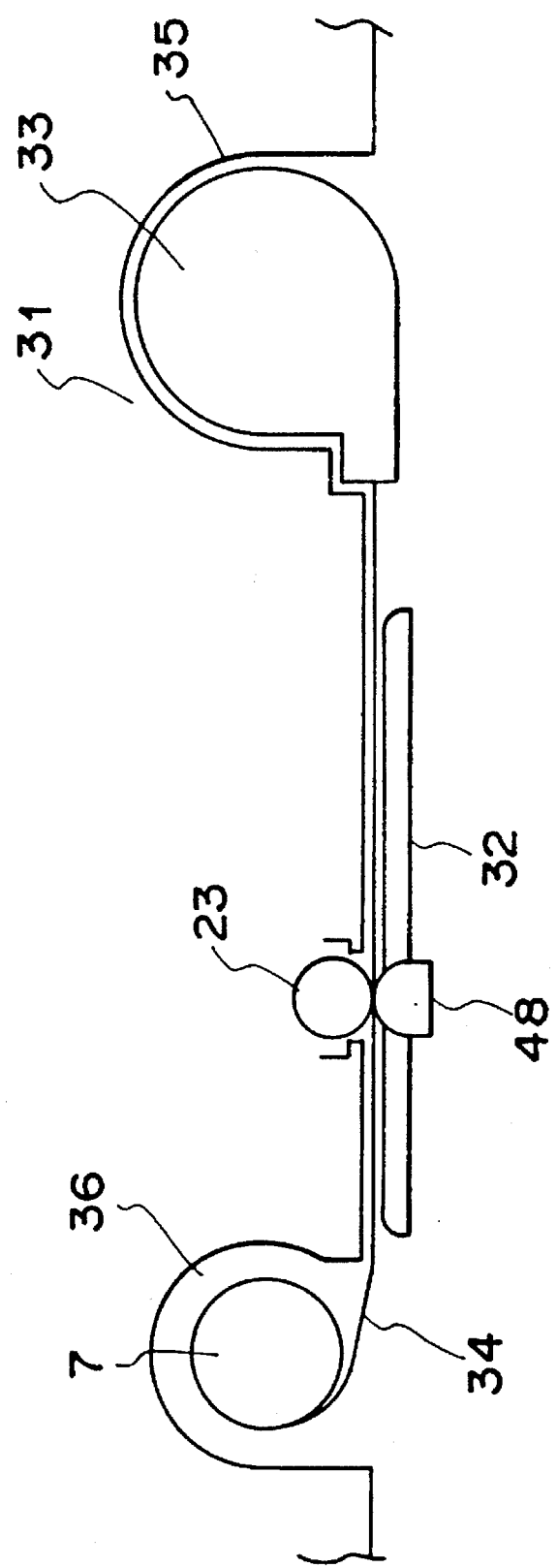
FIG. 16 is a cross-sectional view showing the arrangement of a principal portion of a camera in accordance with an embodiment of the present invention.

FIGS. 11 to 16 are drawings showing the mechanical arrangement in accordance with an embodiment of the present invention, in which FIG. 11 is a perspective view of a film feed mechanism, FIG. 12 is a plan view of a gear train during winding of a film, FIG. 13 is a plan view of a gear train during rewinding of a film, FIG. 14 is a longitudinally sectional view of a one-way clutch portion, FIG. 15 is a cross-sectional view of the same portion, and FIG. 16 is a cross-sectional view of a principal portion of a camera.

In these drawings, reference numeral 1 denotes a film driving motor which is rotated in a normal direction (the direction of an arrow B in FIG. 12) during winding of the film and in a reverse direction (the direction of an arrow C in FIG. 13) during rewinding of the film. Reference numeral 2 denotes a pinion gear fixed to the rotational shaft of the motor 1; reference numeral 3, a first sun gear which is engaged with the pinion gear 2; and reference numeral 4, a first planetary gear which is engaged with the first sun gear 3. Reference numeral 5 denotes a first connecting lever for connecting the first sun gear 3 and the first planetary gear 4 and rotatably holding the first planetary gear 4 while generating frictional force between the first planetary gear 4 and the connecting lever 5 so that the first planetary gear 4 is revolved around the first sun gear 3 serving as the center of revolution by rotation of the first sun gear 3. The first sun gear 3, the first planetary gear 4 and the first connecting lever 5 form a known planetary gear mechanism.

Reference numeral 6 denotes a spool gear which is engaged with the first planetary gear 4 only when the film driving motor 1 is rotated in the normal direction. Reference numeral 7 denotes a film take-up spool fixed to the spool gear 6 so as to be moved integrally therewith.

Reference numeral 8 denotes a first idler gear constantly engaged with the sun gear 3; reference numeral 9, a first two-speed gear having a large gear portion 9a and a small gear portion 9b, the large gear portion 9a being engaged with the idler gear 8; reference numeral 10, a second idler gear engaged with the small gear portion 9b of the first two-speed gear 9; reference numeral 11, a third idler gear engaged with the second idler gear 10; reference numeral 12, a second sun gear engaged with the third idler gear 11; and reference numeral 13, a second planetary gear engaged with the second sun gear 12. Reference numeral 14 denotes a third planetary gear engaged with the second sun gear 12, like the second planetary gear 13. Reference numeral 15 denotes a second connecting lever having arm portions 15a, 15b for connecting the second planetary gear 13 and the third planetary gear 14, respectively, to the second sun gear 12 and rotatably holding each of the planetary gears while generating frictional force so that the second planetary gear 13 and the third planetary gear 14 are revolved around the second sun gear 12 serving as the center of the revolution by rotation of the second sun gear 12. The second sun gear 12, the second and third planetary gear 13 and 14 and the second connecting lever 15 form a known planetary gear mechanism.

Reference numeral 16 denotes a fourth idler gear. The fourth idler gear 16 is engaged with the second planetary gear 13 by the counterclockwise rotation of the second connecting lever 15 around the second sun gear 12, and the fourth idler gear 16 is not engaged with the third planetary gear 14 during the normal rotation of the film driving motor 1. The idler gear 16 is engaged with the third planetary gear 14 by the clockwise rotation of the second connecting lever 15 and is not engaged with the second planetary gear 13 during the reverse rotation of the motor 1. Reference numeral 17 denotes a second two-speed gear having a large gear portion 17a and a small gear portion 17b, the large gear portion 17a being engaged with the fourth idler gear 16. Reference numeral 18 denotes a third two-speed gear having a large gear portion 18a and a small gear portion 18b, the large gear portion 18a being engaged with the small gear portion 17b of the second two-speed gear 17. Reference numeral 19 denotes a fork gear engaged with the small gear portion 18b of the third two-speed gear 18, and reference numeral 20 denotes a fork which is rotated integrally with the fork gear 19 so as to rotate a supply spool in a film cartridge 33 (refer to FIG. 16) for pushing the film out of the cartridge 33 and winding the film therein.

Reference numerals 21, 22 and 29 (refer to FIG. 14) form a one-way clutch in which reference numeral 21 denotes a gear engaged with the sun gear 12; reference numeral 22, a ratchet gear having an all-round claw portion 22a formed on the inside and a gear 22b formed on the outside; and reference numeral 29, a ratchet claw member having elastic claw portions 29b engaged with the claw portion 22b of the ratchet gear 22. When a relative speed of the ratchet claw member 29 to the ratchet gear 22 is generated in the direction of an arrow A (refer to FIG. 12), driving force is transmitted from the ratchet claw member 29 to the ratchet gear 22. When the relative speed is generated in the direction reverse to the direction of the arrow A, the claw portion 29b is bent and slides on the claw portion 22a so that no driving force is transmitted from the ratchet claw member 29 to the ratchet gear 22. Since the ratchet claw member 29 has a pin 29a which is engaged with a hole 21c of the gear 21, as shown in FIG. 14, the ratchet claw member 29 is constantly rotated integrally with the gear 21. Reference numeral 30 denotes a base plate (not shown) which is rotatably engaged with the holes 21b, 29c and 22c of the gear 21, the ratchet claw member 29 and the ratchet gear 22, respectively. Reference numeral 23 denotes a roller member fixed to the ratchet gear 22 and having an outer peripheral portion 23a made of rubber or knurled for preventing slippage.

Reference numeral 24 denotes a pulse gear engaged with the gear portion 22b of the ratchet gear 22, and reference numeral 25 denotes a pulse plate having a conducting portion 25a and a nonconducting portion 25b and fixed to the upper side of the pulse gear 24. Reference numerals 26 and 27 denote armatures for detecting pulses corresponding to the rotation of the roller member by the conducting portion 25a and the nonconducting portion 25b of the pulse plate 25.

Reference numeral 28 denotes a stopper (refer to FIG. 13) fixed to the base plate (not shown) so as to regulate the rotational position of the counterclockwise rotation of the first connecting lever 5 by contact with the end portion 5a of the first connecting lever 5.

Reference numeral 31 denotes a body (refer to FIG. 16); reference numeral 32, a pressure plate; reference numeral 35, a cartridge room; reference numeral 36, a spool room; and reference numeral 48, a magnetic head mounted to the pressure plate 32.

The roller member 23 is disposed as shown in FIG. 16 and mounted so that a predetermined pressure is previously applied to the magnetic head 48 for the purpose of bringing the magnetic storage section (not shown) of a film 34 into stable contact with the magnetic head 48 (the magnetic gap portion thereof). Alternatively, the roller member 23 is mounted at a gap from the magnetic head 48 so that predetermined pressure is applied to the magnetic head 48 due to the thickness of the film 34 when the film 34 is passed between the magnetic head 48 and the roller member 23. As seen from the above description, the roller member 23 forms a film feed system and is rotated accompany the movement of the film 34. The pulse plate 25 is also rotated through the gear 22 in linkage to the rotation of the roller member 23 to generate a pulse signal in the armatures 26, 27.

In the above configuration, when the film driving motor 1 (the pinion gear 2) is rotated in the direction Of the arrow B (normal rotation) after the above-described push-out type film cartridge 33 is loaded in the cartridge room 35, as shown in FIG. 12, the first sun gear 3 is rotated clockwise. Following this, the first planetary gear 4 is revolved clockwise around the first sun gear 3 serving as a center of revolution by the operation of the first connecting lever 5 and then engaged with the spool gear 6. As a result, the driving force of the film driving motor 1 is transmitted to the spool gear 6 so that the film take-up spool 7 is rotated clockwise.

The driving force is also transmitted to the first two-speed gear 9 through the idler gear 8 which is another gear engaged with the first sun gear 3 and to the second sun gear 12 through the second idler gear 10 and the third idler gear 11. Since the second sun gear 12 is thus rotated counterclockwise, the second planetary gear 13 and the third planetary gear 14 are revolved counterclockwise around the second sun gear 2 serving as the center of revolution by the operation of the second connecting lever 15, and the second planetary gear 13 is then engaged with the fourth idler gear 16. As a result, the driving force of the film driving motor 1 in the direction B is transmitted as counterclockwise driving force to the idler gear 16 and then to the fork gear 19 through the second two-speed gear 17 and the third two-speed gear 18 so-that the fork 20 is rotated clockwise.

In addition, when the second sun gear is rotated as described above, a clockwise driving force (in the direction of the arrow A) is applied to the gear 21 engaged with the second sun gear 12, and thus the one-way clutch comprisnig the gear 21, the ratchet gear 22 and the ratchet claw member 29 is integrally rotated (described in detail below) until the film is wound on the spool 7. Following this, the roller member 23 is also rotated clockwise. When the ratchet gear 22 is rotated, the pulse gear 24 engaged with the ratchet gear 22 is also rotated to generate a pulse signal corresponding to the rotation amount of the roller member 23 by the pulse plate 25 and the armatures 27, 26. The pulse signal is detected by the encoder circuit (described below) shown in FIG. 1 in which the rotational speed and amount of the roller member 23 (the feed speed and feed amount of the film 34) and the like are determined.

The gear ratio of the gear train is as follows:

If the peripheral speed of the take-up spool 7 is V1, the peripheral speed of the roller member 23 is V2 and the speed of the film 34 pushed out of the film cartridge 33 by the fork 20 is V3, the relation, V1> V2> V3, is established.

When the film 34 is successively pushed out of the film cartridge 33 by the clockwise rotation of the fork 20, since the roller member 23 is mounted so as to constantly press the magnetic storage section of the film 34 on the magnetic head 48, the film tip-end contacts with the roller member 23 and the magnetic head 48.

At this time, in the configuration of this embodiment, the film tip-end can smoothly be sent from the right to the left in FIG. 12 by the frictional force between the film 34 and the roller member 23 because the roller member 23 is rotated clockwise. In addition, since the rotational speeds V2 and V3 are set so that V2> V3, when the film is then pushed out by the roller member 23, the driving force (speed) is transmitted to the fork gear 19, the third two-speed gear 18, the second two-speed gear 17 and the fourth idler gear 16 in this order, through the film 34. Although the counterclockwise rotational speed of the fourth idler gear 16 is higher than the clockwise rotational speed of the second planetary gear 13, since the fourth idler gear 16 repels the second planetary gear 13, the speed difference is absorbed by momentary release of the engagement between the second planetary gear 13 and the idler gear 16.

When the film 34 is further set and wound on the film take-up spool 7 by known means (means for catching the perforation of the film by the claws provided on the film take-up spool 7, means provided on the body side for pressing the film 34 on the film take-up spool 7 or the like), the relation, V1>V2> V3, causes the roller member 23 to be rotated due to the frictional force between the film 34 and the roller member 23. Although the roller member 23 is rotated at a higher speed than that of the gear 21, the rotational force of the roller member 23 is not transmitted to the gear 21 by the function of the one-way clutch. In addition, at the same time, the feed amount and speed of the film 34 and the like can be determined by the encoder circuit shown in FIG. 1 on the basis of the pulse signal generated by the pulse plate 25 and the armatures 26, 27. Further, although the feed speed of the film is significantly changed because of the relation V1>V2 when the film 34 is wound on the film take-up spool 7, this speed change can be employed for making a decision as to whether or not autoloading is completed.

A description will now be given of the operation of rewinding of the film.

The operation is described with reference to FIG. 13. When the film driving motor 1 is rotated in the direction of the arrow C, the first connecting lever 5 and the first planetary gear 4 are revolved counterclockwise around the first sun gear 3 serving as the center of revolution until the end portion 5a of the first connecting lever 5 contacts with the stopper 28. As a result, the engagement between the first planetary gear 4 and the spool gear 6 is released.

At the same time, the second sun gear 12 is rotated clockwise, and the second planetary gear 13 and the third planetary gear 14 are thus revolved clockwise around the second sun gear 12 serving as the center of the revolution by the operation of the second connecting lever 15. As a result, the engagement between the fourth idler gear 16 and the second planetary gear 13 is released, and the fourth idler gear 16 is engaged with the third planetary gear 14 in place of the second planetary gear 13. The fork gear 19 is thus rotated counterclockwise, and the supply spool (not shown) in the film cartridge 33 is rotated in the reverse direction by the fork 20 so that the film 34 is wound in the cartridge 33.

At this time, although the roller member 23 is rotated counterclockwise by the film 34, since the gear 21 is rotated counterclockwise at a high speed by the second sun gear 12, the relative speed of the gear 21 to the ratchet gear 22 is generated in the counterclockwise direction (the direction reverse to the direction of the arrow A), and no driving force is thus transmitted from the ratchet gear 22 to the gear 21 by the one-way clutch mechanism.

When the film 34 is wound in the film cartridge 33 as described above, the film tip-end is shortly passed through the roller member 23 so as to prevent the rotation of the roller member 23. Thus no pulse signal is generated between the pulse plate 25 and the armatures 26, 27. After the film is then continuously rewound for a predetermined time, when the motor is stopped, the operation of rewinding the film completed (described in detail below).

The results of detection of the feed amount and feed speed of the film 34 are used for performing magnetic storage at a predetermined position of the magnetic storage section in synchronism with the magnetic head 48 during magnetic recording. The results can also be used for controlling the feed of the film 34 for one frame, writing data by using optical means such as LED or the like.

Figure 17:
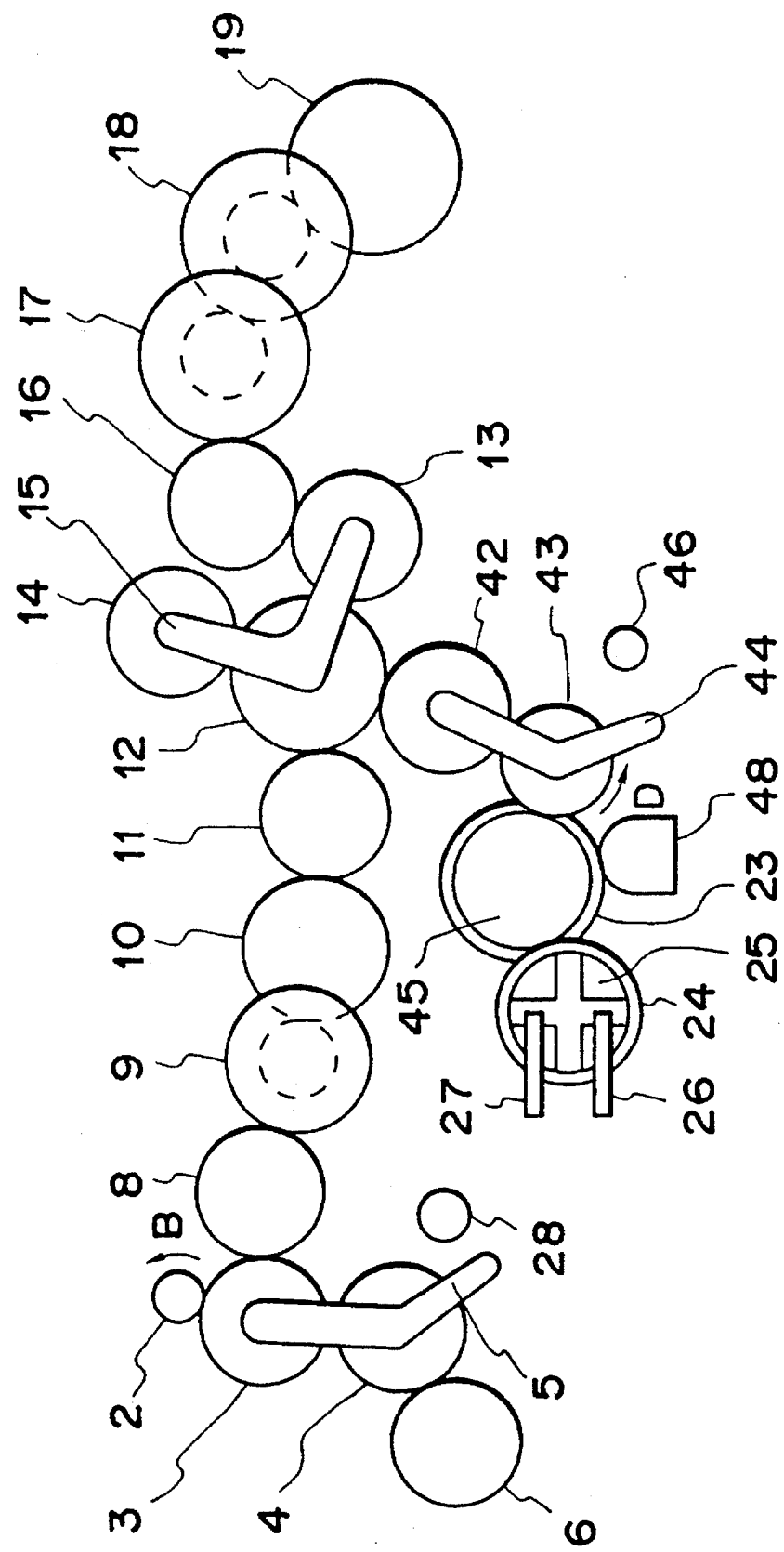
FIGS. 17 and 18 are plan views respectively showing other examples of a roller member driving gear train.
Figure 18:
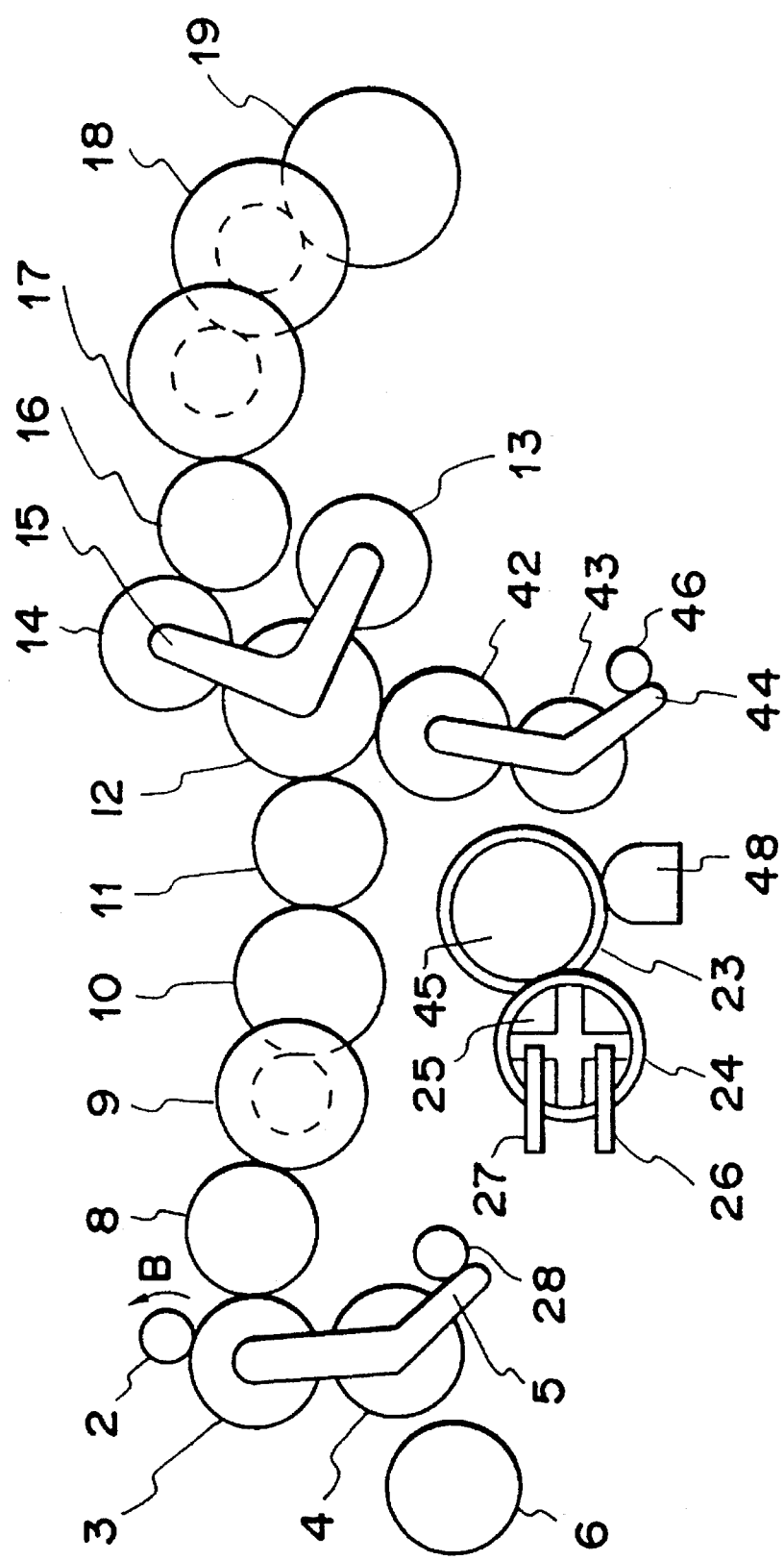

FIGS. 17 and 18 are drawings showing another example of the one-way clutch mechanism comprising the section 21, 22 and 29. FIG. 17 is a plan view showing the gear train during winding of the film, and FIG. 18 is a plan view showing the gear train during rewinding of the film.

In the drawings, reference numeral 42 denotes a third sun gear engaged with the second sun gear 12, and reference numeral 43 denotes a fourth planetary gear engaged with the third sun gear 42. Reference numeral 44 denotes a third connecting lever for connecting the third sun gear 42 and the fourth planetary gear 43 so as to revolve the fourth planetary gear 43 counterclockwise around the third sun gear 42 serving as the center of revolution when the third sun gear 42 is rotated counterclockwise, and revolve the fourth planetary gear 43 clockwise when the third sun gear 42 is rotated clockwise. Reference numeral 45 denotes a gear engaged with the fourth planetary gear 43 and having a roller member 23 provided integrally therewith. The gear 45 is engaged with the pulse gear 24. Reference numeral 46 denotes a stopper for regulating the counterclockwise rotation of the connecting lever 44.

Like the above-described embodiment, the peripheral speeds of the film take-up spool 7 and the roller member 23 and the speed of the film 34 pushed out by the fork 20 are set so that the relation, V1>V2> V3, is established. When the film 34 is wound on the film take-up spool 7 during winding of the film 34, therefore, the gear 45 is subjected, through the roller member 23, to clockwise driving force at a higher speed than that of the force transmitted from the third sun gear 42. However, since the gear 45 repels the fourth planetary gear 43 in the direction of an arrow D, the speed difference is absorbed.

When the film 34 is rewound, since the engagement between the fourth planetary gear 43 and the gear 45 is released by the third sun gear 42 (the state shown in FIG. 18), the film 34 is wound in the film cartridge 33 by the fork gear 19.

Figure 19:
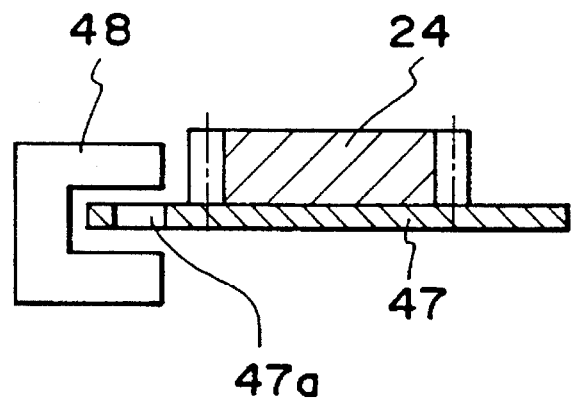
FIG. 19 is a longitudinally sectional view showing the arrangement of another example of a pulse signal generating portion.

Although the feed amount of the film 34 is detected by using the pulse plate 25 and the armatures 26, 27 in the above embodiment, FIG. 19 shows an example in which the feed amount is optically detected by using the pulse gear 24 and a photointerrupter or the like.

In FIG. 19, reference numeral 48 denotes a photointerrupter, and reference numeral 47 denotes a slit disc which is fixed to the pulse gear 24, which is made of a shading material and which has a slit 47a formed therein.

In the above arrangement, the photointerrupter 48 detects the slit 47a to generate a pulse signal corresponding to the rotational amount of the roller member 23.

Figure 20:
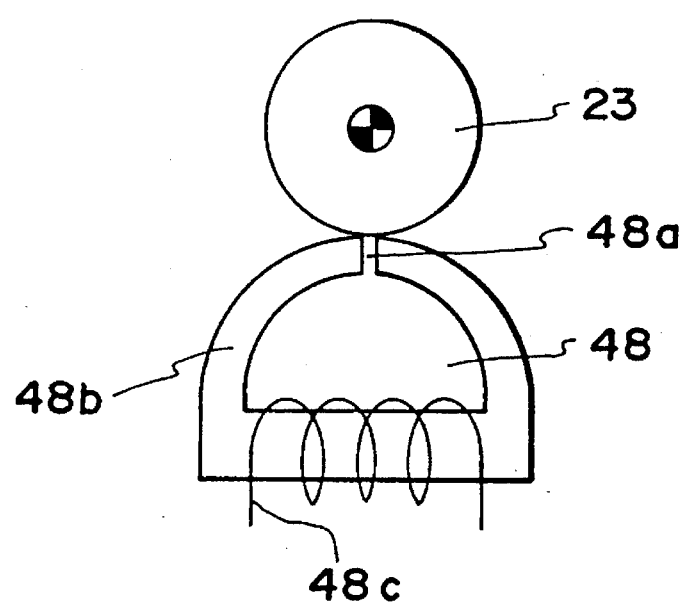
FIG. 20 is a plan view showing a positional relation between the magnetic head and the roller member, both of which are shown in FIG. 11.

The roller member 23 serving as a film pressure member preferably has the shape described below and is mounted at the position described below. FIG. 20 is a sectional view of the magnetic head 48 and the roller member 23 in which reference numeral 48a denotes a magnetic gap; reference numeral 48b, a core; and reference numeral 48c, a coil.

Namely, in this embodiment, because the roller member 23 is rotated even when the film 34 is not placed on the magnetic head 48, it is thought that dust (cutting powder) produced when the roller member 23 is rotated enters the magnetic gap 48a of the magnetic head 48, or the magnetic gap 48a is rubbed. It is thus preferable that the roller member has a shape, for example, as shown in FIG. 21.

Figure 21:
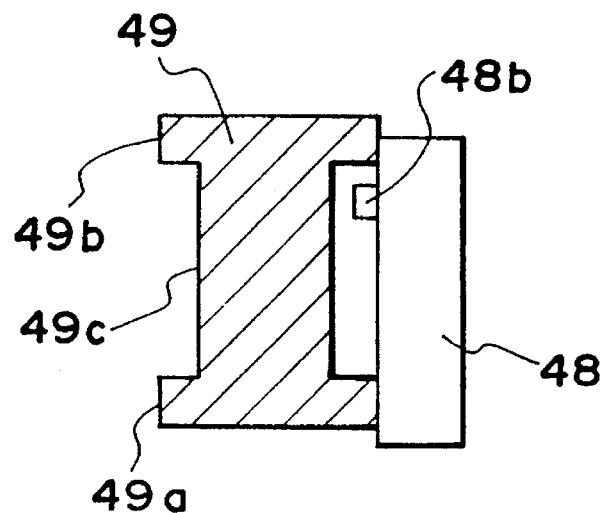
FIG. 21 is a longitudinally sectional view showing another positional relation between the magnetic head and the roller member.

FIG. 21 is a longitudinally sectional view in which reference numeral 49 denotes a roller member comprising large diameter portions 49a, 49b and a small diameter portion 49c so that the large diameter portions 49a, 49b contact with portions other than the core 48b of the magnetic head 48 and the magnetic cap provided at the tip thereof. Namely, the small diameter portion 49c is opposed to the magnetic gap 48a and the core 48b so that the roller member does not directly contact with the magnetic gap.

Figure 22:
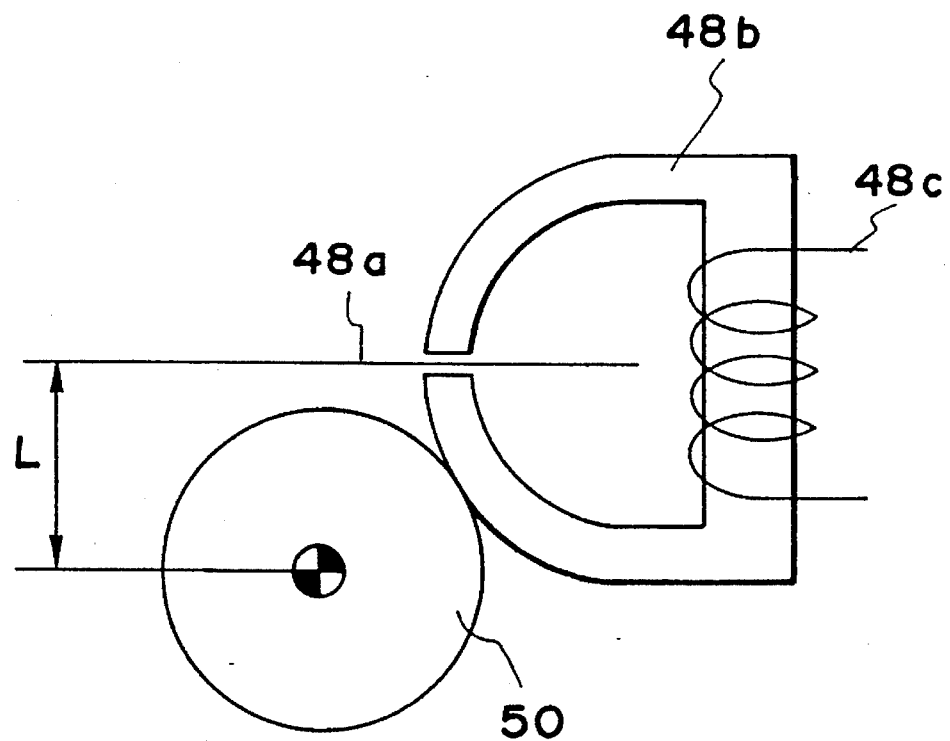
FIG. 22 is a plan view showing a further positional relation between the magnetic head and the roller member.

In addition, as shown in FIG. 22, a roller member 50 may be disposed at a distance from the magnetic gap 48a so that the roller member 50 contacts with the magnetic head 48 at a position other than the magnetic gap 48a.

Figure 23:
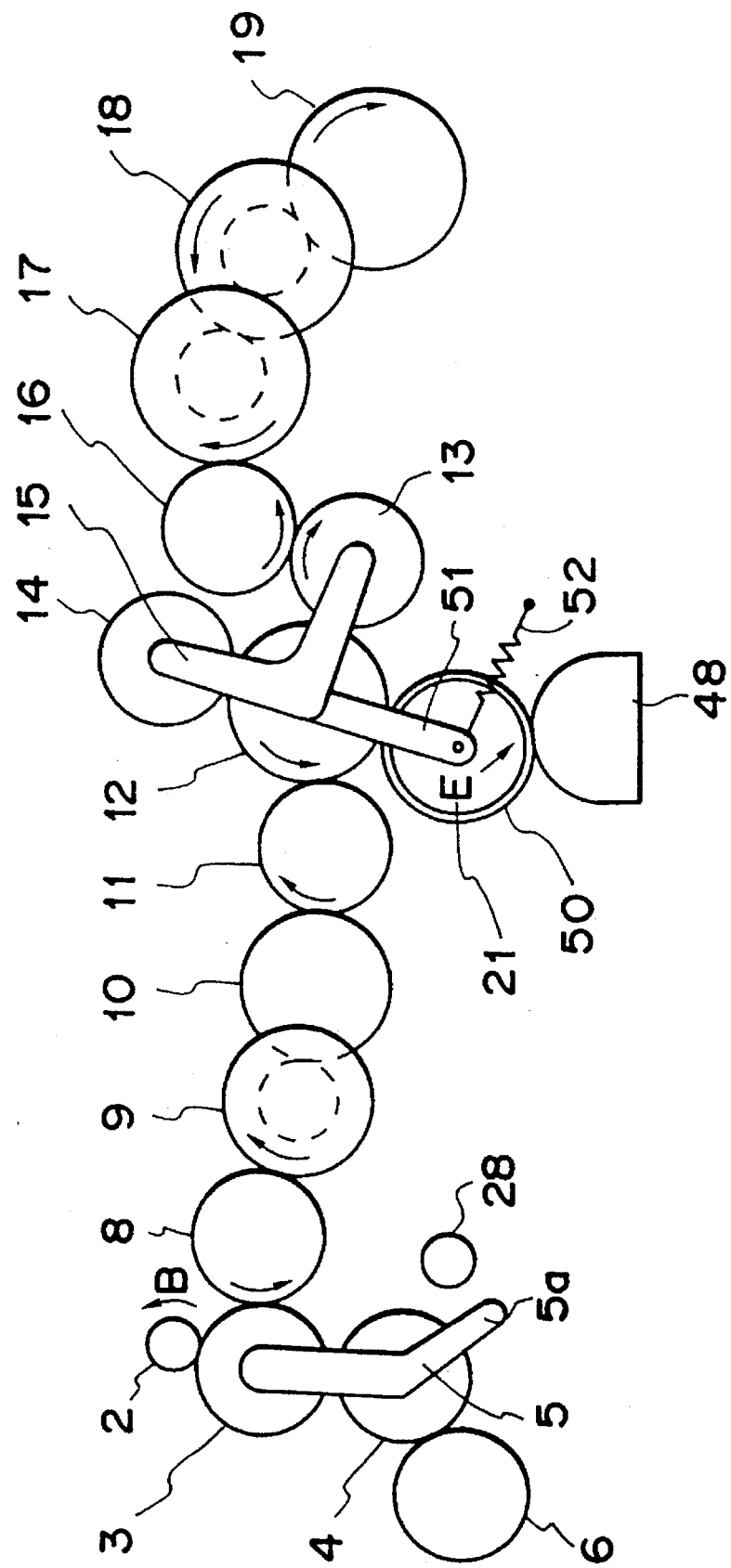
FIG. 23 is a plan view showing an example of the arrangement of a film feed gear train in the case of the positional relation shown in FIG. 22.
Figure 24:
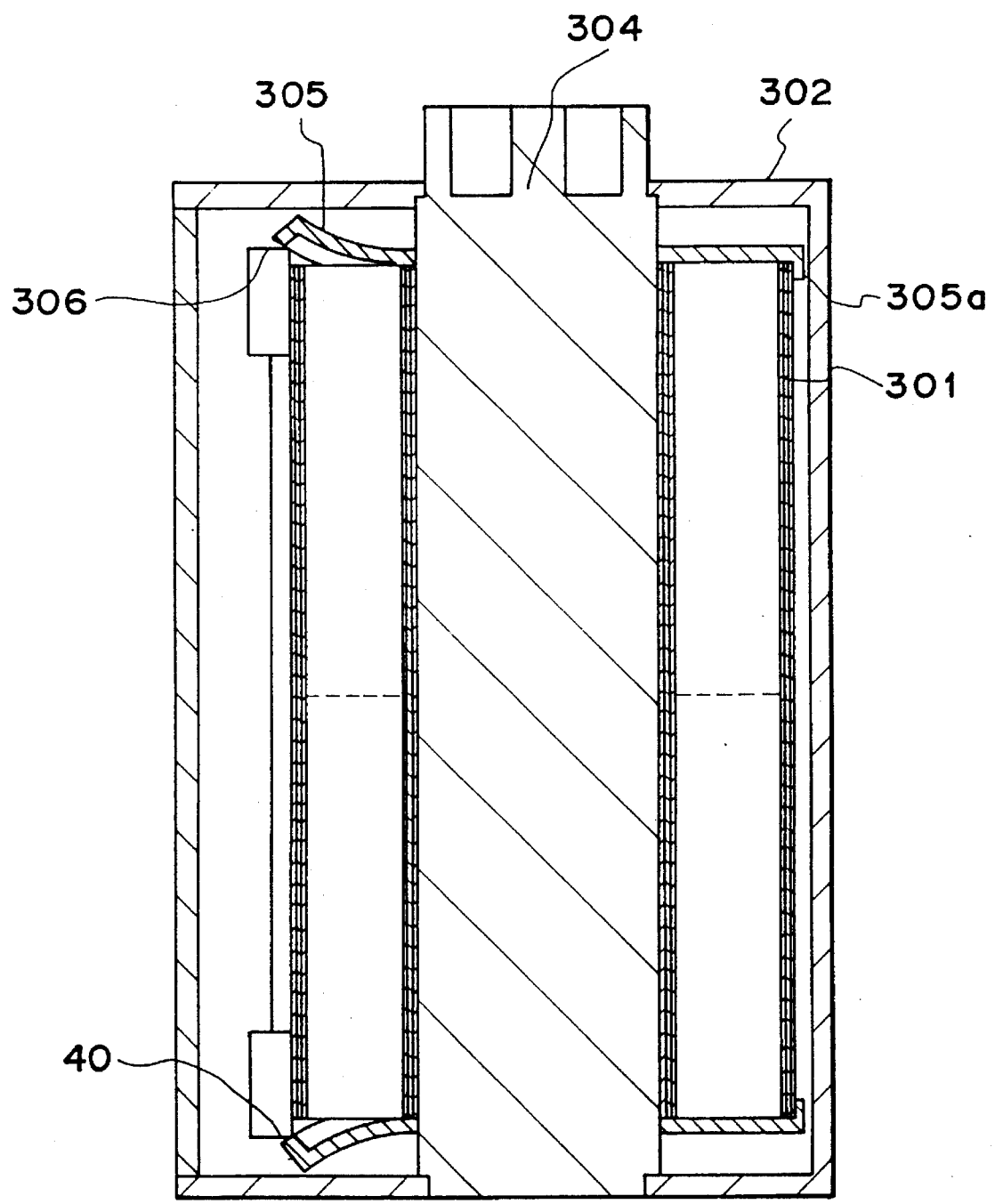
FIG. 24 is a longitudinally sectional view of the push-out type film cartridge used in an embodiment of the present invention.
Figure 25:
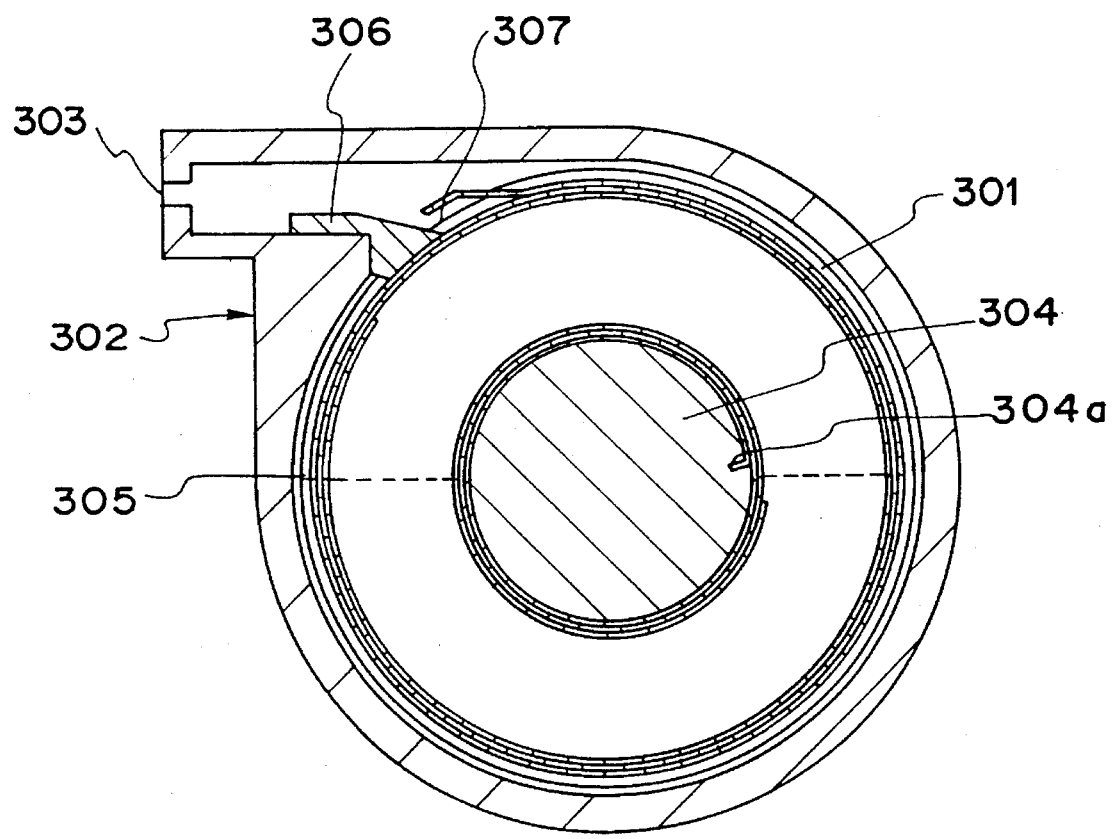
FIG. 25 is a cross-sectional view of the push-out type film cartridge.
Figure 26:
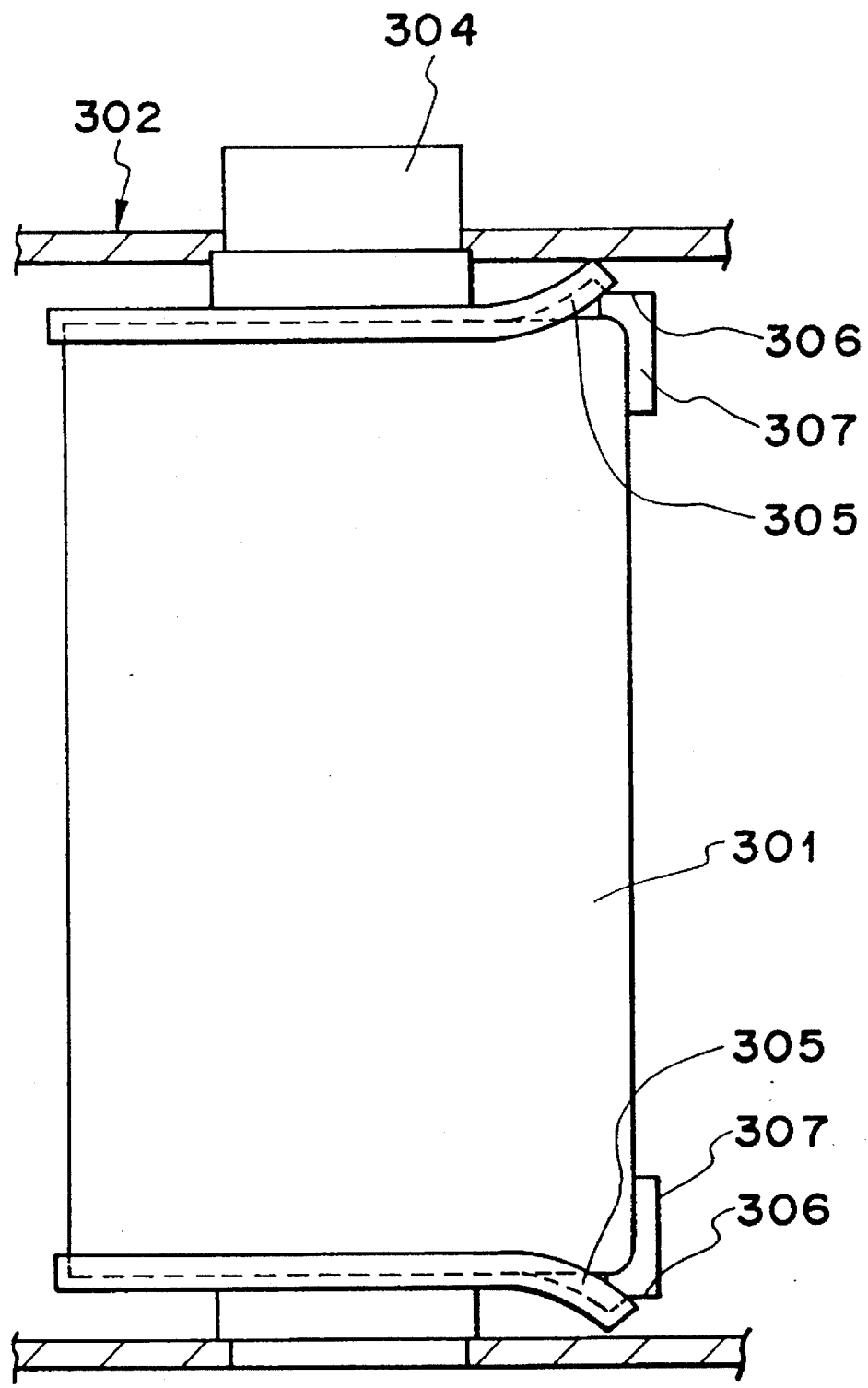
FIG. 26 is a side view of the push-out type film cartridge.

When the roller member 50 is mounted at the position shown in FIG. 22, it is preferable that the roller member 50 is urged toward the magnetic head 48 by elastic means such as a spring or the like so that the magnetic storage section of the film 34 is pressed on the magnetic head 48 with stable force, as shown in FIG. 23.

Namely, in FIG. 23, reference numeral 51 denotes a fourth connecting lever which can be rotated around the second sun gear 12 and which rotatably supports the gear 21 so as to engage the gear 21 with the second sun gear 12. The fourth connecting lever 51 can be operated completely independently of the; second connecting lever 15. Reference numeral 52 denotes a spring which has one end fixed to the base plate (not shown) and the other end fitted to the fourth connecting lever 51 and which urges the roller member 50 and the gear 21 in the direction of an arrow E so as to press the roller member 50 on the magnetic head 48 with a predetermined force.

Figure 1:
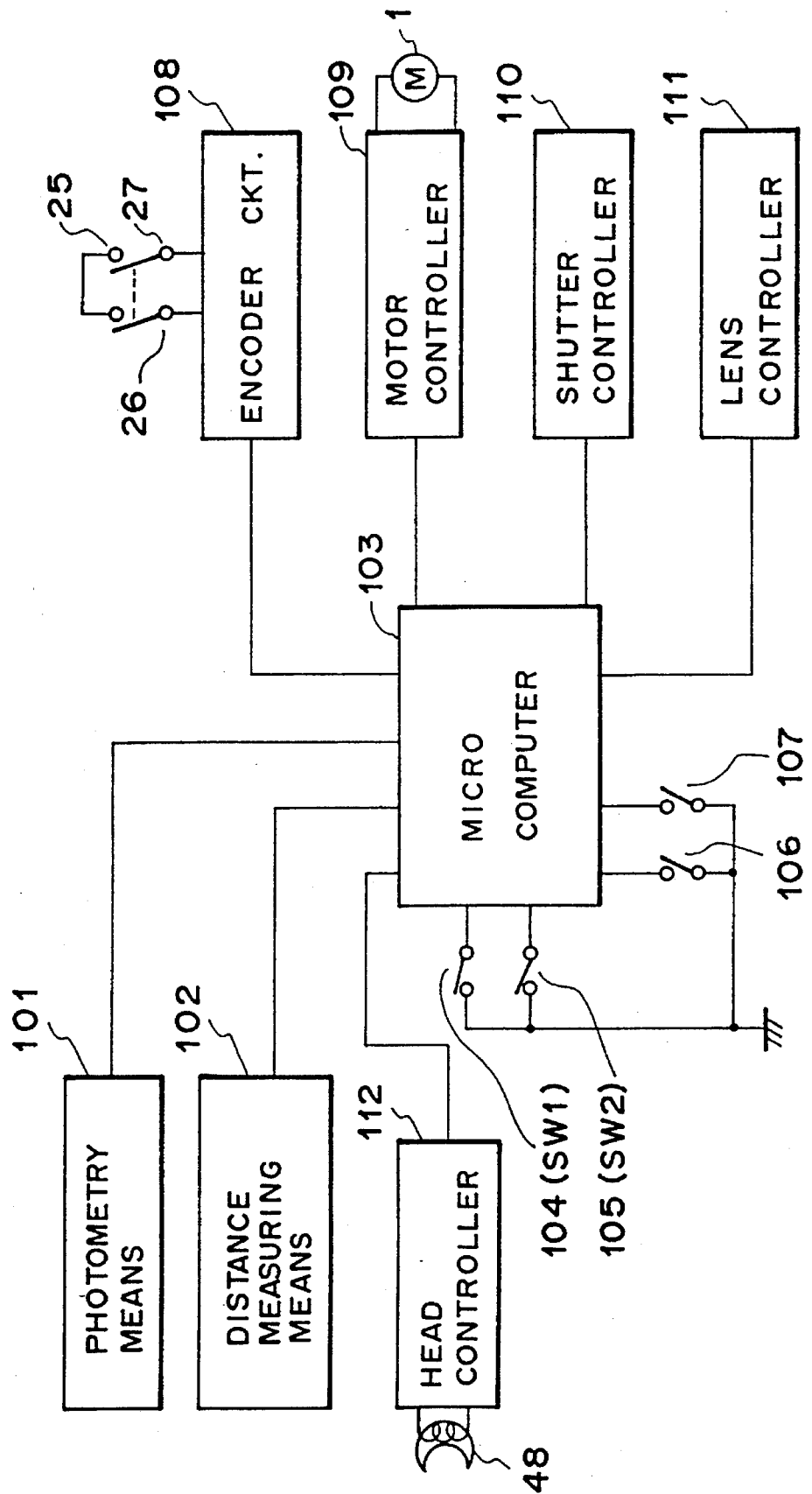
FIG. 1 is a block diagram of a first embodiment of the present invention.

FIG. 1 is a block diagram showing an embodiment of an electrical arrangement corresponding to the above-described mechanism arrangement.

In FIG. 1, reference numeral 101 denotes photometry means for measuring the brightness of a photographic object, and reference numeral 102 denotes distance measuring means for measuring the distance from the object for focusing a photographing lens. Reference numeral 103 denotes a microcomputer for controlling the operations of various circuits. Reference numeral 104 denotes a switch (referred to as "SW1" hereinafter) which is turned on in linkage to the first stroke of a release button of a camera (not shown). Reference numeral 105 denotes a switch (referred to as "SW2" hereinafter) which is turned on in linkage to the second stroke of the release button. Reference numeral 106 denotes a back plate switch which is interlocked with the opening and closing of the back plate, and reference numeral 107 denotes a switch (referred to as "cartridge present/absent switch" hereinafter) which assumes a state that changes corresponding to whether or not the film cartridge 33 is loaded in the cartridge room 35.

Reference numeral 108 denotes an encoder circuit for detecting the pulse signal generated by the pulse plate 25 and the armatures 26, 27 shown in FIG. 11, the pulse signal being used as data for determining the rotational speed, rotational amount of the roller member 23 (the feed amount of the film 34) and the like. Reference numeral 109 denotes a motor controller for controlling the rotation of the film feed motor 1 so that the film 34 is wound by normal rotation (rotation in the direction of the arrow B in FIG. 12) of the motor 1 and rewound by reverse rotation (rotation in the direction of the arrow C in FIG. 13) thereof. Reference numeral 110 denotes a shutter controller for controlling exposure of the film 34; and reference numeral 111 denotes a lens controller for controlling a lens barrel so as to focus it on an object on the basis of the data obtained from the distance measuring means 102. Reference numeral 112 denotes a head controller for controlling data writing in or reading from the magnetic storage section (not shown) provided on the film 34 by using the magnetic head 48 shown in FIG. 11 and so on.

Figure 2B:
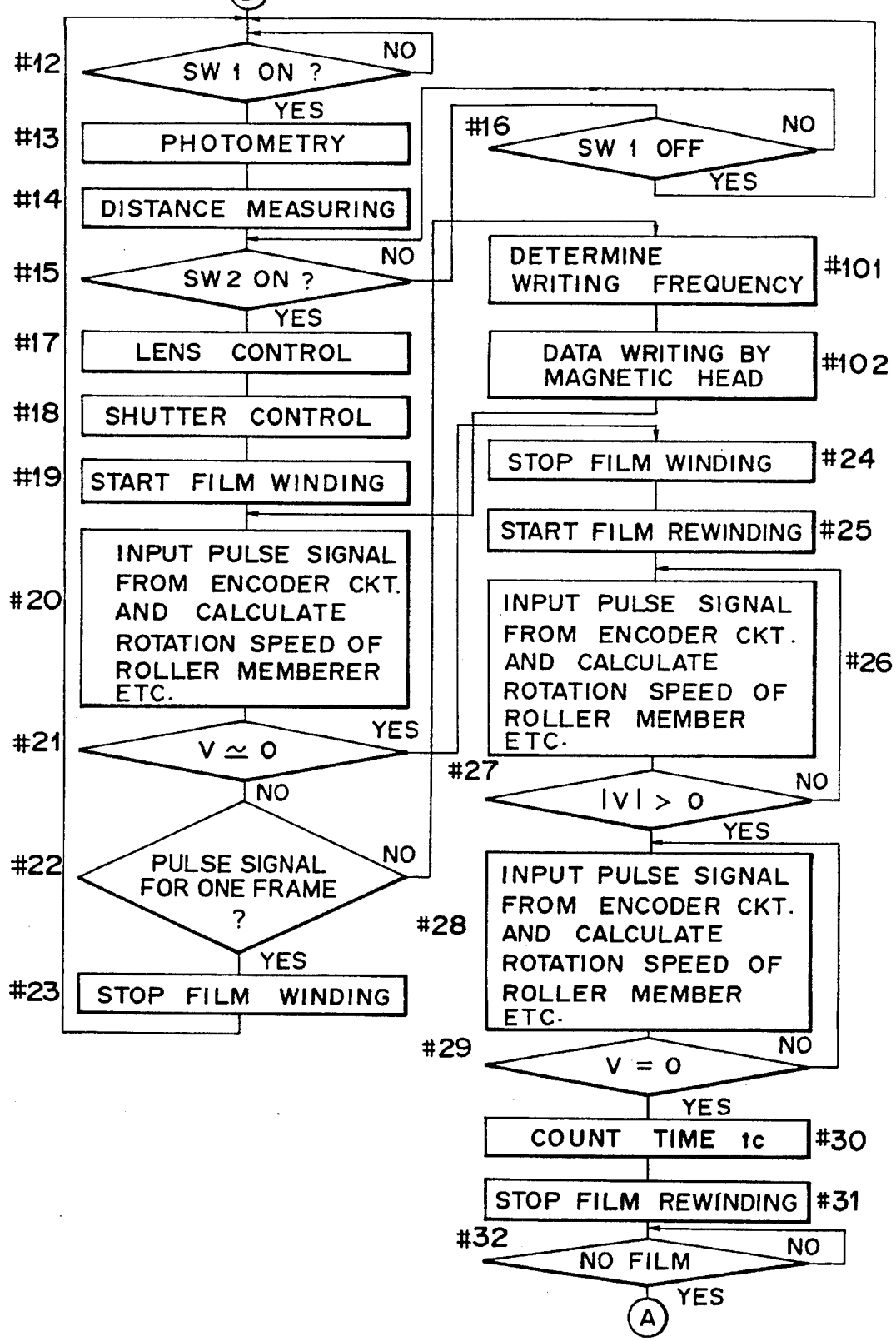

FIGS. 2A and 2B are flow charts showing the operation of the microcomputer 103. The operation is described below with reference to the flow charts.

(Step 1) On the basis of the state of the back plate switch 106, a decision is made as to whether or not the back plate of the camera is closed. If it is decided that the back plate is closed, the flow moves to Step 2.

(Step 2) On the basis of the state of the cartridge present/ absent switch 107, a decision is made as to whether or not the film cartridge 33 is loaded in the cartridge room 35. If it is decided that the film cartridge 33 is loaded in the cartridge room 35, the flow moves to Step 3.

(Step 3) Since the film cartridge 33 is loaded, a winding start signal is sent to the motor controller 109. The film driving motor 1 is consequently rotated in the direction of the arrow B, as shown in FIG. 12, and the pushing-out of the film 34 from the film cartridge 33 is started through the gear train.

(Step 4) Pulse signals corresponding to the rotation of the roller member 23 are input from the encoder circuit 108, and a rotational speed v and acceleration dv/dt of the roller member 23 are determined by calculation with the clock signal stored in the microcomputer 103.

If the count number of pulse signals for a predetermined time is N, the following relations are obtained:

$$v \propto N, \frac{dv}{dt} \propto \frac{dN}{dt}$$

Alternatively, if the distance between the generation times of pulse signals is T, the following relations are obtained;

$$V \propto \frac{1}{T}, \frac{dv}{dt} \propto \frac{d(1/T)}{dt}$$

(Step 5) A decision is made as to whether or not the rotation acceleration of the roller member 23 obtained in Step 4 suddenly changes. If the acceleration suddenly changes, it is decided that the film 34 is wound on the film take-up spool 7, and the flow moves to Step 100.

A description will now be given of the reason for deciding by the sudden change in the rotational acceleration of the roller member 23 that the film 34 is wound on the film take-up spool 7.

Figure 3:
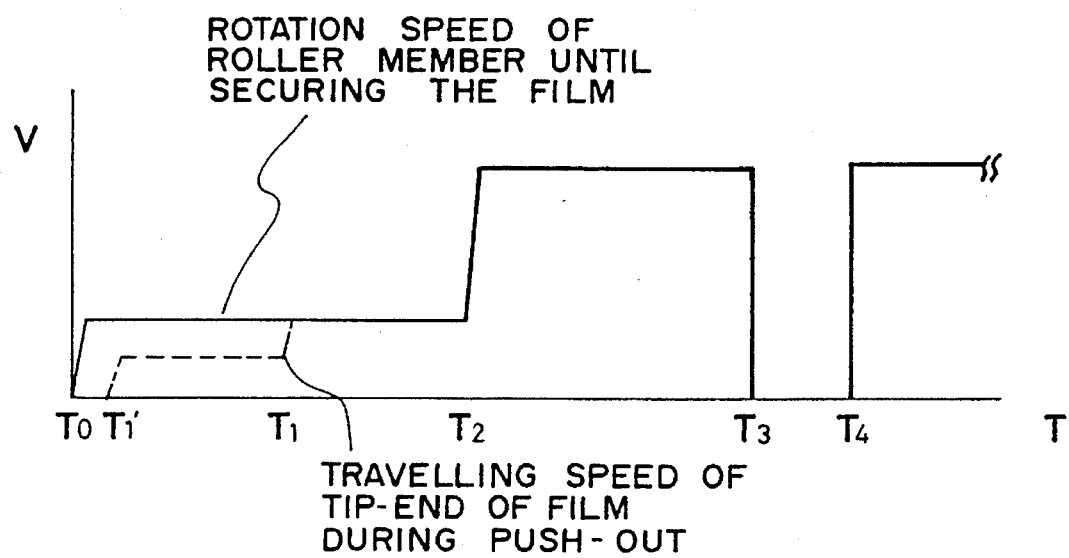
FIG. 3 is a graph showing the Speeds of the tip-end of a film and a roller member during auto-loading.

FIG. 3 shows a relation between the feed speed of the film 34 and the rotational speed of the roller member 23.

In FIG. 3, the pushing-out (winding) of the film 34 is started at $T_0$ after the film cartridge 33 has been loaded. A thin solid line shows the rotational speed of the roller member 23, and a broken line shows the traveling speed of the film tip-end during pushing-out by the driving of the fork. Although the speeds, in fact, slightly change with load variations, such changes can be neglected on the whole and thus are not shown in the drawing.

Although the film is pushed out during the time from $T_0$ to $T_1$, the starting is delayed ($T_1'$) due to absorption of loosening of the film winding in the film cartridge 33. In fact, the film 34 is pushed out by the fork 20 during the time from $T_1'$ to $T_1$, and the feed speed of the film 34 during this time is determined by the rotational speed of the fork 20. During this time, the roller member 23 is rotated at a speed which is determined by the rotation of the film driving motor 1 and the gear ratio of the gear train for transmitting driving force to the roller member 23.

After the film tip-end has reached the roller member 23 at the time $T_1$, the film 34 is pulled out according to the rotational speed of the roller member 23 until it reaches the film take-up spool 7. As described above, during this time, the pushing-out of the film 34 by the fork 20 is ineffective.

The film tip-end is pushed out to the film take-up spool 7 during the time from $T_1$ to $T_2$, and the film 34 is wound on the film take-up spool 7 at the time $T_2$. Namely, a sudden change in the speed of the roller member 23 represents that the film 34 is wound on the film take-up spool 7 and rotated at a speed according to the spool 7. The film 34 is then wound to a predetermined position (a position where the first frame reaches the aperture portion) according to the rotational speed of the film take-up spool 7. During this time, the driving force of the roller member 23 is also ineffective.

When the first frame reaches the predetermined position, winding of the film by the motor controller 109 is stopped, and the film take-up spool 7 is stopped at the time $T_3$. When photographing on the first frame is completed, winding of the film 34 toward the second frame is started at the time $T_4$.

When it is decided in Step 5 that the rotational speed of the roller member 23 does not abruptly change, the flow moves to Step 6.

(Step 6) A decision is made as to whether the rotational speed v of the roller member 23 is substantially zero. When the rotational speed v is substantially zero, it is decided that the film tip-end has been caught to stop the rotation of the motor 1. Thus the fork 20 and the roller member 23 are not rotated, and the flow moves to Step 8. When it is confirmed that the roller member 23 is rotated, the flow moves to Step 7.

(Step 7) A decision is made as to whether or not a predetermined time $t_a$ passes after the start of predetermined time $t_a$ does not pass, the flow returns winding of the film 34. If it is decided that the to Step 4. On the other hand, when the increase in the rotational speed of the roller member 23, which is caused by winding of the film 34 on the film take-up spool 7, is not detected even if the predetermined time $t_a$ passes, the flow moves to Step 8. The predetermined time $t_a$ is slightly longer than the time distance between the times $T_0$ and $T_2$ shown in FIG. 3. In other words, the predetermined time $t_a$ is a time estimated to be a sufficient time from the start of pushing-out of the film 34 to winding of the film 34 on the film take-up spool 7. Namely, it can be thought that a time over the predetermined time $t_a$ means a failure in autoloading.

(Step 8) The operation of once winding the film 34 in the film cartridge 33 is starred, for attempting to wind (push-out) the film 34 over again. Namely, rewinding of the film 34 is started through the motor controller 109. The flow returns to Step 3.

In addition, when it is decided in Step 5 that the rotational speed of the roller member 23 abruptly changes (the state at the time $T_2$ shown in FIG. 3), the flow moves to Step 100, as described above.

(Step 100) The magnetic head 48 is driven through the head controller 112 in order to read data about the specified number of films, the film sensitivity and so on, all of which are written in the magnetic storage section of the film 34 so that reading or writing of data is started.

(Step 9) The value of pulse signal counted by the encoder circuit 108 is detected.

(Step 10) On the basis of the count contents in the encoder circuit 108, a decision is made as to whether or not the first frame reaches the aperture portion. Steps 9 and 10 are repeated until the first frame reaches the aperture portion. When it is decided that the first frame reaches the aperture portion, the flow moves to Step 11.

(Step 11) The driving of the film driving motor 1 is stopped through the motor controller 109 so that winding of the film 34 is stopped.

When the above operation is completed, the flow moves to the Step 12 shown in FIG. 2B.

(Step 12) A decision is made as to whether or not the switch SW1 is turned on by the first stroke of the release button. When it is decided that the switch SW1 is turned on, the flow moves to Step 13.

(Step 13) The photometry means 101 is driven for measuring the brightness of an object (obtaining photometric data).

(Step 14) The distance measuring means is driven for calculating data (distance measurement data) about the distance from an object.

(Step 15) A decision is made as to whether or not the release switch SW2 is turned on by the second stroke of the release button. When it is decided that the release switch SW2 is turned on, the flow moves to Step 17, while when the release switch SW2 remains turned off, the flow moves to Step 16.

(Step 16) Like Step 12, a decision is made as to whether or not the switch SW1 is turned off. When it is decided that the switch SW1 is turned off, the flow returns to Step 12, while when the switch SW1 remains turned on, the flow returns to Step 15 in which turning-on of the release switch SW2 is a waited.

(Step 17) The lens controller 111 is driven on the basis of the distance measurement data obtained in Step 14 so as to move the photographic lens to the focusing position.

(Step 18) The shutter controller 110 is driven on the basis of the photometric data obtained in Step 13 so as to control the exposure of the film 34.

(Step 19) The winding of the film 34 is started through the motor controller 109 and the film driving motor 1 in order to place the next frame at the aperture portion.

(Step 20) A pulse signal is input from the encoder circuit 108 so as to calculate the rotational speed v of the roller member 23 and the rotational amount thereof (feed amount of the film).

(Step 21) A decision is made as to whether or not the rotational speed of the roller member 23, which is obtained in Step 20, is substantially zero. When the rotational speed is not zero, i.e., when the film 34 is being wound, the flow moves to Step: 22.

(Step 22) A decision is made as to whether or not the count content in the encoder circuit 108 reaches an amount corresponding to the feed of one frame of the film 34. If the content does not reach the amount, the flow moves to Step 101.

(Step 101) A writing frequency for recording data in a photographic frame is determined on the basis of the pulse signal input from the encoder circuit 108 (described in detail below).

(Step 102) Data is written in the magnetic storage section of the film 34 being fed on the basis of the writing frequency by the mangetic head 48 through the head controller 112.

In addition, when it is decided in Step 22 that the count content in the encoder circuit 108 reaches the amount corresponding to the feed of one frame of the film, the flow moves to Step 23.

(Step 23) The driving of the film driving motor 1 is stopped through the motor controller 109 so that winding of the film 34 is stopped. The flow returns to Step 12 for the next photographing operation.

When it is decided in Step 21 that the rotational speed of the roller member 23 is substantially zero, it is considered that the film 34 ends and is stretched. Since it is thus considered that photographing in all frames is completed, the flow moves to Step 24.

(Step 24) The driving of the film driving motor 1 is stopped through the motor controller 109 so as to stop the winding of the film 34.

(Step 25) The film driving motor 1 is driven in the direction of the arrow C shown in FIG. 13 through the motor controller 109 so as to start rewinding of the film 34 (winding in the film cartridge 33).

(Step 26) A pulse signal is input from the encoder circuit 108 so as to calculate the rotational speed v of the roller member 23.

(Step 27) A decision is made as to whether or not the absolute value of the rotational speed v of the roller member 23, which is obtained in the Step 26, is greater than zero. If the value is substantially zero, the flow returns to the Step 26 in which the rotational speed v of the roller member 23 is calculated over again. When the value is then greater than zero, i.e., when the rotation of the roller member 23 is detected, the flow moves to Step 28.

The decision flow in the Step 27 is provided for preventing the following mistake:

When there is loosening of the film winding on the film take-up spool 7, since the movement of the film 34 is transmitted to the roller member 23 with a delay at the start of rewinding, the start of rewinding is mistaken for the end of rewinding.

(Step 28) A pulse signal is input from the encoder circuit 108 so as to calculate the rotational speed v of the roller member 23.

(Step 29) A decision is made as to whether or not the rotational speed v of the roller member 23, which is obtained in the step 28, is zero. If the rotational speed is not zero, the flow returns to the Step 28, and the same operation as described above is repeated until the rotational speed v becomes zero. When it is then decided that the rotational speed v of the roller member 23 is zero, i.e., when it is decided that the rotation of the roller member 23 is stopped, it is considered that the film tip-end is passed through the position of the roller member 23, and the flow moves to Step 30.

(Step 30) A time is started for counting a predetermined time $t_c$.

(Step 31) When it is confirmed that the predetermined time $t_c$ has passed, the rewinding of the film 34 is stopped.

(Step 32) A decision is made from the state of the cartridge present/absent switch 107 as to whether or not the film cartridge 33 is removed from the cartridge room 35. When it is decided that the film cartridge 33 is removed, the flow returns to the Step 1 shown in FIG. 2A.

Figure 4:
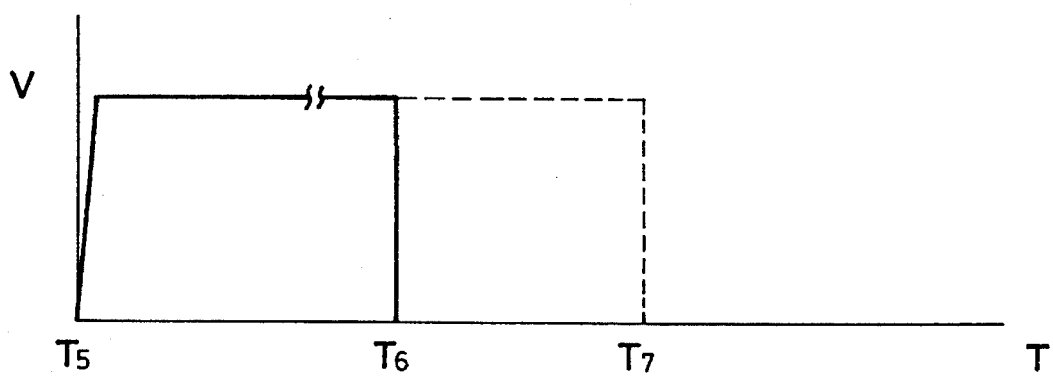
FIG. 4 is a graph showing the speed of the same film tip-end and roller member during rewinding of a film.

FIG. 4 is a drawing in which the rotational speed v of the roller member 23 during rewinding of the film 34 is shown by a solid line. Rewinding is started at time $T_5$, and the film tip-end is passed through the position of the roller member 23 at time $T_6$. In the case of rewinding of the film, the roller member 23 is immediately stopped due to superiority of friction with the opposite surface. The traveling speed of the film is shown by a broken line.

Figure 5:
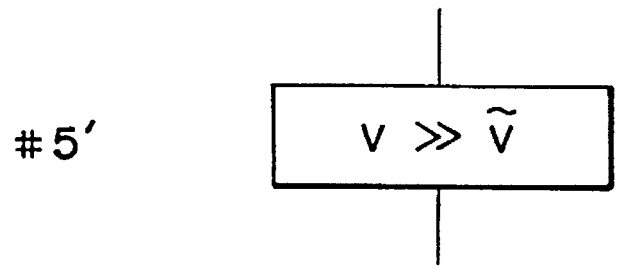
FIGS. 5 and 6 are flow charts respectively; showing partially modified examples of the flow chart shown in FIG. 2A.

FIG. 5 shows a modified example in which a change in the average speed is employed from making a decision as to whether or not autoloading is successfully performed in place of the use of a change in the acceleration in the Step 5 shown in FIG. 2A.

Figure 6:
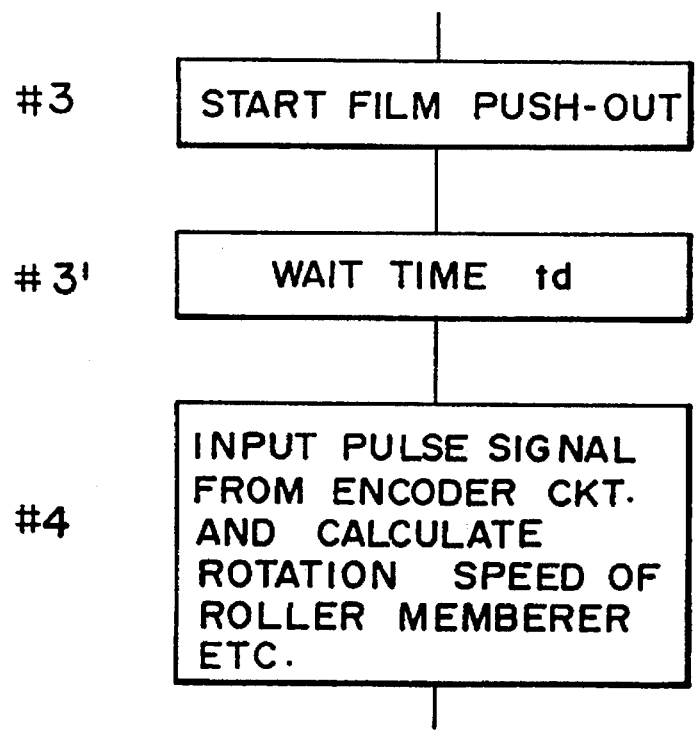

FIG. 6 shows another example in which Step 3' is provided between Steps 3 and 4 shown in FIG. 2A so that the output from the encoder 108 is not taken into account for a predetermined time $t_d$ required for stabilizing the driving of the film driving motor 1, thereby preventing a wrong decision from being made by a change in the acceleration or speed at the start of the film driving motor 1.

Figure 7:
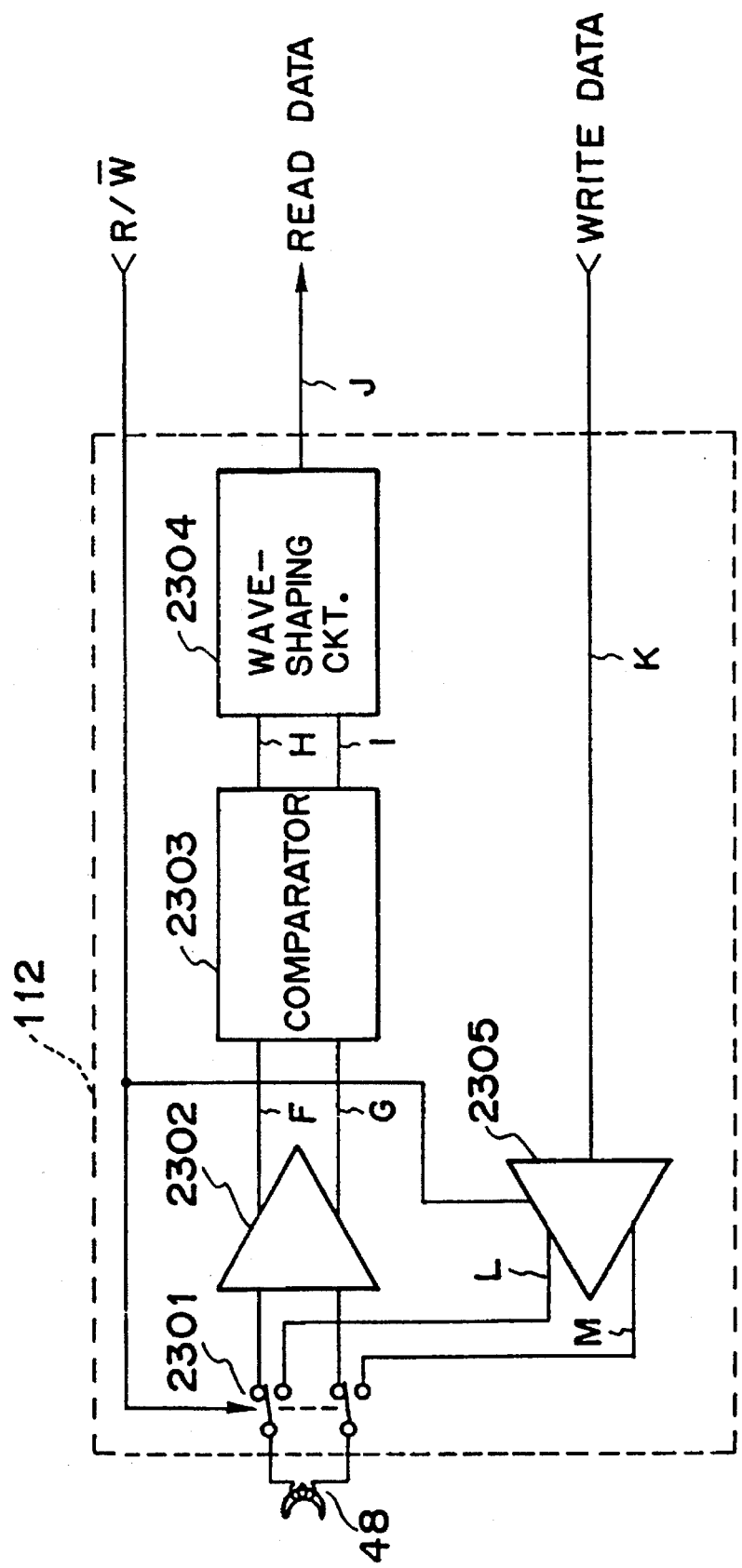
FIG. 7 is a circuit diagram showing a typical example of the configuration of the head control means shown in FIG. 1.

FIG. 7 is a drawing of a circuit showing a typical example of configuration of the head controller 112 shown in FIG. 1.

Figure 8:
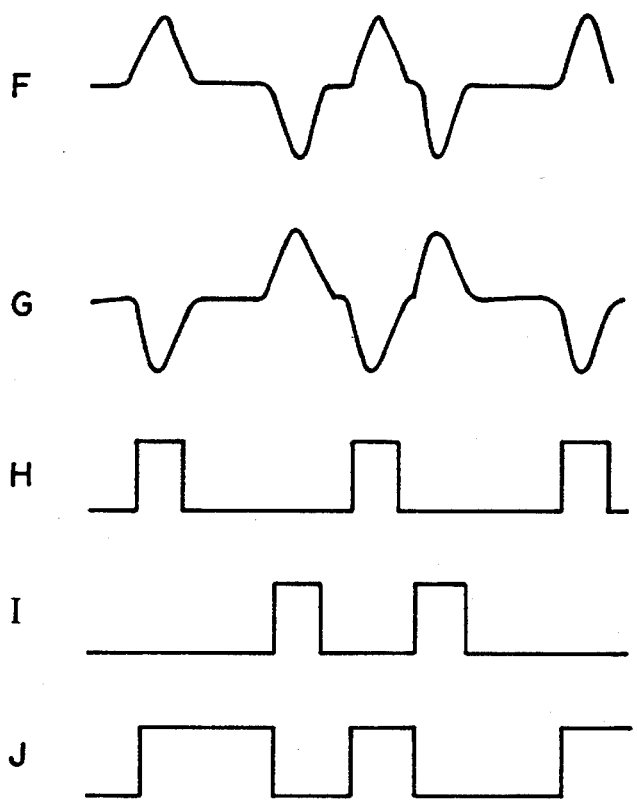
FIGS. 8 and 9 are drawings respectively showing the waveforms output from the sections shown in FIG. 7.

In FIG. 7, reference numeral 2301 denotes switching means for connecting the magnetic head 48 to a data reading or writing circuit system. The switching means 2301 is controlled by a R/W signal which is sent from the microcomputer 103 and which is at a high level during data reading. Reference numeral 2302 denotes a differential amplifier for reading data to which the voltage generated in the magnetic head 48 is input as a differential input and which outputs the amplified signals F and G shown in FIG. 8. Reference numeral 2302 denotes a comparator to which the above signals F and G are input, which generates as output digital signals H, I shown in FIG. 8 and which comprises a comparator with hysteresis. Reference numeral 2304 denotes a waveform shaping ciructit which shapes the signals H, I output from the comparator 2303 to the signal waveform shown by J in FIG. 8 and which outputs as READ DATA the signal J to the microcomputer 103. Reference numeral 2305 denotes a circuit for changing the WRITE DATA (signal K) output from the microcomputer 103 into a writing current for the magnetic head 48.

Figure 9:
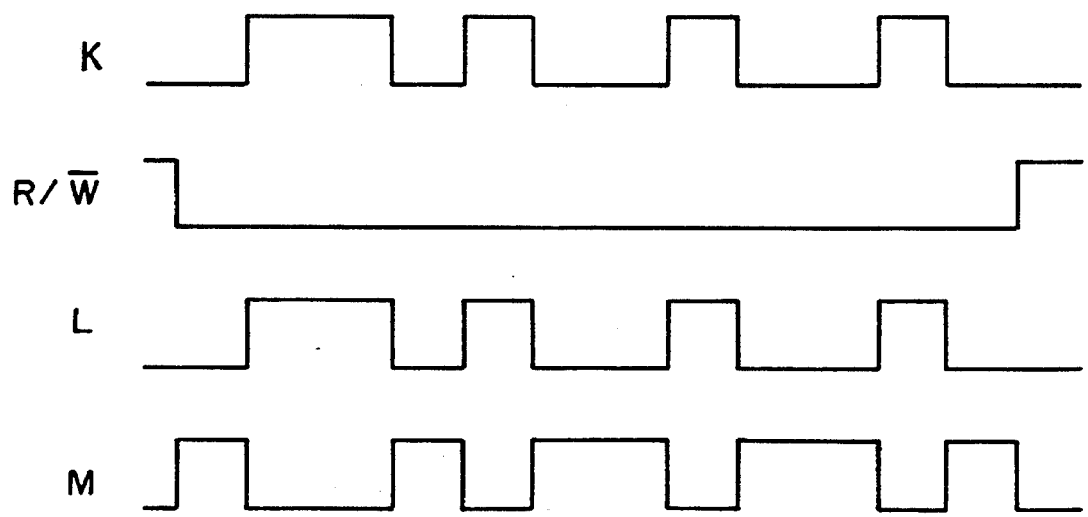

FIG. 9 shows the WRITE DATA (signal K) and the signals L, M output from the driver 2305 relative to the R/W signal for controlling the switching means 2301.

Figure 10:
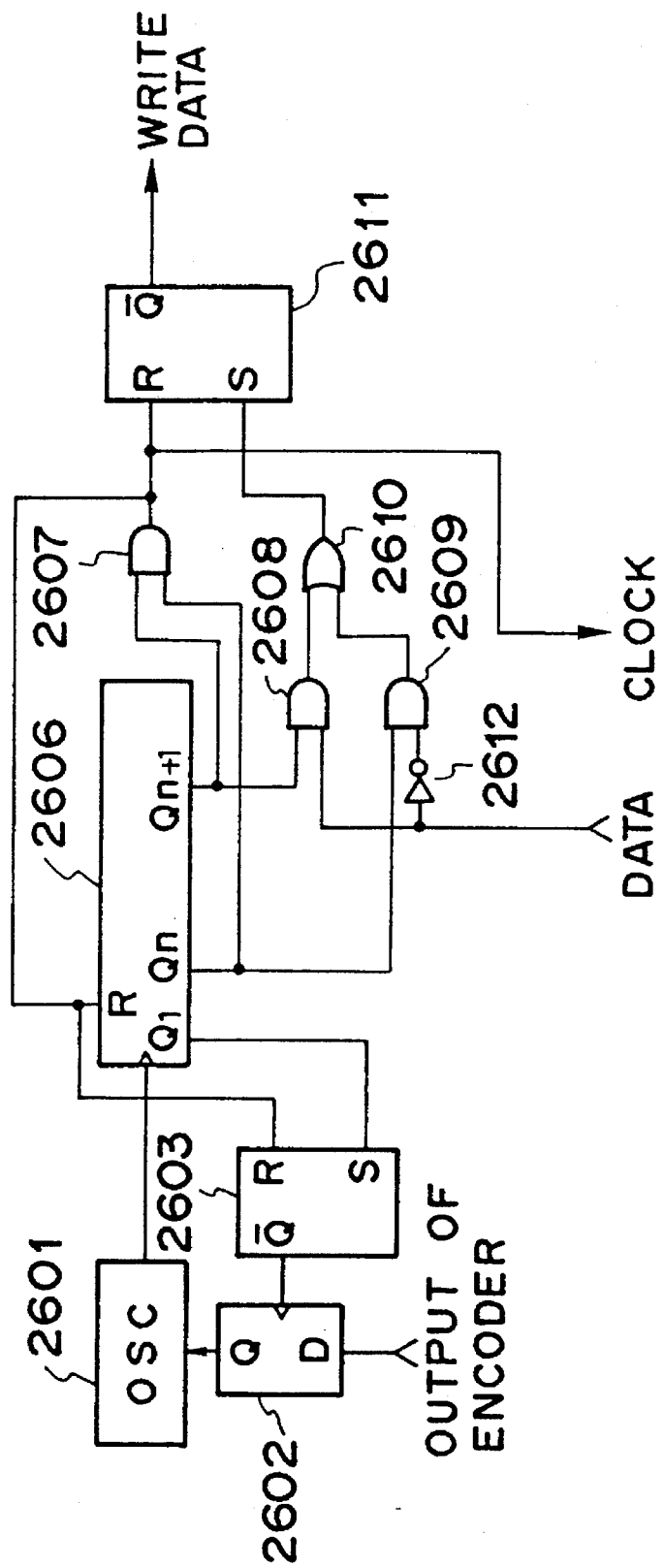
FIG. 10 is a circuit diagram showing, by hardware, the configuration in the case of hardware processing for determining a writing frequency performed in the microcomputer shown in FIG. 1.

FIG. 10 is a drawing of a circuit for explaining, by hardware, the method of determining the writing frequency in Step 101 shown in FIG. 2B.

In FIG. 10, reference numeral 2601 denotes an oscillator for determining the writing frequency which is controlled by the output from a latch 2602.

In this case, data is recorded by a self clocking system. The system is described below with reference to the signal K shown in FIG. 9. In FIG. 9, the leading edge is a clock signal showing a data end, and the trailing edge is a data signal. If a pulse width of a high level is less than ½ of one period between the respective clock signals, one logical level is shown, while if the pulse width is greater than ½ of one period, the reverse logical level is shown. The signal K shown in FIG. 9 thus shows the input of the WRITE DATA signal in a time series of, for example, [0111].

The latch 2602 functions to sample the signal generated by processing the output from the encoder circuit 108 at the timing of a latch 2603. Namely, sampling is performed from the time a reset signal is output from an AND gate 2607 to the time the output terminal $Q_1$ of a counter 2606 is put into a high level. In fact, the signal is latched at the rising point of the reset signal. This is because the reset signal is synchronized with the rising of the clock signal which is one period of the writing signal, and a change in the frequency during one period easily produces an error in the data signal when the writing frequency is higher than the period of the output from the encoder circuit 108.

The counter 2606 counts the pulses generated from the oscillator 2601, and the logical product of the output terminals $Q_n$ and $Q_{n+1}$ of the counter 2606 is output from the AND gate 2607. The logical product is used as a CLOCK signal, for example, for setting forward the RAM address of written data and as the reset signal for the latch 2611. The logical product also serves as the leading edge of the WRITE DATA for the latch 2611. In regard to a trailing edge, for example, one of the AND gates 2608 and 2609 is selected depending upon the state wherein DATA of RAM is in a high or low level, and the timing of the output terminal $Q_n$ or $Q_{n+1}$ is selected so that the position of a trailing edge is controlled by setting the latch 2611 through an OR gate 2610. If the logical product of the output from the output terminals $Q_n$ and $Q_{n+1}$ is "1", the width of $Q_n$ is ⅓, and the width of $Q_{n+1}$ is ⅔.

In this embodiment, the roller member 23 for feeding the film at a lower speed than the feed speed of the film by the film take-up spool 7 is provided as a film feed means, and the means (comprising the pulse plate 25, the armatures 26, 27 and the encoder circuit 108) for detecting the rotational speed of the roller member 23, i.e., the traveling speed of the film 34, is provided in linkage to the rotation of the roller member 23 so that when a sudden change in the feed speed of the film is detected by the means, since it is considered that the film 34 is successfully wound on the film take-up spool 7, the writing of data by the magnetic head 48 is immediately started. It is therefore possible to effectively use the magnetic storage section provided on the film 34. This enables writing or reading of data by using the magnetic head 48 at appropriate timing.

Although this embodiment concerns a type in which the fork, roller member and film take-up spool are respectively driven (referred to as "FRS driving system" hereinafter), as shown in FIG. 11, an embodiment is not limited to this type, and the same effects as those described above can be obtained by a type (generally called "FS driving system") in which the fork and film take-up spool are driven for feeding the film. In this case, no driving force is transmitted to the roller member which is thus rotated by the frictional force generated when the film is moved in contact with the roller member.

FIGS. 27 to 37 illustrate another embodiment of the present invention.

Figure 28:
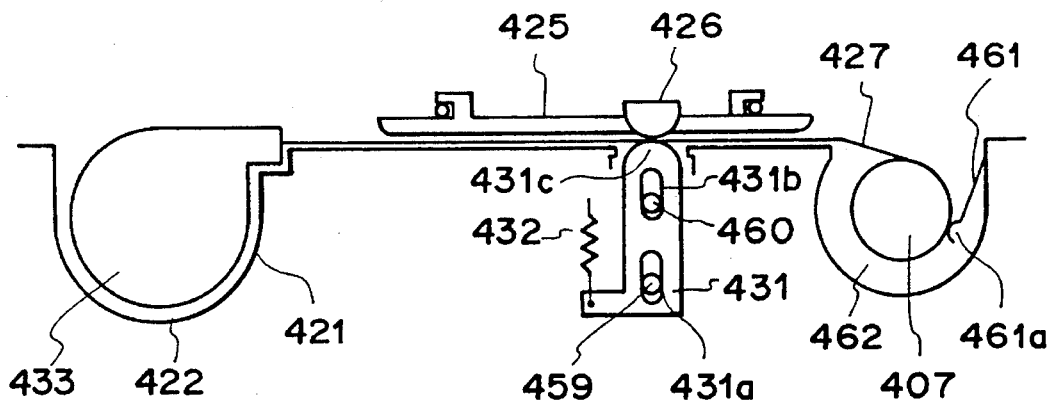
FIG. 28 is a plan view showing a portion of the camera shown in FIG. 27.
Figure 29:
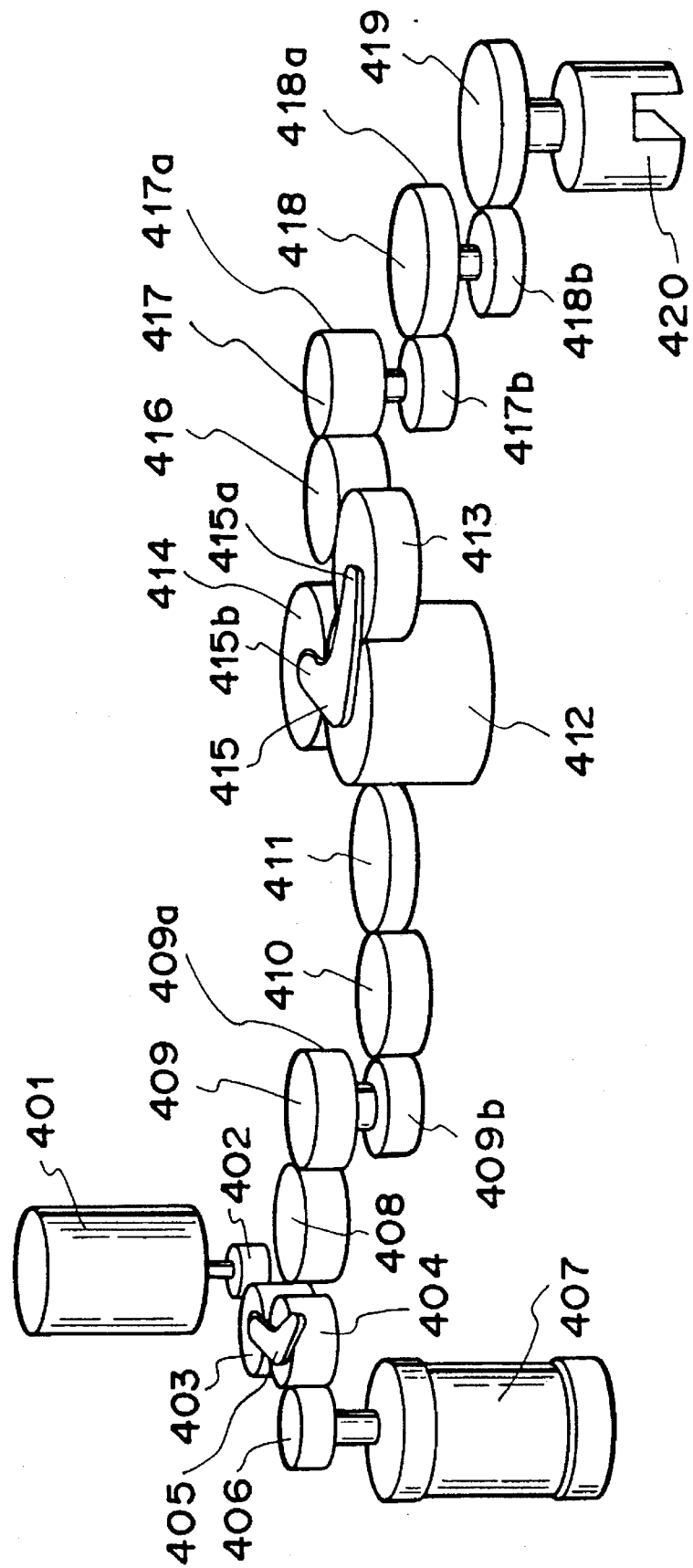
FIG. 29 is a perspective view showing a film feed mechanism of the camera shown in FIG. 27.
Figure 30:
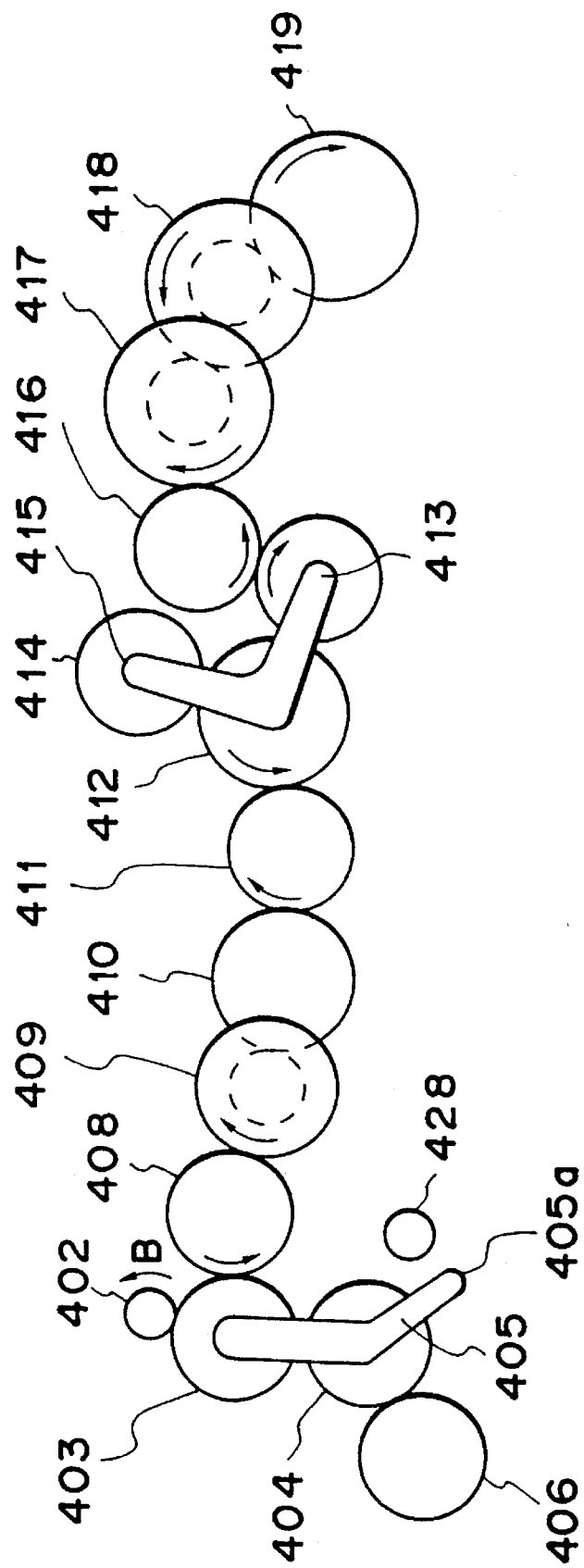
FIG. 30 is a plan view showing the gear train of the camera shown in FIG. 27 at the time of winding the film.
Figure 31:
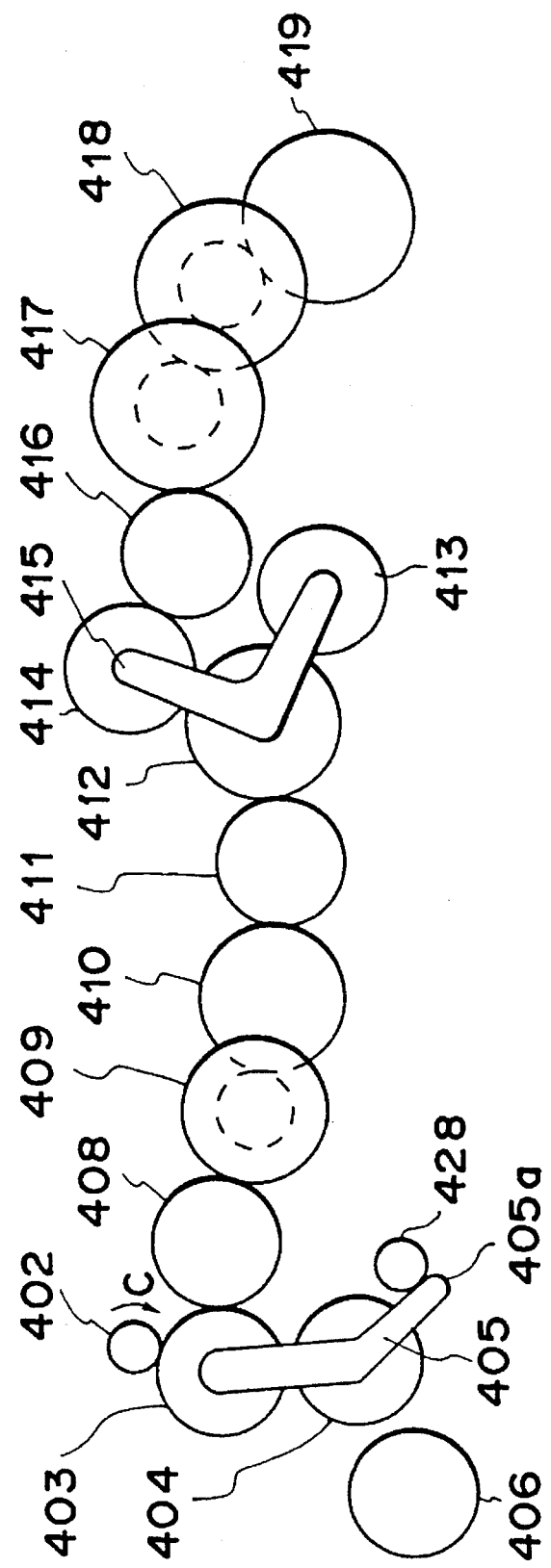
FIG. 31 is a plan view showing the gear train of the camera shown in FIG. 27 at the time of rewinding the film.
Figure 32:
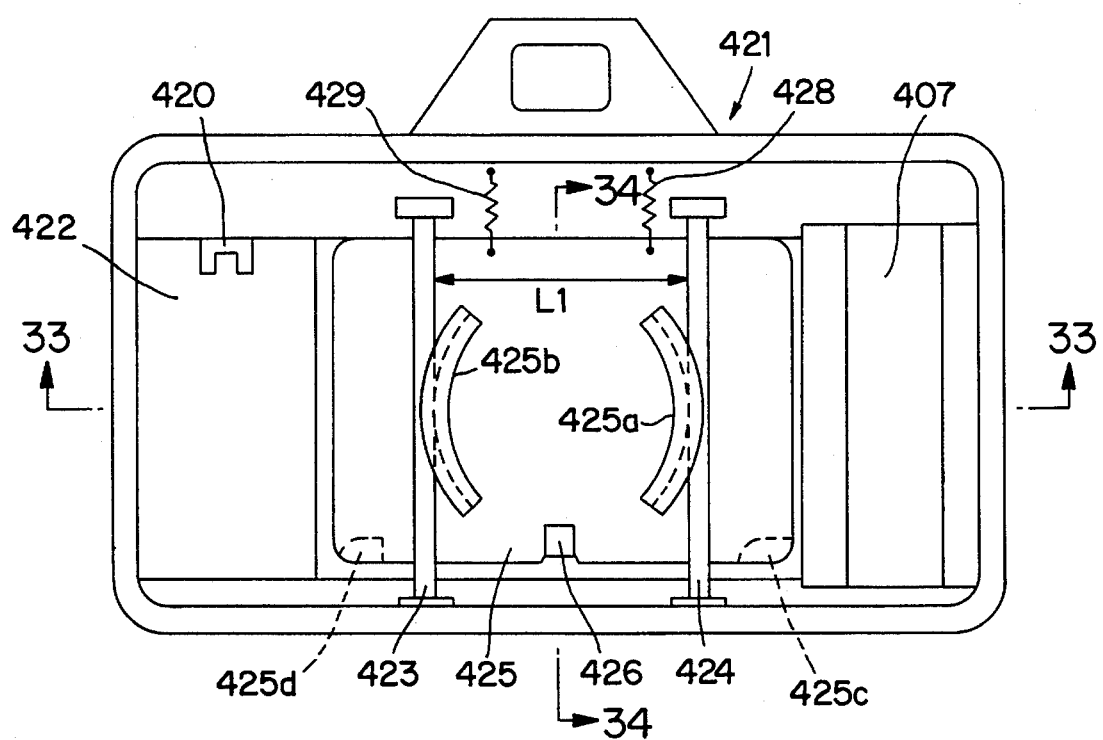
FIG. 32 is a rear view showing the camera shown in FIG. 27 from which the back cover is omitted.
Figure 33:
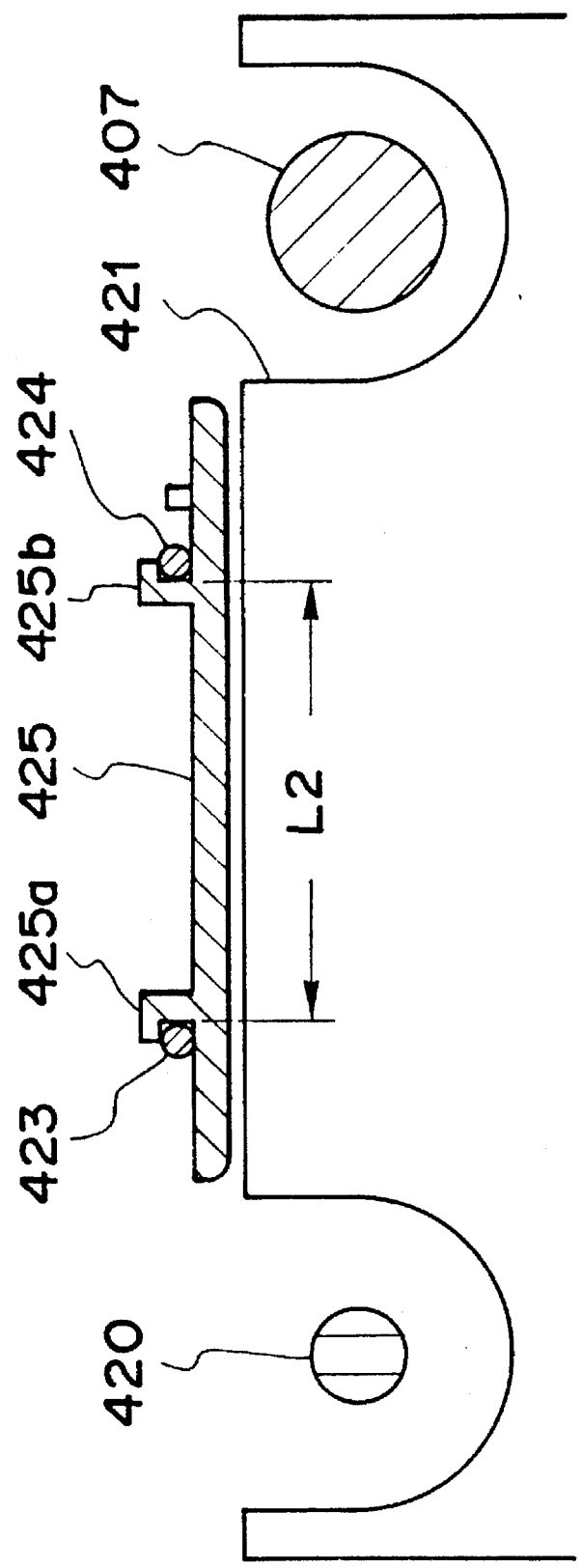
FIG. 33 is a cross sectional view taken along line A—A of FIG. 32.
Figure 34:
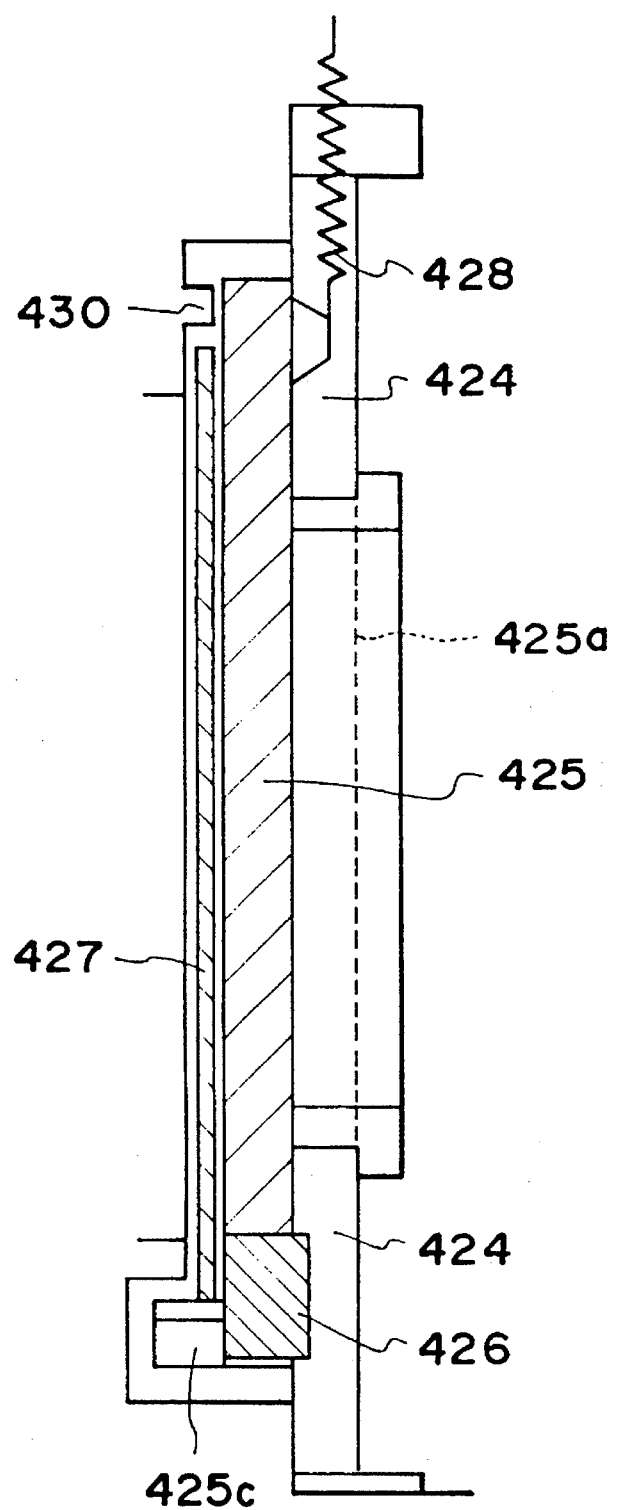
FIG. 34 is a cross sectional view taken along line B—B of FIG. 32.

FIGS. 28 to 34 illustrate the mechanical arrangement according to this embodiment, where FIG. 28 is a lateral cross sectional view showing a portion of the camera, FIG. 29 is a perspective view which illustrate a film feed mechanism, FIG. 30 is a plan view showing the gear train when the film is wound, FIG. 31 is a plan view showing the gear train when the film is rewound, FIG. 32 is a rear view showing the camera where the back cover is omitted from the illustration, FIGS. 33 is a cross sectional view taken along line A—A of FIG. 32 and FIG. 34 is a cross sectional view taken along line B—B of FIG. 32.

Referring to the drawings, reference numeral 401 denotes a film driving motor which is rotated in a normal direction (the direction of arrow B in FIG. 30) during winding of the film and in a reverse direction (the direction of arrow C in FIG. 31) during rewinding of the film. Reference numeral 402 denotes a pinion gear fixed to the rotational shaft of the motor 401. Reference numeral 403 denotes a first sun gear engaged with the pinion gear 402. Reference numeral 404 denotes a first planetary gear engaged with the first sun gear 403. Reference numeral 405 denotes a first connecting lever for establishing a connection between the first sun gear 403 and the first planetary gear 404 and as well as rotatably holding the first planetary gear 404 while generating a frictional force with the first planetary gear 404 so that the first planetary gear 404 revolves around the first sun gear 403 which serves as the center of revolution by the rotation of the first sun gear 403. The first sun gear 403, the first planetary gear 404 and the first connecting lever 405 form a known planetary gear mechanism. Reference numeral 406 denotes a spool gear to be engaged with the first planetary gear 404 only when the film driving motor 401 is rotated in a normal direction. Reference numeral 407 denotes a film take-up spool fixed to the spool gear 406 so as to be moved integrally therewith.

Reference numeral 408 denotes a first idler gear which is always engaged with the first sun gear 403. Reference numeral 409 denotes a first two-speed gear having a large gear portion 409a and a small gear portion 409b, the large gear portion 409a being engaged with the first idler gear 408. Reference numeral 410 denotes a second idler gear which is engaged with the small gear portion 409b of the first two-speed gear 409. Reference numeral 411 denotes a third idler gear which is engaged with the second idler gear 410. Reference numeral 412 denotes a second sun gear which is engaged with the third idler gear 411. Reference numeral 413 denotes a second planetary gear which is engaged with the second sun gear 412. Reference numeral 414 denotes a third planetary gear which is, similarly to the second planetary gear 413, engaged with the second sun gear 412. Reference numeral 415 denotes a second connecting lever having arm portions 415a and 415b for establishing a connection between the second sun gear 412 and the second planetary gear 413 and between the second sun gear 412 and the third planetary gear 414 so as to rotatably hold each of the planetary gears while generating frictional force. As a result, the second and third planetary gears 413 and 414 are able to revolve around the second sun gear 412 serving as the center of revolution when the second sun gear 412 is rotated. The second sun gear 412, the second and third planetary gears 413 and 414 and the second connecting lever 415 form a known planetary gear mechanism.

Reference numeral 416 denotes a fourth idler gear which is engaged with the second planetary gear 413 during the normal rotation of the film driving motor 401 by the counterclockwise rotation of the second connecting lever 415 around the second sun gear 412, the fourth idler gear 416 being not engaged with the third planetary gear 414. During the reverse rotation of the motor 401, the fourth idler gear 416 is engaged with the third planetary gear 414 by the clockwise rotation of the second connecting lever 415, the fourth idler gear 416 being not engaged with the second planetary gear 413. Reference numeral 417 denotes a second two-speed gear having a large gear portion 417a and a small gear portion 417b, the large gear portion 417a being engaged with the fourth idler 416. Reference numeral 418 denotes a third two speed-gear having a large gear portion 418a and a small gear portion 418b, the large gear portion 418a being engaged with the small gear portion 417b of the second two-speed gear 417. Reference numeral 419 denotes a fork gear which is engaged with the small gear portion 418b of the third two-speed gear 418. Reference numeral 420 denotes a fork which is rotated integrally with the fork gear 419 so that a supply spool (not shown) in a film cartridge 433 (refer to FIG. 28) is rotated. As a result, a film 427 is pushed out of the cartridge 433 and wound around it.

Reference numeral 421 denotes a camera body (refer to FIG. 32), 422 denotes a cartridge chamber and 423 and 424 respectively denote support shafts each of which has two end portions secured to proper portions of the camera body 421. The support shafts 423 and 424 are disposed in parallel to each other, and perpendicular to the direction of running of the film 427. According to this embodiment, each of the support shafts 423 and 424 is formed-into a cylindrical shape having a circular cross sectional shape.

Reference numeral 425 denotes a pressure plate having an upper plate (the surface opposing a surface which is positioned in contact with the film 427) has, as shown in FIG. 33, a pair of fastening portions 425a and 425b. Each of the fastening portions 425a and 425b is composed of a vertical portion, which is formed vertically with respect to the pressure plate 425, and a horizontal portion which is bent outwards perpendicularly to the vertical portion, the fastening portion having a cross sectional shape formed into a substantially L-shape. As a result, each of the fastening portions 425a and 425b projects in a direction of the optical axis. As shown in FIG. 32, the fastening portions 425a and 425b are disposed symmetrically with respect to the substantially central portion of the pressure plate 425 while having a circular shape when viewed in a plan view.

The distance L2 (refer to FIG. 33) between the outer surfaces of the two vertical portions of the fastening portions 425a and 425b is arranged to be shorter, by a certain distance, than the distance L1 (refer to FIG. 32) between the two inner surfaces of the two support shafts 423 and 424 so as to be positioned within a recessed space formed by the vertical portions of the fastening portions 425a and 425b, the horizontal portions of the same and the pressure plate 425. Therefore, the pressure plate 425 is able to move vertically (in a direction perpendicular to the direction of running of the film 427) with respect to the positions of the support shafts 423 and 424. Furthermore, the pressure plate 425 is able to rotate around the substantially central portion of the pressure plate 425. Furthermore, the horizontal portions of the fastening portions 425a and 425b hold the support shafts 423 and 424 as shown in FIG. 33 so as to restrict the longitudinal position of the pressure plate 425 in the direction of the optical axis.

As shown in FIG. 32, the pressure plate 425 has guide members 425c and 425d integrally formed with the two lower end portions of the rear side thereof. Furthermore, a magnetic head 426 is, as shown in FIGS. 32 and 34, secured to the lower portion of the rear side of the pressure plate 425 in such a manner that the head gap of the magnetic head 426 is positioned perpendicular to the direction of running of the film.

Reference numerals 428 and 429 denote springs which respectively are disposed at the cartridge chamber 422 and the film take-up spool 407 side while interposing the rotational center of the pressure plate 425. An end portion of each of the springs 428 and 429 is secured to the camera body 421, while another end of the same is secured to the pressure plate 425. As a result, the pressure plate 425 is urged in a direction in which it is pulled up. As a result, the guide members 425c and 425d of the pressure plate 425 are brought into contact with the bottom end surface of the film 427. Therefore, the pressure plate 425 is able to maintain a constant positional relation with respect to the film 427. A magnetic storage section (not shown) is formed on the surface of the film 427 adjacent to the pressure plate 425 to which a variety of information items about photographing can be written (or from which the same are read). Reference numeral 430 denotes an outer rail (refer to FIG. 34) which restricts the upward direction of the film 427.

As shown in FIG. 32, each of the guide members 425c and 425d has tapered surfaces formed in a direction from the cartridge chamber 422. As a result, the film 427 pushed out of the film cartridge accommodated in the cartridge chamber 422 smoothly downwards moves the guide members 425c and 425d against the urging force of each of the springs 428 and 429.

Reference numeral 431 denotes a pushing lever (refer to FIG. 28) disposed at a position confronting the magnetic head 426 while interposing the film 427, the pushing lever 431 having elongated holes 431a and 431b with which it is slidably fastened to pins 459 and 460 formed on the camera body 421. An end portion of the pushing lever 431 is urged by the spring 432 fastened to the camera body 421 so as to push the film 427 to the portion adjacent to the magnetic head 426 by a pushing portion 431c thereof. Reference numeral 461 denotes a roller plate (refer to FIG. 28) made of a flexible material and structured in such a manner that its end portion is fastened to the inner surface of the spool chamber 462 and its portion 461a pushes the film take-up spool 407. The roller plate 461 is provided for the purpose of making the film 427 to be easily wound around the film take-up spool 407 at the time of autoloading the film 427.

Since the structure is arranged as described above, when the film driving motor 401 (the pinion gear 402) is, as shown in FIG. 30, rotated in a direction of the arrow B (rotated in a normal direction) after the film cartridge 433 has been loaded in the cartridge chamber 422, the first sun gear 403 rotates clockwise. As a result, the first planetary gear 404 revolves clockwise around the first sun gear 403 serving as the center of revolution by the action of the first connecting lever 405 so as to be engaged with the spool gear 406. Therefore, the driving force of the film driving motor 401 is transmitted to the spool gear 406 so that the film winding spool 407 is rotated clockwise.

The driving force of the first sun gear 403 is, via the idler gear 408, transmitted to the second sun gear 412 via the first two-speed gear 409, the second idler gear 410 and the third idler gear 411. As a result, the second sun gear 412 is rotated counterclockwise so that the second planetary gear 413 and the third planetary gear 414 revolve counterclockwise around the second sun gear 412 serving as the center of revolution by the action of the second connecting lever 415. As a result, the second planetary gear 413 is engaged with the fourth idler gear 416. As a result, the B-directional driving force of the film driving motor 401 is transmitted as the counterclockwise drive force to the fourth idler gear 416. Then, the drive force is transmitted to the fork gear 419 via the second two-speed gear 417 and the third two-speed gear 418 so that clockwise rotation of the fork 420 is commenced.

According to this embodiment, the gear ratio of the gear train is arranged as follows:

Assuming that the peripheral velocity of the film take-up spool 407 is V1 and the speed of the film 427 forcibly pushed from the film cartridge 433 is V2, a relation expressed by V1> V2 is held.

Figure 35:
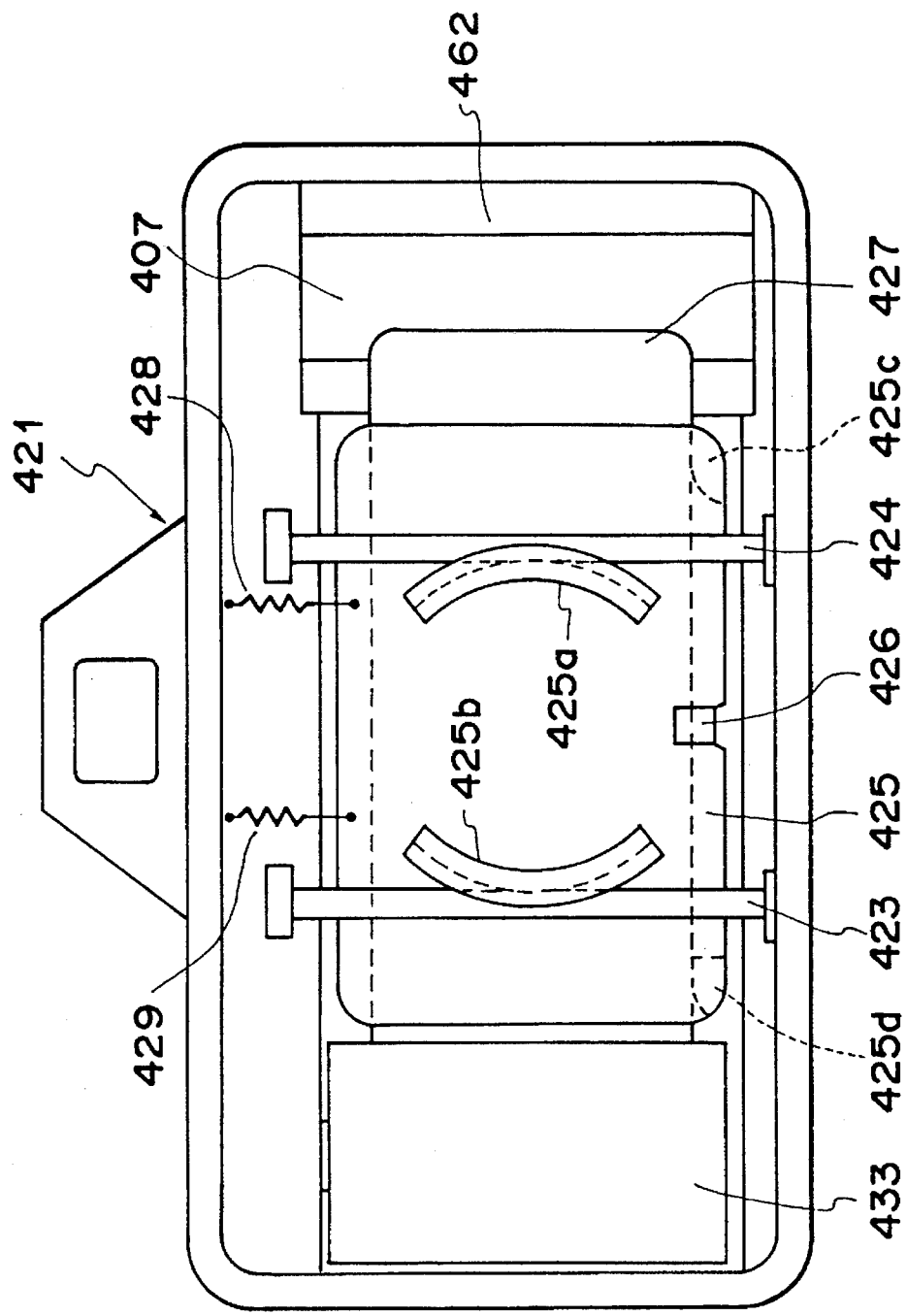
FIG. 35 is a rear view showing the camera shown in FIG. 27 in a state in which the film is being driven and from which the back cover is omitted.

In accordance with the movement of the film 427 pushed out of the film cartridge 433 by the clockwise rotation of the fork 420, the tip-end portion of the film 427 is introduced into a gap between the pressure plate 425 and the camera body 421. When the film 427 is moved to right when viewed in FIG. 32, the tip-end portion of the film comes in contact with the guide member 425d so as to move the spring 429 downwards before it passes the spring 429. As a result, at the left side positions of the film and the pressure plate are respectively the spring 429 and the guide member 425d. When the film 427 is further moved, the film tip-end portion reaches the position of the magnetic head 426. Since the pushing lever 431 is arranged in such a manner that it always pushes the film 427 to the magnetic head 426 by the action of the spring 432, the film tip-end portion is introduced into the portion between the portion 431c of the pushing lever and the magnetic head 426 against the urging force of the spring 432 while coming in contact with the same. When the film 427 is further moved, the film tip-end portion comes in contact with the guide member 425c before it downwards moves the spring 428 downwards against the urging force of the spring 428. Then, the film 427 passes the guide member 425c. As a result, the right positions of the film 427 and the pressure plate 425 are restricted by the spring 428 and the guide portion 425c. Since the magnetic head 426 and the magnetic storage section (not shown) of the film 427 has been brought into slidably contact with each other at this time, photography information can be read/written. FIG. 35 illustrates the state which has been realized hereupon. The film tip-end portion is finally wound by the film take-up spool 407. Then, film 427 is wound by only the rotation of the film take-up spool 407 realized by the film driving motor 401. The reason for this will now be described.

When the film 427 has been wound around the film take-up spool 7 as a result of the relation expressed by V1> V2, the action of the film take-up spool 407 is, via the film 427, transmitted to the fork gear 419, the third two-speed gear 418, the second two-speed gear 417 and the fourth idler gear 416 in this sequential order. As a result, the counterclockwise rotational speed of the fourth idler gear 416 is made higher than the clockwise rotational speed of the second planetary gear 413. At this time, the fourth idler gear 416 push as aside the second planetary gear 413 so that the engagement between the second planetary gear 413 and the fourth idler gear is instantaneously released and thereby the difference in the speed between them is absorbed.

Therefore, the driving speed of the film 427 is changed from V2 to V1 when the film 427 has been wound around the film take-up spool 407. The film 427 is wound around the film take-up spool 407 by a known method, in which perforations are hooked by a claw formed on the film take-up spool 407 or by means of a roller plate which is formed in the camera body portion and which pushes the film 427 to the film take-up spool 407.

The pressure plate 425 is able to move in a direction perpendicular to the direction of running of the film 427 with respect to the camera body 421 and able to rotate on a plane which parallels the surface of the film 427. Furthermore, the guide members 425c and 425d of the pressure plate 425 press a bottom end surface of the film by the actions of the springs 428 and 429. Therefore, even if the film 427 is waved during the operation in which the film is driven, the pressure plate 425 is able to follow the wave. Since the magnetic head 426 is integrally positioned with the pressure plate 425 and the guide members 425c and 425d disposed on the pressure plate 425 are brought into contact with the lower end portion of the film 427 by the springs 428 and 429 at this time, the head gap (not shown) of the magnetic head 426 can always be brought into contact with the magnetic storage section of the film 427 in a direction perpendicular to the direction of running of the film 427.

Then, the first frame of the film 427 is set, photographing is performed and the film 427 is wound to set the second frame as described later. Then, the operation of rewinding the film 427 will now be described.

Referring to FIG. 31, when the film driving motor 401 is rotated in a direction of arrow C, the first connecting lever 405 and the first planetary gear 404 revolve around the first sun gear 403 serving as the center of revolution until the end portion 405a of the first connecting lever 405 comes in contact with the stopper 428. Therefore, the engagement between the first planetary gear 404 and the spool gear 406 is released.

At this time, the second sun gear 412 is rotated clockwise, causing the second planetary gear 413 and the third planetary gear 414 to revolve clockwise around the second sun gear 412 serving as the center of revolution by the action of the second connecting lever 415. Therefore, the engagement between the fourth idler gear 416 and the second planetary gear 413 is released, but the fourth idler gear 416 and the third planetary gear 414 are engaged with each other. Therefore, the fork gear 419 is rotated counterclockwise so that the supply spool 433b in the film cartridge 433 is reversely rotated by the fork 420. As a result, the accommodation of the film 427 into the cartridge 433 is commenced.

Figure 27:
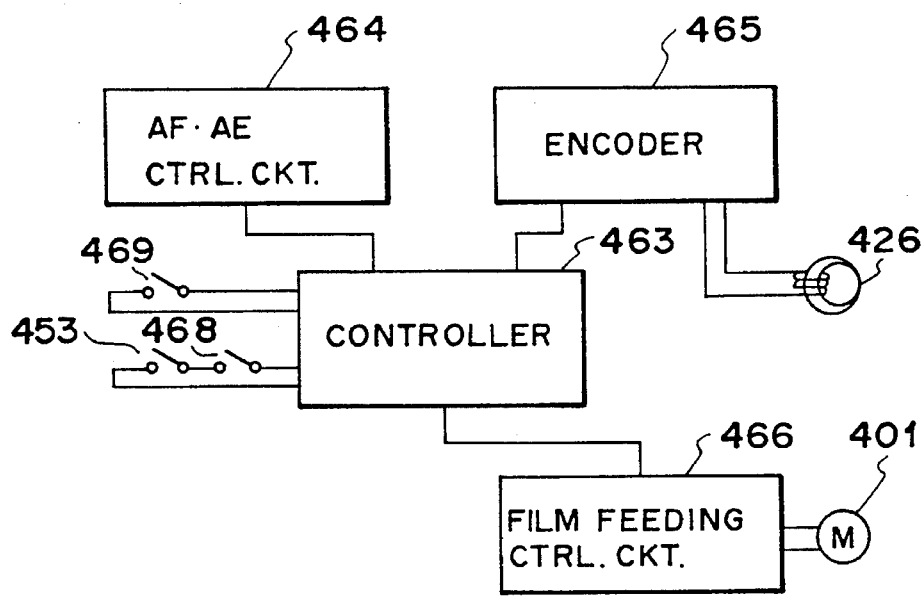
FIG. 27 is an electrical block diagram for a camera according to another embodiment of the present invention.

FIG. 27 is an electrical block diagram according to this embodiment.

Referring to FIG. 27, reference numeral 463 denotes a control circuit comprising a microcomputer or the like which controls the action of the overall camera. Reference numeral 464 denotes an AF•AE control circuit including a distance-measuring circuit for measuring the distance from a subject and a photometry circuit and performing the focusing operation of a photographing lens (not shown) and the shutter opening/shutting operation which controls exposure of the film 427 in accordance with the brightness of the subject field. Reference numeral 465 denotes a magnetic head drive circuit for driving the magnetic head 426 so as to read information to and from the magnetic storage section of the film 427. Reference numeral 466 denotes a film drive control circuit for controlling the rotation of the film driving motor 407. Reference numeral 468 denotes a cartridge detection switch which is switched on when the film cartridge 433 is loaded in the cartridge chamber 422. Reference numeral 453 denotes a cartridge cover opening/closing switch connected in series with the cartridge detection switch 468. Reference numeral 469 denotes a release switch with which the camera shutter release operation is commenced when it is manually switched on.

Then, the operation of the structure according to this embodiment will now be described with reference to flow charts shown in FIGS. 36 and 37 which illustrate the operation of the control circuit 463.

(Step 200) The film cartridge 433 is loaded in the cartridge chamber 422 before the cartridge cover is closed. As a result, both the cartridge cover opening/closing switch 453 and the cartridge detection switch 468 are switched on. Then, the flow moves to step 201.

(Step 201) An included timer is reset.

(Step 202) Since the film cartridge 433 is loaded, a winding commencement signal is transmitted to the film drive control circuit 466. As a result, the film driving motor 401 is rotated in the direction of arrow B so that the film 427 is pushed out of the film cartridge 433 via the above-described gear train.

(Step 203) Immediately after the winding signal has been transmitted to the film drive control circuit 466, the timer counting operation is commenced.

When the rotation of the film drive motor 401 is commenced due to the operation of the film drive control circuit 466 in step 202, the film 427 is pushed out of the film cartridge 433. An assumption is made that it takes a time Ta to make the film driving speed to be made a stable constant speed from the transmission of the winding commencement signal due to the first transition characteristics of the motor 401, the inertia force of the gear train, the backlash of the gear train, the play between the fork 420 and the supply spool in the film cartridge 401 and the like. Time Ta is, of course, longer than a time required for the film 427 to pass the position of the magnetic head 426.

(Step 204) It is discriminated whether or not the timer has counted to a predetermined time T1 (where T1≧Ta). If the timer has not, the flow returns to step 202. If the same has not become predetermined time T1, has elapsed the flow moves to step 205.

(Step 205) The time counting operation performed by the timer is stopped.

(Step 206) Since the film driving speed has been stabilized as described above at this time, information about the film recorded in the magnetic storage section of the film 427, for example, a predetermined number of film frames, the film sensitivity, the film type and the like are read out by the magnetic head 426 (or information is written if necessary).

(Step 207) A photo-interrupter (not shown) counts a known means, for example, perforations (not shown) of the film 427 so that the feed amount of the film 427 is calculated. As an alternative to this, the feed amount of the film 427 is calculated by measuring the time in which the film driving motor 401 has been driven. Thus, a determination is made whether or not the first frame has reached the aperture portion. The film driving is continued until the first frame reaches the above-described portion. If a determination is made that the first frame has reached the aperture portion, the flow moves to step 208.

(Step 208) The operation of the film driving motor 401 is stopped by the operation of the film drive control circuit 466 so that the winding of the film 427 is stopped.

After the above-described operations have been completed, the flow moves to step 209 shown in FIG. 37.

(Step 209) It is discriminated whether or not the switch 469 has been switched on due to the fact that the first stroke of a release button (not shown) has been made. Thus, the flow moves to step 210 in accordance with the result of determination whether or not the switch 469 has been switched on.

(Step 210) The AF•AE control circuit 64 is operated so as to measure the brightness of the subject and calculate distance information (distance measurement information). Then, in accordance with information thus-obtained, the photographing operation such as the focusing operation performed by the photographing lens (not shown) and the exposure operation performed by controlling the shutter are performed.

(Step 211) A comparison is made between the number of the releasing operations performed or the feed amount of the film and the predetermined number of film frames read in step 206 so as to determine whether or not there are residual frames. If no frame remains, the flow moves to step 219. If there is a residual frame, the flow moves to step 212.

(Step 212) The film drive control circuit 466 is driven so as to commence setting of the next frame.

(Step 213) Time counting performed by the inner timer is commenced.

(Step 214) It is discriminated whether or not the timer counted to the predetermined time T2 (where T2≧Ta). If the timer has not, the flow remains in step 214. If the predetermined time T2 has elapsed, the flow moves to step 215. The reason for this lies in that the magnetic head 426 is driven after the film driving speed becomes a stable constant speed while, similarly to the above-described operation, overcomer the above-described first transition characteristics of the film driving motor 401, the inertia force of the gear train, the backlash of the gear train, the play between the fork 420 and the supply spool in the film cartridge 433 and the like.

(Step 215) The timer counting operation is stopped.

(Step 216) When the magnetic head 426 is driven by the operation of the magnetic head drive circuit 465 when the operation of winding the film 427 to set the next frame is commenced, photography information (information, such as shutter speed, the diaphragm value, data and the like) in step 210 is written to the magnetic storage section of the film 427.

(Step 217) It is discriminated whether or not one-frame winding of the film 427 has been made by, for example, similarly to the above-described method, counting the perforations of the film 427 by a photo-interrupter (not shown) or by measuring the number of revolutions of the roller positioned in contact with the film 427. If the one-frame winding has been made, the flow moves to step 218.

(Step 218) The operation of the film driving motor 401 is stopped by the operation of the film drive control circuit 466 so as to stop the operation of winding the film 427 before the flow returns to step 209.

(Step 219) Sine there is no residual frame in the film 427, rewinding of the film 427 (wound to the film cartridge 433) is commenced by driving the film driving motor 410 in a direction of arrow C (in a direction of rewinding of the film 427) by operating the film drive control circuit 466.

(Step 220) The operation of the included timer is commenced.

(Step 221) It is discriminated whether or not the timer has counted to the predetermined time T3 (where T3≧Ta). If the timer has not, the flow remains in this step. If the the predetermined time T3 has elapsed, the flow moves to step 222. The reason for this lies in that the magnetic head 426 is driven after the film driving speed becomes a stable constant speed while, similarly to the above-described operation, to overcome the above-described first transition characteristics of the film driving motor 401, the inertia force of the gear train, the backlash of the gear train, the play between the fork 420 and the supply spool in the film cartridge 433 and the like.

(Step 222) The counting operation performed by the timer is stopped.

(Step 223) The magnetic head 426 is driven by the operation of the magnetic head drive circuit 465 when the operation of rewinding the film 427 into the film cartridge 433 is performed. As a result, photography information (information such as shutter speed, the diaphragm value, data and the like) in step 410 is written to the magnetic storage section of the finally photographed frame of the film 427.

(Step 224) If the fact that the film 427 is rewound into the film cartridge 433 until the film 427 is perfectly rewound in the film cartridge 433 is detected by a known means, for example, by a supply of a signal from an input means (not shown) made upon a determination made by a user, in accordance with a fact that the film rewinding operation has taken a predetermined time or by detecting the position of the film 427 has been detected by the above-described photo-coupler, the flow moves to step 225. If the same has not been detected, the flow returns to step 219.

(Step 225) The operation of the film driving motor 1 is stopped by the action of the film drive control circuit 466 before the overall operation of the camera is stopped.

Figure 38:
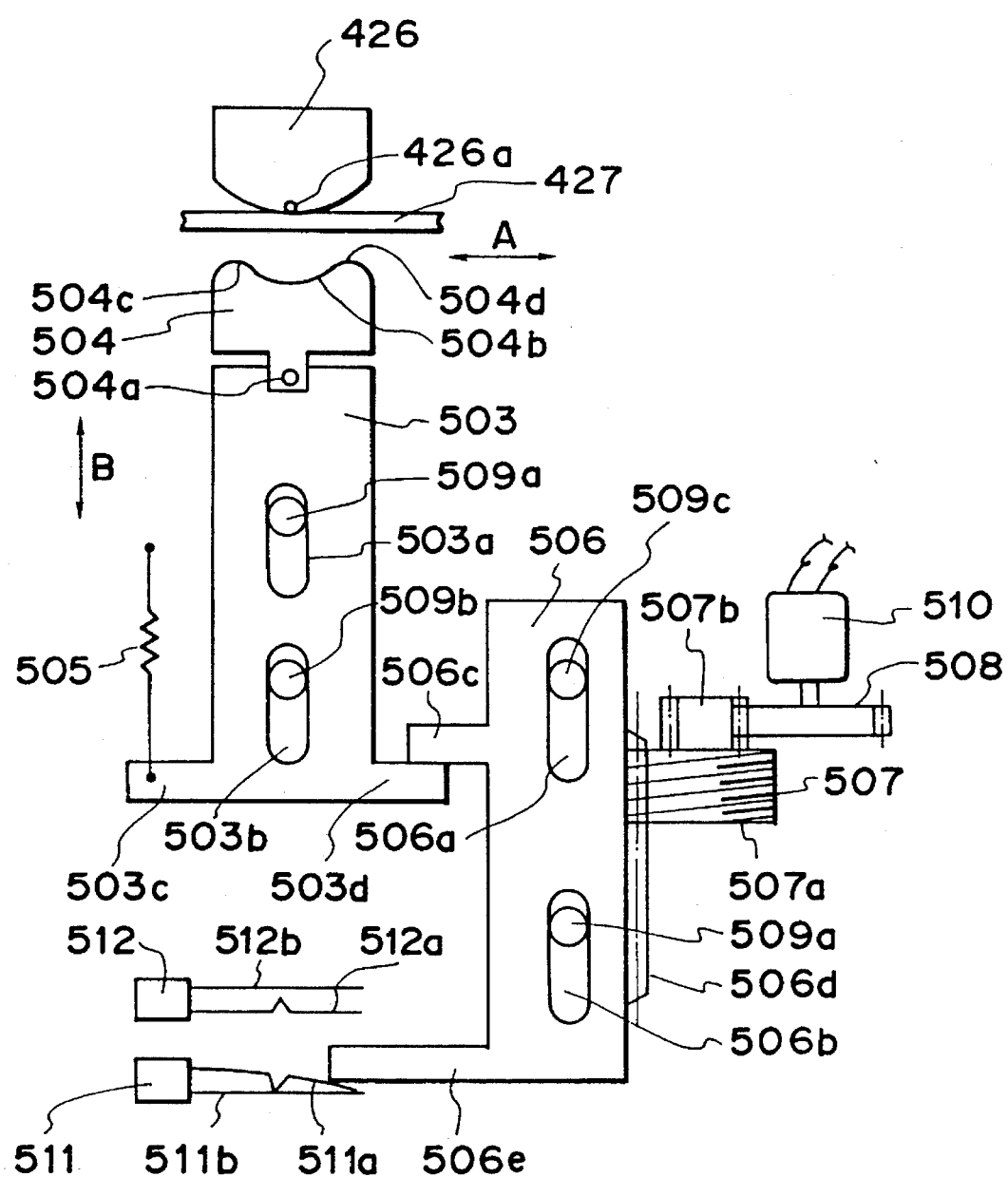
FIG. 38 is a plan view showing the status of each element when the magnetic head is not being operated according to another mechanical example of the embodiment shown in FIG. 27.
Figure 39:
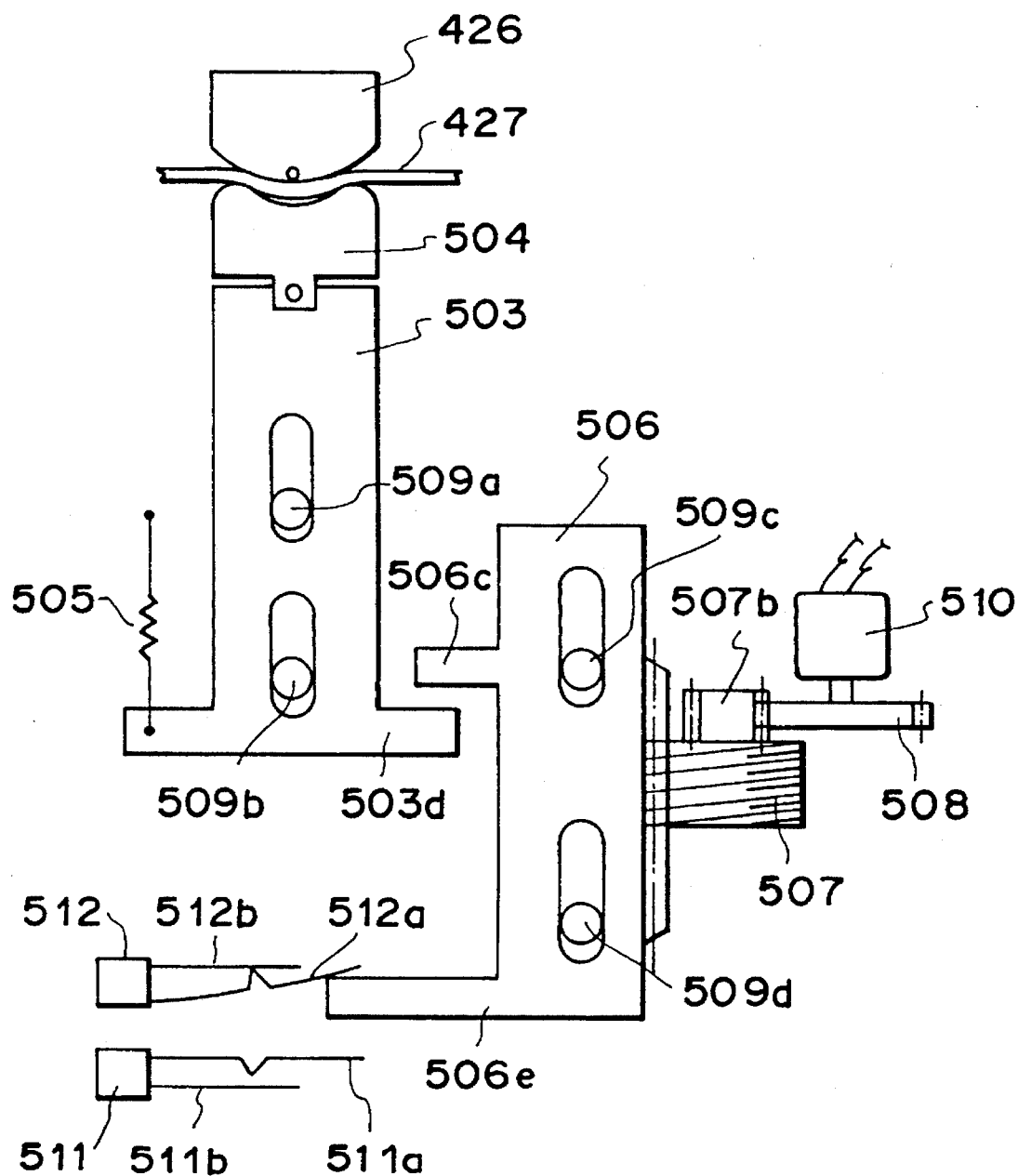
FIG. 39 is a plan view showing the status of each element when the magnetic head shown in FIG. 38 is being operated.

FIGS. 38 and 39 illustrate another mechanical structure according to this embodiment.

Referring to FIGS. 38 and 39, reference numeral 426 denotes a magnetic head, which is arranged similarly to the above-described element, for recording/reading information to and from the magnetic storage section of the film 427 running in a direction of arrow A shown in FIG. 38, the magnetic head 426 being fastened to a camera body (not shown) or a base plate of the camera or the film pressure plate. Reference numeral 426a denotes a head gap and reference numeral 503 denotes a pushing lever having elongated holes 503a and 503b fitted by projections 509a and 509b formed on a base plate (not shown), the pushing lever 503 being able to slidably move in a direction of arrow B shown in FIG. 38. Reference numeral 504 denotes a pad fastened to the pushing lever 503 at a portion 504a thereof, the pad 504 moving in synchronization with the pushing lever 503. The pad 504 has film contact portions 504b, 504c and 504d arranged in such a manner that the film contact portion 504b is formed into a recessed shape and 504c and 504d are respectively formed into projecting shapes. The film contact portions 504c, 504b and 504d form a substantially U-shape like portion.

Reference numeral denotes a spring having an end portion fastened to the base plate (not shown) and another end portion fastened to a spring retaining portion 503c of the pushing lever 503 so that the pushing lever 503 is urged in an upward direction when viewed in FIG. 38. Reference numeral 506 denotes a rack lever having elongated holes 506a and 506b fastened by projections 509c and 509d formed on the base plate (not shown) and arranged to be able to slidably move in the direction of B shown in FIG. 38. The rack lever 506 further has an arm portion 506c which can be engaged to an arm portion 503d of the pushing lever 503. Reference numeral 507 denotes a worm member rotatably fastened to the base plate (not shown) and composed of a worm wheel portion 507a and a gear portion 507b, the worm wheel portion 507a being engaged with a rack portion 506d of the rack lever 506. Reference numeral 508 denotes a spur gear which is engaged with the gear portion 507b of the worm member 506, the spur gear 508 being secured to the rotational shaft of a pad drive motor 510 fastened to the base plate (not shown).

The structure is arranged in such a manner that the pad drive motor 510 is able to rotate normally/reversely so that the rack lever 506 is moved upwards when the same is rotated in a normal direction and the rack lever 506 is downwards moved when the same is rotated in a reverse direction.

Reference numeral 511 denotes a switch fastened on the base plate (not shown) and having a contact piece 511a which is able to be brought into contact with an arm portion 506e of the rack lever 506. When the two contact pieces 511a and 511b are electrically connected to each other, the rotation of the pad drive motor 510 which causes the rack lever 506 to be moved downwards when viewed in the drawing is inhibited. Reference numeral 512 denotes a switch fastened to the base plate (not shown) and having a contact piece 512a which can be brought into contact with the arm portion 506e of the rack lever 506. When the two contact pieces 512a and 512b are electrically connected with each other, the rotation of the pad drive motor 510 which causes the rack lever 506 to be moved upwards when viewed in the drawing is inhibited.

FIG. 38 illustrates the positional relation between the above-described elements realized when the magnetic head 426 is not operated. In this status, the arm portion 506c of the rack lever 506 and the arm portion 503d of the pushing lever 503 are engaged to each other. Therefore, the upward movement of the pushing lever 503 when viewed in FIG. 38 is restricted, causing the contact between the film 427 and the pad 504 to be prevented. Therefore, the flatness of the film 427 cannot be affected adversely. At this time, the contact pieces 511a and 511b are electrically conducted to each other, causing the further vertical movement of the rack lever 506 to be prevented.

FIG. 39 illustrates the positional relation between the elements realized when information is written/read to and from the magnetic storage section of the film 427 by the magnetic head 426. By rotating the pad drive motor 510 in the state shown in FIG. 38, the state shown in FIG. 39 is realized. That is, when the pad drive motor 510 is rotated in a normal direction, the rack lever 506 is, via the worm portion 507 upwards moved when viewed in FIG. 12. As a result, the positional restriction of the pushing lever 503 caused by the rack lever 506 is released. Therefore, the pushing lever 503 is moved upwards by the urging force of the spring 505 until it stops while pushing the film 427 to the magnetic head 426 by the pad 504 rotatably fastened to the tip-end portion thereof. In this state, the energy supply to the pad drive motor 510 is stopped in accordance with the action of the switch 112 arranged to act with the time in which energy is supplied or in accordance with the movement of the rack lever 506. As a result, the operation of the pad drive motor 510 is stopped, causing also the operation of the rack lever 506 to be prevented.

Since the film 427 is correctly pushed to the magnetic head 426 in this state, writing/reading of information to and from the magnetic storage section of the film 427 can assuredly be performed. At the time of reading/writing information, the film 427 is, of course, driven in the direction of arrow A shown in FIG. 38.

When information writing/reading has been completed as described above, the electricity is reversely supplied to the pad drive motor 510. As a result, the pad drive motor 510 is reversely rotated, causing the rack lever 506 to commence its downward movement when viewed in FIG. 39. Therefore, the arm portion 506c of the rack lever 506 commences engaging with the arm portion 503 of the pushing lever 503. Therefore, also the pushing lever 503 commences its downward movement against the urging force of the spring 505 when viewed in FIG. 39. Therefore, the pad 504 commences a movement away from the surface of the film 427. Then, the energy supply to the pad drive motor 510 is stopped in accordance with the status change of the switch 511 (it may be replaced by a control of the time in which energy is supplied to the pad drive motor 510) which detects the initial position of the rack lever 506 or the pad 504. Therefore, each of the elements are returned to the state shown in FIG. 38.

Figure 40:
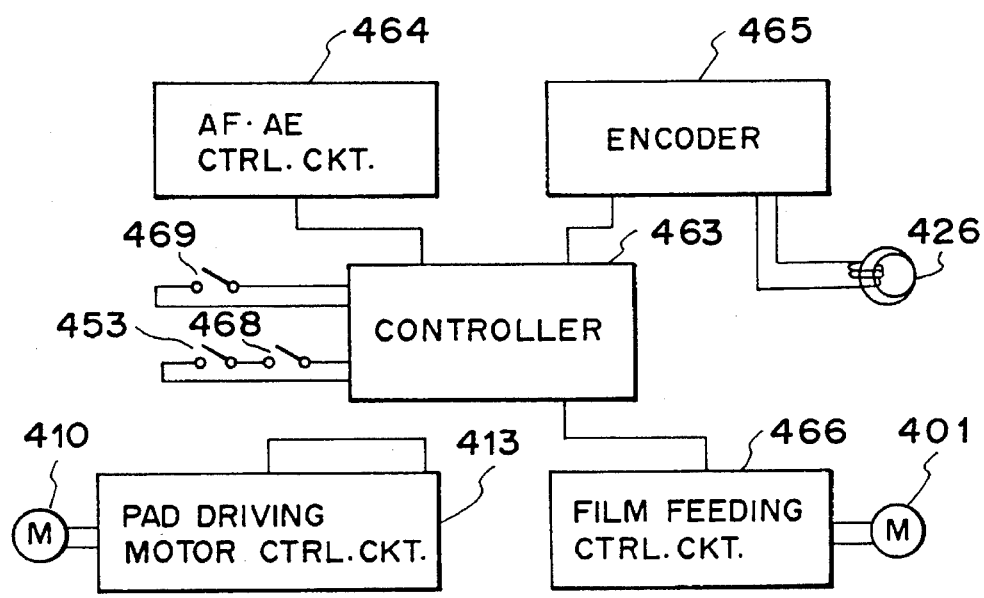
FIG. 40 is a block diagram for a camera according to the example shown in FIG. 38.

FIG. 40 illustrates the structure of a circuit for controlling the operation of the above-described mechanical structure, where the elements having the same function as those shown in FIG. 27 are given the same reference numerals.

Referring to FIG. 40, reference numeral 513 denotes a pad drive motor control circuit for controlling the operation of the pad drive motor 510.

Figure 36:
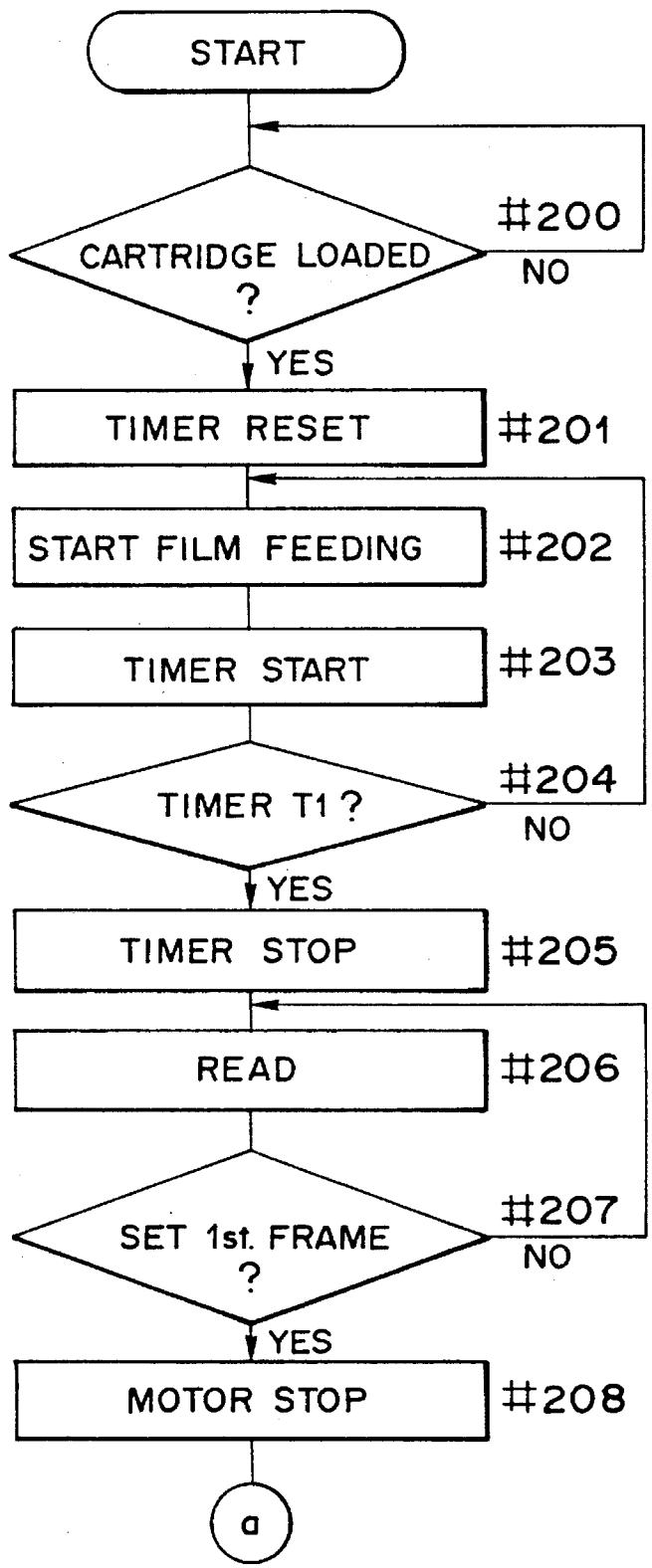
FIG. 36 is a flow chart showing a portion of the operation performed by the control circuit shown in FIG. 27.
Figure 41:
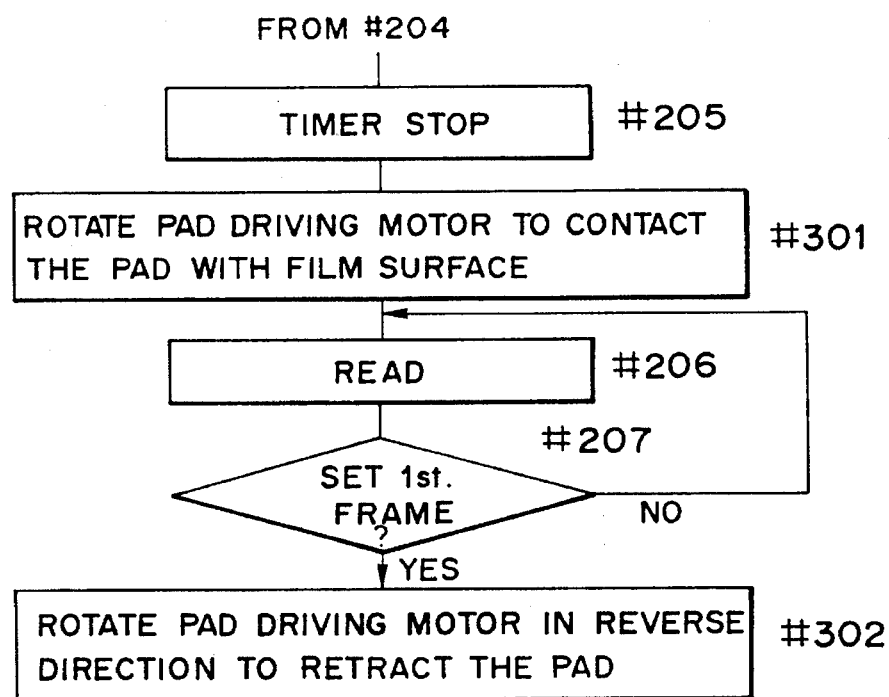
FIG. 41 is a flow chart showing the operation of a portion of the control circuit shown in FIG. 40.

FIG. 41 is a flow chart showing a portion of the operation performed by the control circuit 463 shown in FIG. 40, where portions different from those shown in FIG. 36 are mainly illustrated.

(Step 205) The counting operation performed by the timer is stopped before the flow moves to step 301.

(Step 301) The pad drive motor 510 is rotated in a normal direction by the operation of the pad drive motor control circuit 513 so that the film 427 is, as shown in FIG. 39, pushed to the magnetic head 426. Then, the flow moves to step 506.

(Step 206) Since the film driving speed has been stabilized at this time, information, for example, a predetermined number of frames of the film 427, the film sensitivity, the type of the film 427 and the like, about the film 427 recorded in the magnetic storage section of the film 427 is read by the magnetic head 426 (or information is written, if necessary). Furthermore, since the film 427 is pushed to the magnetic head 426 by the pad 504, reading (or writing) of information can correctly be performed.

(Step 207) The feed amount of the film 427 is calculated by a known means in which, according to this embodiment, the perforations (not shown) of the film 427 are counted by the photo-interrupter (not shown). As an alternative to this, the feed amount of the film 427 is calculated by measuring the time in which the film driving motor 401 has been operated. Therefore, whether or not the first frame has reached the aperture portion is discriminated. If the first frame has not reached the aperture position, the film 427 is driven until the first frame reaches there. If the fact that the first frame has reached the aperture portion is discriminated, the flow moves to step 302.

(Step 302) The pad drive motor 510 is reversely rotated by the operation of the pad drive motor control circuit 513 so as to return from the state shown in FIG. 39 to the state shown in FIG. 38. That is, the pad 504 is retracted from the surface of the film 427 before the flow moves to step 208.

Although omitted from illustration, the operation similar to that performed in step 301 is performed before step 216 shown in FIG. 37. Furthermore, the operation of step 302 is performed after step 216. In addition, the operation similar to that performed in step 301 is performed before step 222 shown in FIG. 37. Furthermore, the operation of step 302 is performed after step 322.

As a result of the structure thus-arranged, undesirable buckling or breakage of the film 427 which may take place when the film 427 passes the position of the magnetic head 426 during the winding motion of the film 427 can be prevented.

According to this embodiment, the magnetic head is operated after a predetermined time has passed (after a time, estimated that the film tip-end portion is wound around the film winding spool 7 and the film driving speed has been stabled, has passed) from the commencement of the film winding operation. However, the present invention is not limited to this. For example, a similar effect can be obtained from a structure arranged in such a manner that the magnetic head is operated after a fact that the film tip-end portion has been wound around the film winding spool 407 has been detected by, for example, a photoreflector.

Figure 42:
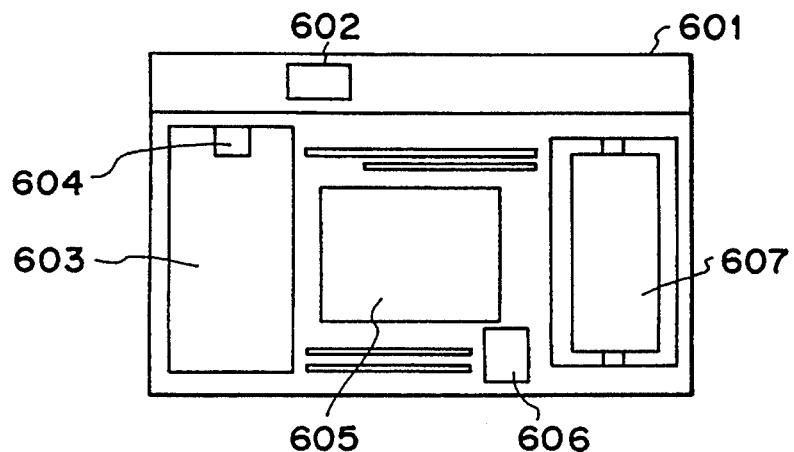
FIG. 42 is a rear view showing another embodiment of the camera according to the present invention.

FIG. 42 is rear view showing a camera according to another embodiment of the present invention when viewed after the back plate of it is removed.

According to this embodiment, a so-called pre-winding type camera in which the film is temporarily perfectly wound and the subject is photographed by rewinding it in a unit of one frame successively.

Referring to FIG. 42, reference numeral 601 denotes a camera body, 602 denotes a finder, 603 denotes a film cartridge chamber and 604 denotes a fork for driving the spool disposed in the film cartridge chamber 603. Reference numeral 605 denotes a film aperture, 606 denotes a magnetic head and 607 denotes a film winding spool which is operated when the film is wound.

Figure 43:
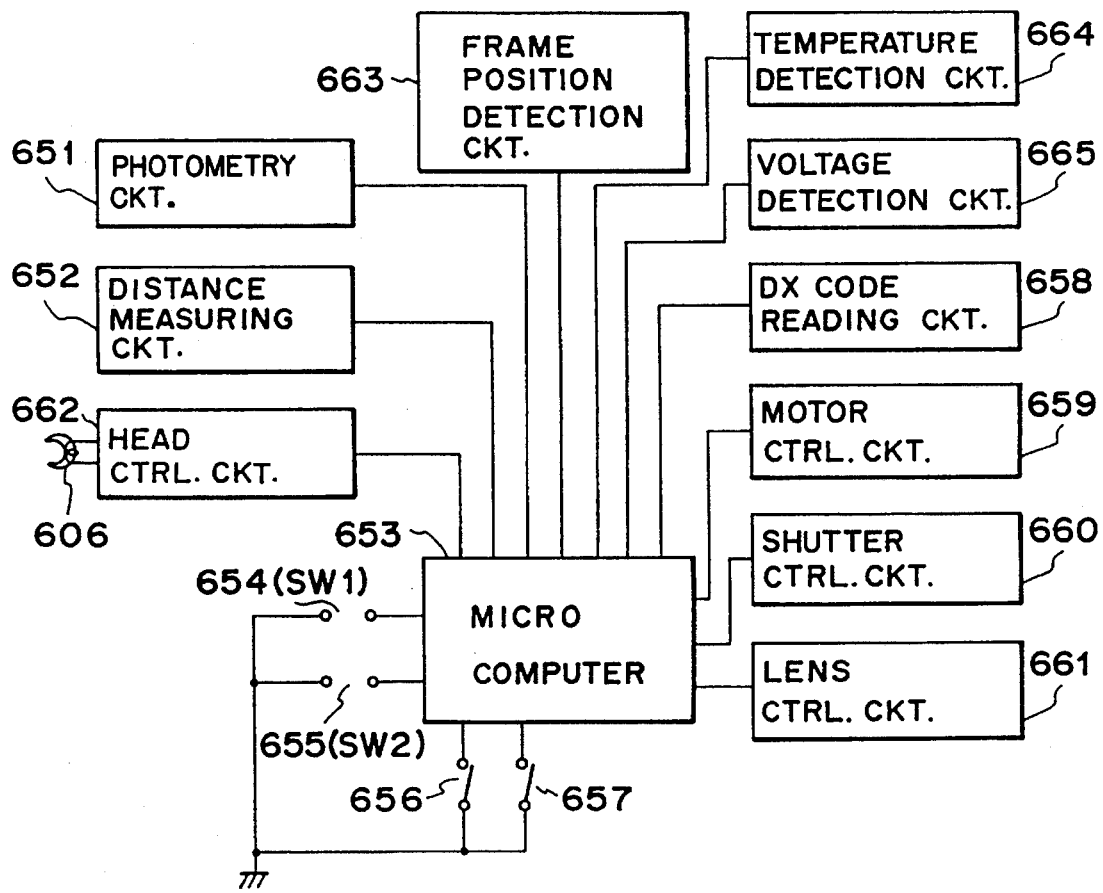
FIG. 43 is a block diagram showing the structure of the embodiment of FIG. 42.

FIG. 43 is a block diagram showing the structure of a circuit for use in the above-described camera.

Referring to FIG. 43, reference numeral 651 denotes a photometric circuit for measuring the brightness of a subject to be photographed. Reference numeral 652 denotes a distance measuring circuit for measuring the distance to the subject. Reference numeral 653 denotes a microcomputer for controlling each of the circuits and includes a timer, a ROM, a RAM and the like. Reference numeral 654 denotes a switch (hereinafter called a "SW1") which is switched on when a first stroke of the release button of a camera (not shown) is made to commence the photometry and distance-measuring operations. Reference numeral 655 denotes a switch (hereinafter called a "SW2") which is switched on when a second stroke of the release button is made to commence the releasing operation. Reference numeral 656 denotes a back cover switch of the camera (not shown) which is switched on/off in synchronization with opening/closing of the back cover. Reference numeral 657 denotes a switch for detecting a fact whether or not a film cartridge (not shown) is present. Reference numeral 658 denotes a DX code reading circuit for reading the number of films and the type of the film (for example, the manufacturer name, reversal/negative, the film sensitivity and the like from which the type of the film base and the emulsion are discriminated to predict the film drawing force and the winding force) from a DX code provided for the film cartridge. Reference numeral 659 denotes a motor control circuit for controlling a film driving motor (not shown). When the motor is rotated in a normal direction, the film is wound, while the same is rewound when the motor is rotated in a reverse direction. Reference numeral 660 denotes a shutter control circuit for controlling exposure of film to light and reference numeral 661 denotes a lens control circuit for controlling the position of the photographing lens so as to focus the subject. Reference numeral 662 denotes a head control circuit for controlling the magnetic head 606 shown in FIG. 42 so as to cause it to record/read various information items to and from the magnetic storage section formed in the film. Reference numeral 663 denotes a frame position detection circuit for detecting each frame (one frame) of the film by a method in which the perforations are detected or by a method in which the feed amount of the film is detected. Reference numeral 664 denotes a temperature detection circuit which is solely structured according to this embodiment but which may be formed to also serve as the above-described photometric circuit 651. Reference numeral 665 denotes a voltage detection circuit for detecting the battery voltage to subject it to an A/D conversion before information about the result of the conversion to the microcomputer 653. According to this embodiment, the film driving speed is predicted in accordance with the above-described information items as described above so as to properly magnetically record information to the magnetic storage section of the film. Then, this function will now be described.

Figure 44A:
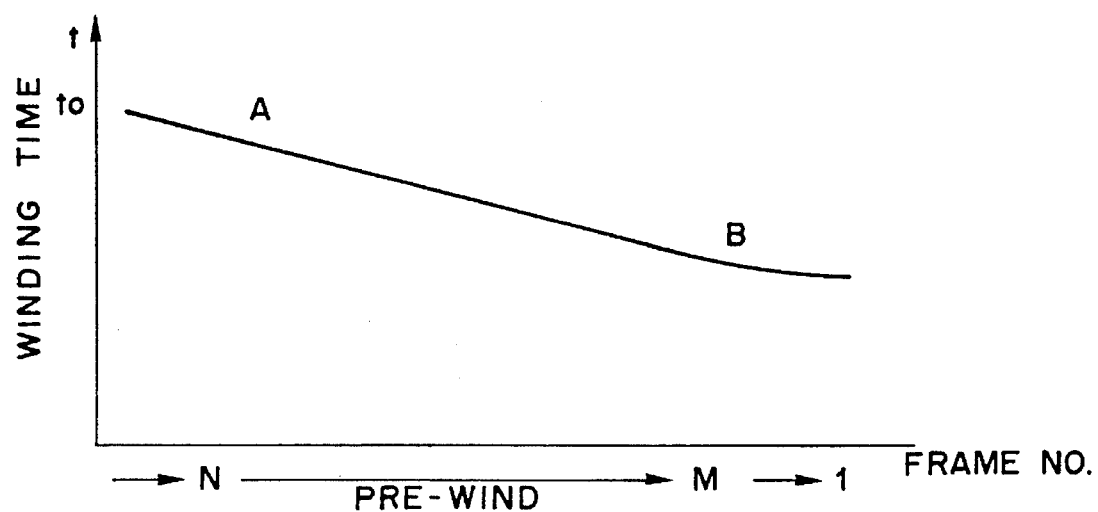
FIG. 44A is a view showing the driving speed which is changed in accordance with an apparent change in the spool at the time of winding the film.

FIG. 44A is a graph showing change in the film winding time (that is, the change in the film driving speed) at the time of the pre-winding operation.

At the time of winding the film around the film winding spool 7, the winding speed is raised because the apparent diameter of the wound film is enlarged in proportion to the quantity of the film wound around the film winding spool 7. Therefore, winding time t is shortened as shown in FIG. 44A. However, since the load is enlarged in proportion to the enlargement of the wound film diameter, the winding speed is not simply proportional to the wound film diameter ratio (portion B).

With the pre-winding method according to this embodiment, effective information can be obtained for use at the time of the film driving operation (rewinding operation) from a structure in which the winding time for all of the frames is recorded at the time of the prewinding operation. However, a correction can be performed by predicting the load change due to the number of winding motions.

Figure 44B:
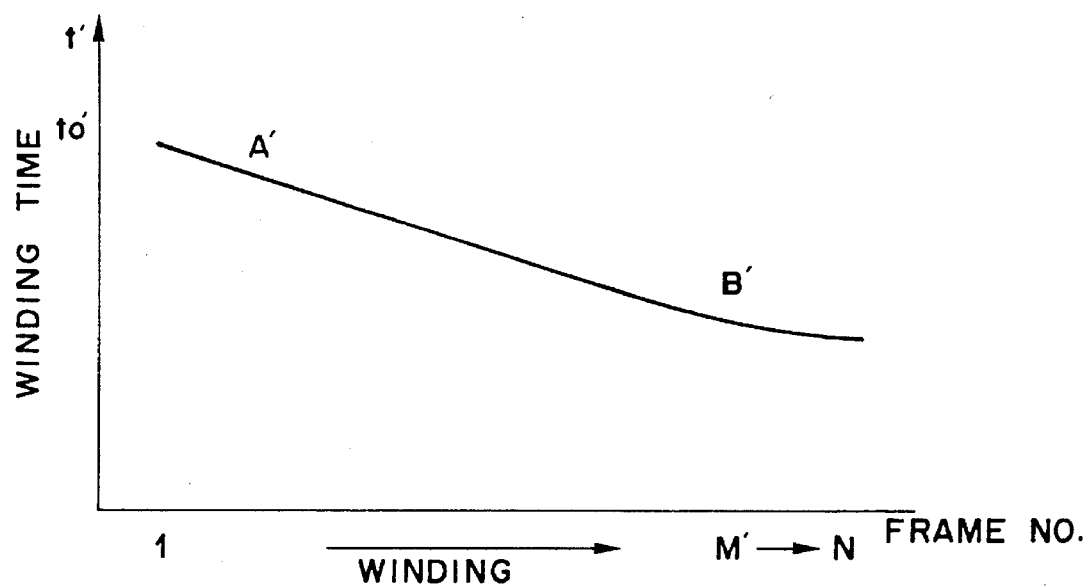
FIG. 44B is a view showing the driving speed which is changed in accordance with an apparent change in the spool at the time of rewinding the film.

FIG. 44B illustrates the results of prediction of time between photographing frames at the time of the rewinding operation, the prediction being made by using information shown in FIG. 44A.

In the rewinding direction, at first it takes a rewinding time t' per one frame because the direction is a direction in which the film is wound around the spool in the film cartridge. In proportion to an increase in the number of photographed frames (the frame number), the wound diameter is enlarged, causing rewinding time t' to be shortened. However, the load is enlarged similarly to the winding operation, and rewinding time t' is not simply shortened (portion B').

Therefore, information shown in FIG. 44A and stored at the time of the pre-winding operation can be used to make a correction. That is, the prediction shown in FIG. 44B can be made by using the ratios between the rotational speed and the diameter of the wound film and the rotational speed and the diameter of the wound film in the film cartridge. That is, the initial speed of the film around the spools is obtained and the proportion of the change in the apparent diameter due to the film thickness is obtained by using each wound film diameter so that the inclination is obtained. Finally, the portion which does not show the linear change (portion B) is corrected by using raw data shown in FIG. 44A. The inclination of the portion B can be predicted by performing a correction after the load change has been predicted from the residual quantity of the film and the quantity of the wound film.

An example of the equation for use in the above-described operation is shown below:

Referring to FIG. 44A, assumptions are made that N stands for the total number, M stands for the frame number of the portion (A→B) in which the winding time is not linearly changed, $t_0$ is the first winding time per unit length, A is the inclination between N and M and B is the inclination between M and 1. Referring to the following equations, symbol n stands for the frame which is being driven.

$$t_n = t_0 - A(N-n) \therefore (N \geq n \geq M)$$

$$t_n = t_0 - A(N-M) - B(M-n) \therefore (N \geq n \geq 1)$$

Then, assumptions are made that the diameter of the film winding spool 7 is $D_1$, the rotational speed of it under no load is $v_1$, the spool diameter of the film patrone is $D_2$ and the rotational speed of it under no load is V2. Referring to FIG. 44B, $t_0' = D_2/D_1 \times v2/v1 \times t0$ $A' = A \times D_1/D_2$ $B' = B \times D_1/D_2$ Therefore, the following prediction can be made:

$$t_n' = t_0' - A'(n-1) \therefore (N = \geq n \geq 1)$$

$$t_n' = t_0' - A'(M-1) - B'(n\%31\ M) \therefore (N \geq n \geq 1)$$

It might be feasible for the above-described approximate expression to increase the correction terms by considering the state of the type of the film, the temperature and the voltage of the power source (the voltage change due to the temperature change). Since information can be properly recorded by using the increased terms, these terms are taken into consideration as follows according to this embodiment.

Figure 45B:
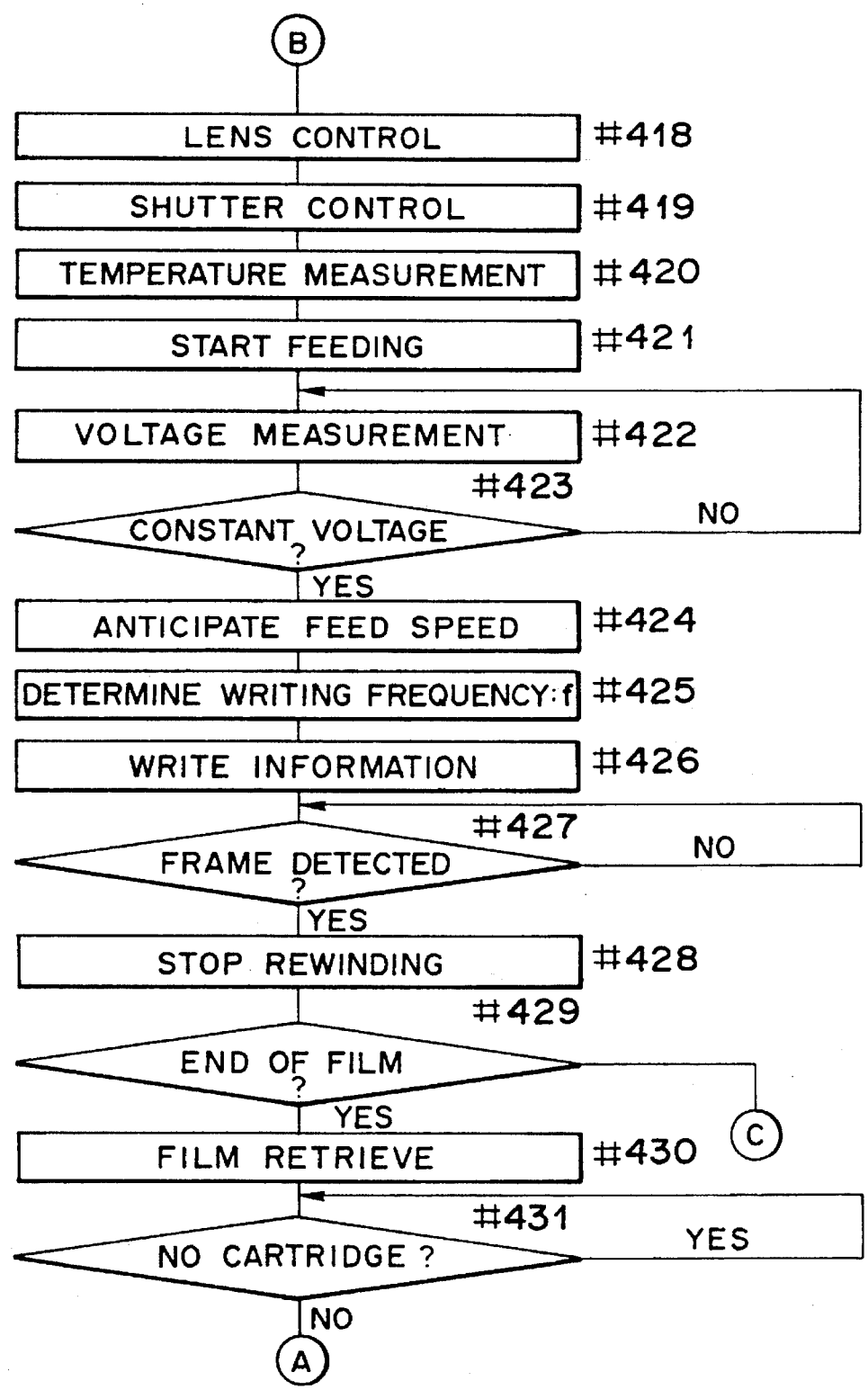

FIGS. 45A and 45B are flow charts which illustrate the operation of the microcomputer 653 shown in FIG. 43 and having a function of performing the above-described prediction calculation.

(Step 401) Whether or not the back cover is closed is discriminated from the status of the back cover switch 656. If the same is not closed, the operation in step 401 is repeated. If the same is closed, the flow moves to step 402.

(Step 402) Whether or not the film patrone has been loaded in the film patrone chamber 603 is discriminated from the status of the switches 605 and 607. If the film cartridge has not been loaded, the flow returns to step 401. If the same has been loaded, the flow moves to step 403.

(Step 403) The film driving motor (not shown) is rotated in a normal direction by operating the motor control circuit 659. As a result, the continuous winding of the film is operated.

(Step 404) The DX code reading circuit 658 is operated so as to read out the number of the films (the total number of the films) and the type of the film from the DX code provided for the film cartridge. It might be considered feasible to employ a method in which the same is read out from the film by the magnetic head 606. However, according to this embodiment, the above-described method in which the same is read by the DX code formed on the surface of the film cartridge is employed.

(Step 405) The number of the films (the total number of the films) read in step 404 is set.

(Step 406) The type of the film (the manufacturer name, reversal/negative and the film sensitivity) read in step 404 is set.

(Step 407) It is discriminated whether or not one frame has been detected by the frame position detection circuit 663 for detecting the position of the frame in accordance with the perforations or the like. If the same has not been detected, the operation in step 407 is repeated. If the same has been detected, the flow moves to step 408.

(Step 408) The winding time taken to wind one frame from the time at which the frame is positioned and which has been detected in step 407 is read from the included timer so as to be stored in the RAM in the microcomputer 653.

(Step 409) In order to recognize the frame to which the above-described winding time information corresponds, the frame number corresponding to the information item also is stored in the RAM.

According to this embodiment, a pre-winding type camera is used as described above. However, the present invention is also effective when adapted to other types of camera (hereinafter called a "normal" winding method) as described later. In this case, only data at the time of the idle driving of the film is stored as the winding time corresponding to a frame unit so as to be used to predict the speed of driving each frame after the photographing operation.

(Step 410) The temperature in the camera is measured by operating the temperature detection circuit 664 so as to supply and cause information about the temperature thus measured to be stored in the RAM.

(Step 411) The voltage detection circuit 665 is operated to measure the voltage of the power source so as to supply and cause information about the voltage of the power source to be stored in the RAM.

(Step 412) A discrimination is made whether or not the pre-winding has been performed up to the film number set in step 405. If the same has not been completed, the flow returns to step 407. If the pre-winding operation has been completed, the flow moves to step 413.

(Step 413) A state of waiting for the operation of the switch SW1 is realized. When the switch SW1 is switched on, the flow moves to step 414.

(Step 414) The photometric circuit 651 is operated so as to supply information about the brightness of the subject obtained by the photometric circuit 651.

(Step 415) The distance measuring circuit 652 is operated so as to supply information about the distance to the subject obtained by the distance measuring circuit 652.

(Step 416) The status of the switch SW2 is discriminated. If the same has been switched on, the flow moves to step 418 shown in FIG. 45B. If the switch SW2 is not operated, the flow moves to step 417.

(Step 417) The status of the switch SW1 is again discriminated. If the same is switched on, the flow returns to step 416. If the same is switched off, the flow returns to step 413.

(Step 418) The lens control circuit 661 is controlled in accordance with information (measured distance information) about the distance to the subject obtained in step 415 so as to perform focusing of the photographing lens.

(Step 419) The shutter control circuit 660 is controlled in accordance with information (photometric information) about the brightness of the subject obtained in step 614 so as to perform an operation of exposing the film surface to light.

(Step 420) In order to detect the temperature in the camera at this point, the temperature detection circuit 664 is operated so as to obtain information about the temperature.

(Step 421) The film driving motor is reversely rotated by operating the motor control circuit 659 so as to commence the one-frame rewinding operation.

(Step 422) In order to detect the status of the voltage of the power source at this point, the voltage detection circuit 665 is operated so that the voltage of the power source is measured. Then, obtained information about the voltage of the power source is supplied.

(Step 423) A determination is made whether or not the voltage of the power source measured in the above-described step has become substantially constant (stabilized). If the same is not constant, the flow returns to step 422 in which the voltage of the power source is again measured. If a determination is made that the voltage of the power source has become constant and the driving speed has been stabilized, the flow moves to step 424.

(Step 424) The photographed frame driving speed is predicted by a calculation while taking into consideration the winding time between frames performed in step 408 for the purpose of detecting the inclination shown in the above-described prediction equation and the first winding time, the frame number detected in step 409, the film number detected in step 405, the type of the film detected in step 406, the temperature detected in step 410, the voltage of the power source detected in step 411 and the temperature detected in step 420.

(Step 425) Writing frequency f used to record information to the magnetic storage section is discriminated in accordance with the result obtained in step 424.

(Step 426) The magnetic head 606 is actually operated by operating the head control circuit 662 so as to write the above-described various photographing information items on the magnetic storage section of the film which is being driven at a stable speed.

(Step 427) A discrimination is made whether or not the frame position has been detected by the frame position detection circuit 663. If it has been detected, the flow moves to step 428.

(Step 428) The operation of the film driving motor is inhibited by the operation of the motor control circuit 659 so as to stop the one-frame rewinding of the film.

(Step 429) A discrimination is made as to whether or not all of the frames have been subjected to photographing in accordance with the present frame number and the film number detected in step 405. If it has not been completed, the flow returns to step 413 from which point the similar operations are repeated. If it has been completed, the flow moves to step 430.

(Step 430) The film driving motor is reversely rotated by operating the motor control circuit 659 so as to wind the overall film into the film patrone.

(Step 431) A discrimination is made whether or not the film patrone is present in the film cartridge chamber 603 in accordance with the status of the switch 657. If it is not present, the flow returns to step 401 shown in FIG. 45A.

Figure 46:
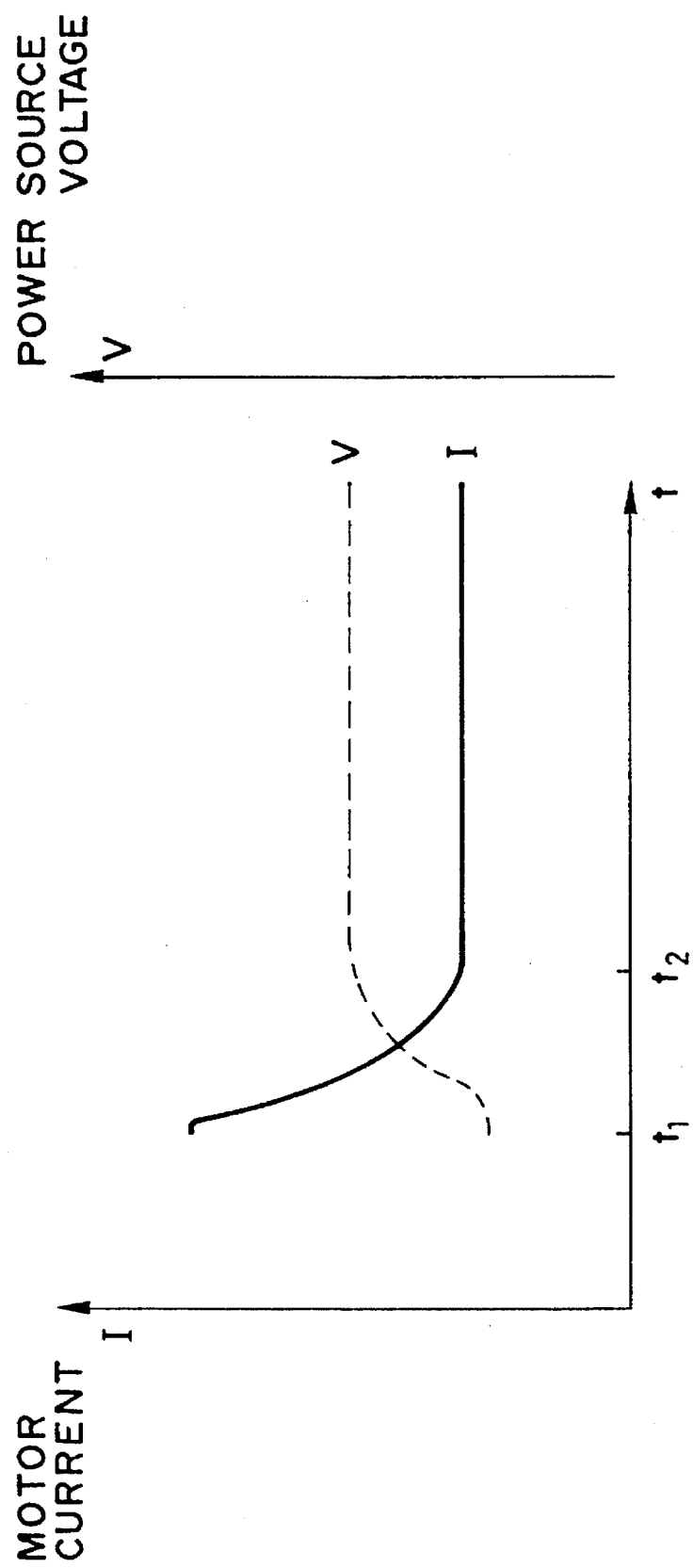
FIG. 46 is a view further showing the operation performed in step 23 shown in FIG. 45B.

FIG. 46 illustrates the reason for the necessity of making the discrimination shown in step 423.

Time $t_1$ to $t_2$ is a period of the first transition of the film driving motor. In this period, a large electric current is supplied to the motor and thereby the voltage of the power source is made to be excessively lowered. Therefore, the film driving speed is unstable and very low. Therefore, the above-described period is not suitable for performing information writing. As a result, since the information must be written from time $t_2$, the discrimination flow shown in step 423 is performed in order to realize it.

Figure 47:
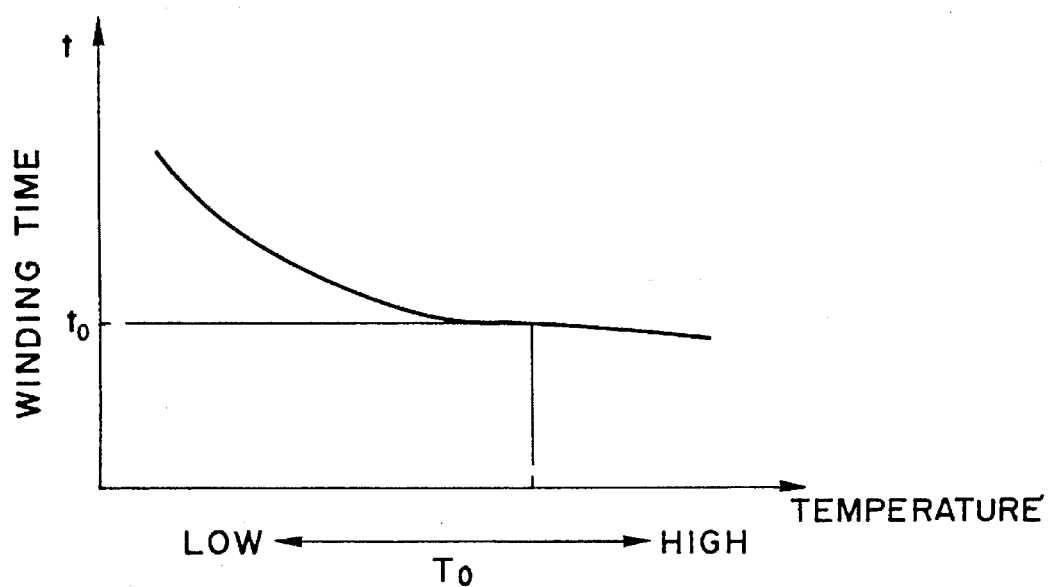
FIG. 47 is a view showing a relation between the temperature change and the winding time.

FIG. 47 illustrates an example of change in winding time t due to the temperature change.

In proportion to the rise in the temperature, the winding speed will be raised due to the reduction in the film winding load, reduction in the friction of the gear train, the improvement in the efficiency of the power source battery and the like. On the contrary, the winding speed will be lowered when the temperature is lowered. Therefore, the driving speed obtained under the other conditions is predicted by using a ratio obtained while making the speed at the room temperature to be 1.

Figure 48:
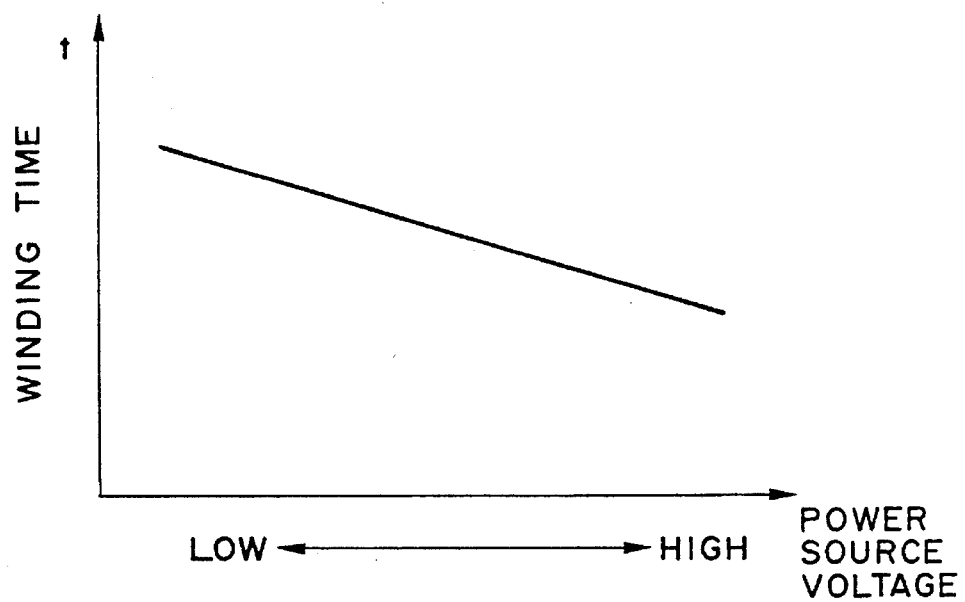
FIG. 48 is a view showing a relation between the power source voltage status and the winding time.

FIG. 48 illustrates the change in winding time t due to the change in the voltage of the power source.

As is known, the rotation of the film driving motor is in proportion to the voltage of the power source, while winding time t is in inverse proportion to the same. In step 424, a correction is made while taking the above-described fact into consideration. Furthermore, the correction is made while further taking into consideration that the power source is restored in an ordinary one-frame photographing though the voltage level is lowered in accordance with the winding operation because the power source is continuously consumed in the pre-winding type camera according to this embodiment.

Figure 49:
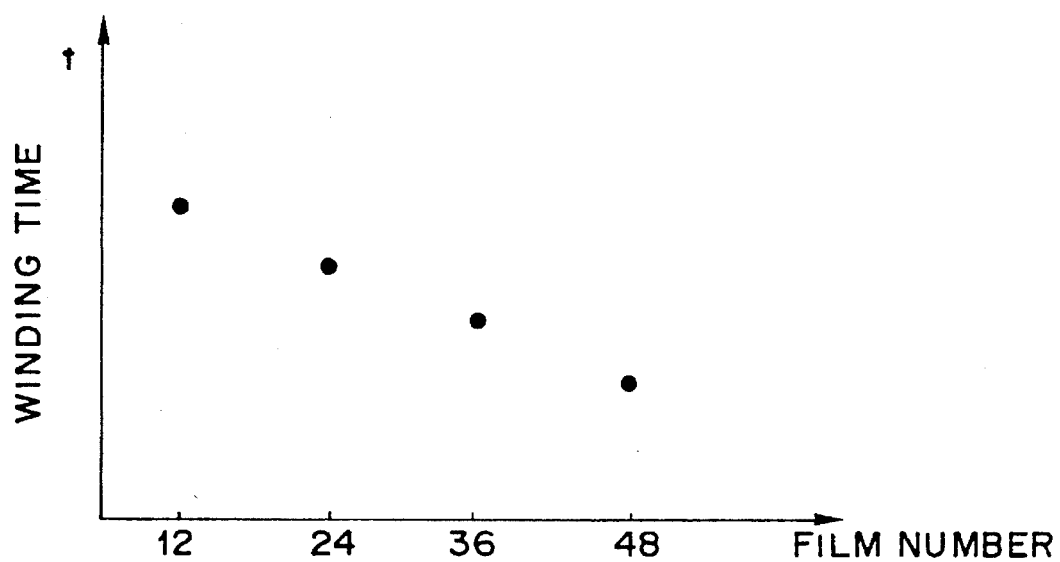
FIG. 49 is a view showing a relation between the number of various films and the average winding time.

FIG. 49 illustrates, in a plotted manner, the differences in the average winding time depending upon the number of the films (the total number).

In a case where all of information items are stored at the time of the pre-winding operation as shown in FIG. 44A, the degree of the affection can be reduced. However, in a case where no information is stored at the time of the prewinding operation or in a case where the camera is a normal winding type camera, the load is enlarged in proportion to the feed amount of film. In addition, a drawing force is enlarged in a case where the film patrone space is filled with the film. Therefore, by using the number of the films as a correction term in step 24, the driving speed can be further correctly predicted. In a case where the spool diameter in the film patrone is changed depending upon the film number, for example, 12 frames or 24 frames, the above-described information is critical information for use to predict the driving speed.

According to this embodiment, the load change generated due to the feed amount of the film and the residual quantity are used as a correction term. Since the above-described relation is discriminated depending upon the total number of the films, the number of the films is an important information item.

Figure 50:
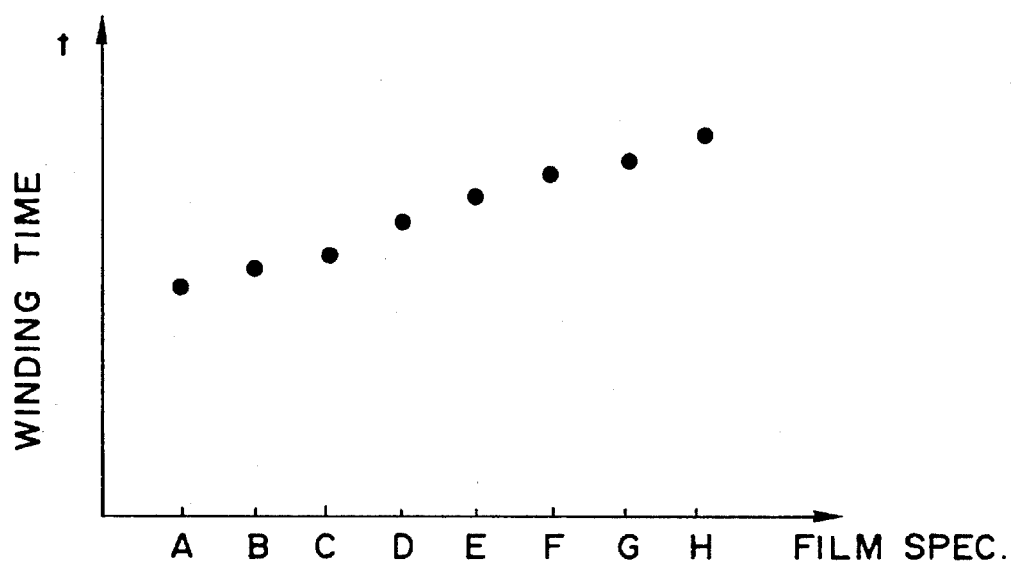
FIG. 50 is a view showing a relation between the type of the film and the winding time.

FIG. 50 illustrates, a plotted manner, the differences in average winding time t when the films are classified into A to through H depending upon the type of the film, for example, the manufacturer, the reversal/negative, the film sensitivity and the like.

By giving information about the average types of the films to the camera, the driving speed can be predicted to adapt to a variety of film types. In step 424, information about the type of the film is used while taking into consideration the above-described fact.

Furthermore, a fact that the change due to the temperature can be varied by the above-described type of the film can be corrected. That is, an adaptation to the correction except for the change in the apparent diameter of the spool can be made.

Figure 51:
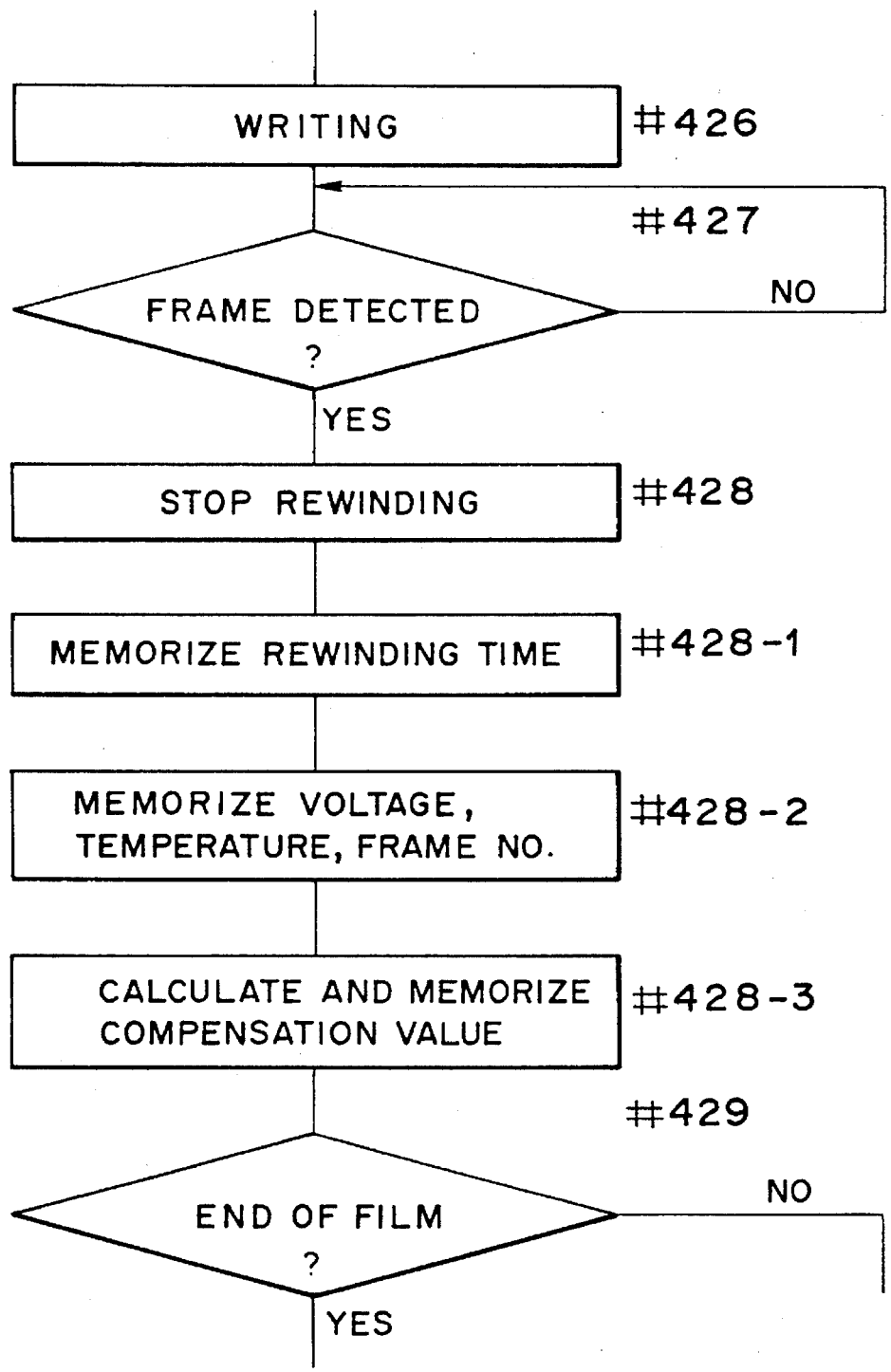
FIG. 51 is a flow chart showing the operation of a portion according to a partial modified example.

FIG. 51 is a flow chart showing the operation of a portion of a partial modification to this embodiment. According to this modification, the actual time taken to drive the film, the temperature, the voltage of the power source and the frame number with respect to the predicted driving time are stored so as to correct the time to drive the next photographing frame (the driving speed). The process between step 428 and step 429 shown in FIG. 55B is partially modified. The same step numbers as those shown in FIG. 55B are steps in which the same operations are performed and therefore their descriptions are omitted here.

After rewinding of the film has been stopped in step 428, the flow moves to step 428-1 in which actual time to take to rewind the film is stored. In next step 428-2, the voltage of the power source, the temperature and the frame number at this time are stored. In step 428-3, an analysis is made about the difference between the driving time predicted in step 424 and the driving time stored in step 428-1 so as to obtain and store the corrected value of the driving speed predicted in step 424 for the next photographing frame while taking into consideration information stored in step 428-2.

Figure 52:
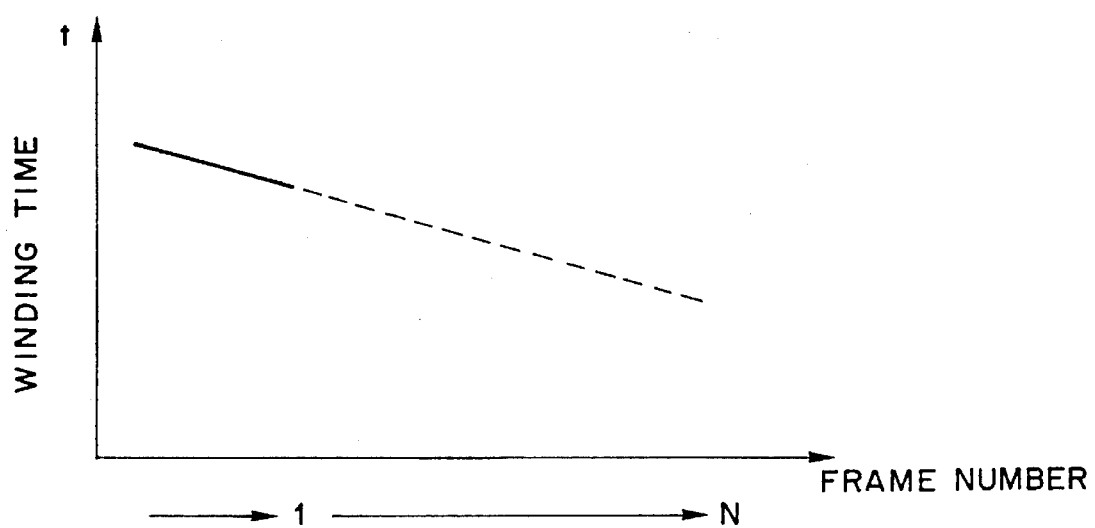
FIG. 52 is a view showing the driving speed which is changed in accordance with the apparent change in the spool at the time of winding the film according to another modified example.
Figure 53:
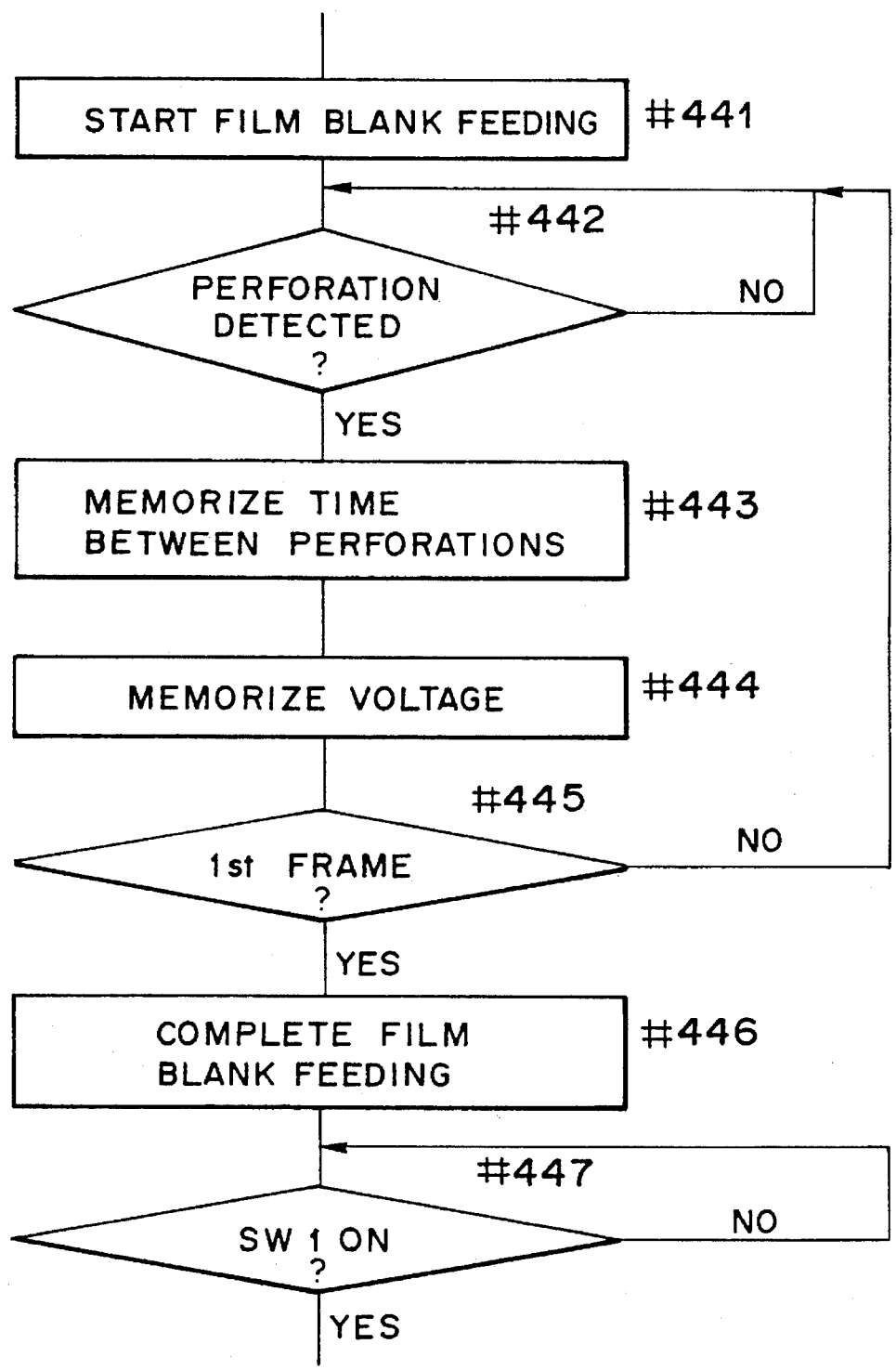
FIG. 53 is a flow chart showing a portion of the operation of the above embodiment.

FIGS. 52 and 53 illustrate another modification to the above-described embodiment. According to this modification, a camera of a no-pre-winding type is used as an alternative to the above-described pre-winding type camera, the camera of the no-pre-winding type is arranged in such a manner that the film is wound at the ordinary photography operation.

According to this type of camera, the winding time between frames at the time of the idle driving of the film shown in FIG. 52 is used to predict the winding time (the driving speed) of the subject photographed frame due to the apparent change in the diameter of the film winding spool 607, the predicted winding time being used when the film winding is performed. At this time, the correction for the latter portion (portion B' shown in FIG. 44B) is performed in accordance with information about the number of the films, the type of the film and the like.

FIG. 53 is a flow chart relating to the receipt of various information items shown in FIG. 52.

In step 441, the film idle driving operation is commenced before the frame position is detected by detecting the perforations in next step 442 so as to discriminate the frame position. Then, the flow moves to step 443 in which the winding time between the perforations (between frames) is stored. Simultaneously, the voltage of the power source is stored in step 444. In next step 445, whether or not the film idle-driving to the first frame of the film has been completed is discriminated. If it has not been completed, the flow returns to step 442. If it has been completed, a discrimination is made that the first frame has been driven so that the flow moves to step 446. Then, the film idle-driving is completed before the flow moves to step 447 which waits for the SW1 to be switched.

Figure 54:
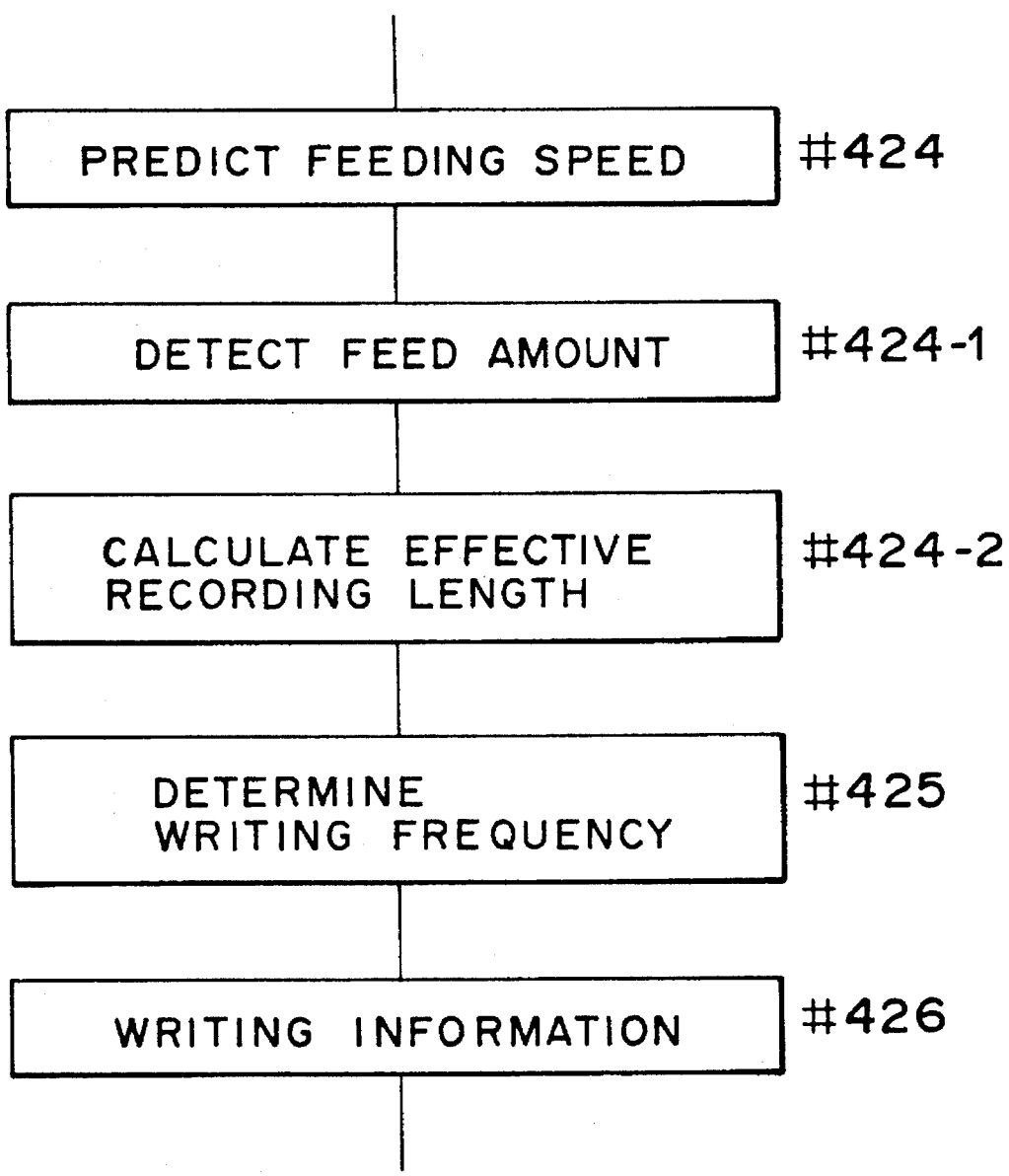
FIG. 54 is a flow chart showing a portion of another modified example of the embodiment shown in FIG. 42.

FIG. 54 illustrates another modification to the above-described embodiment in which the process between step 424 and step 425 shown in FIG. 45B is changed. Therefore, the description is made about only the changed portion.

In step 424-1, the feed amount of the film required to make the discrimination that the voltage of the power source has been stabilized in step 423, that is, the feed amount required to stabilize the film driving speed is detected. In next step 424-2, residual effective recording range of the photographing frames is calculated. In step 425, writing frequency f is discriminated in accordance with the predicted driving speed and the above-described effective recording range. Then, in step 426, information is actually written in accordance with writing frequency f.

According to this embodiment, in order to properly perform information writing during the driving of the film after the photographing operation, the voltage of the power source is measured and information writing is allowed when the voltage has been stabilized in accordance with a discrimination made that the film driving speed has been stabilized. However, the present invention is not so limited this. Another arrangement may be employed in which the value of the electric current is measured and information writing is allowed when the electric current value has been stabilized.

In addition, although this embodiment concerns a camera which uses a push-out type film cartridge, the present invention can be applied to cameras which uses other types of film cartridges.

As described above, in this embodiment, the feed speed of the film provided with the magnetic storage section is high, and data is written in or read from the magnetic storage section provided on the film after the feed speed becomes stable in a camera in which the data is written or read during feeding of the film. The embodiment thus enables data to be correctly written in or read from the magnetic storage section and is thus very effective for this sort of camera.

What is claimed is:

1. A camera using a film provided with a magnetic storage section, said camera comprising:
   (A) feed means for feeding the film;
   (B) working means for performing at least one of (i) writing data to the magnetic storage section of the film, and (ii) reading data from the magnetic storage section of the film, during feeding of the film by said feed means; and
   (C) control means for enabling said working means to operate after a feed speed of the film has stabilized, said control means comprising decision means for deciding that the feed speed of the film has stabilized based on a change of the feed speed of the film, said decision means deciding that the feed speed has stabilized when a large shift in the feed speed is detected.

2. A camera according to claim 1, wherein said decision means comprises means for following a movement of the film.

3. A camera using a film provided with a magnetic storage section, said camera comprising:
   (A) feed means for feeding the film;
   (B) working means for performing at least one of (i) writing data to the magnetic storage section of the film, and (ii) reading data from the magnetic storage section of the film, during feeding of the film by said feed means; and
   (C) control means for enabling said working means to operate after a feed speed of the film has stabilized, said control means comprising decision means comprising a timer, said decision means deciding that the feed speed has stabilized when said timer counts a predetermined time period from a beginning of the film feed by said feed means.

4. A camera using a film provided with a magnetic storage section, said camera comprising:
   (A) feed means for feeding the film;
   (B) working means for performing at least one of (i) writing data to the magnetic storage section of the film, and (ii) reading data from the magnetic storage section of the film, during feeding of the film by said feed means; and
   (C) control means for enabling said working means to operate after a feed speed of the film has stabilized, said control means comprising decision means for deciding that the feed speed of the film has stabilized based on a fact that the film has been wound around a winding spool.

5. A camera according to claim 4, wherein said working means comprises a magnetic head.

6. A camera using a film provided with a magnetic storage section, said camera comprising:
   (A) feed means for feeding the film, said feed means comprising means for pushing out the film from a cartridge;
   (B) working means for performing at least one of (i) writing data to the magnetic storage section of the film, and (ii) reading data from the magnetic storage section of the film, during feeding of the film by said feed means; and
   (C) control means for enabling said working means to operate after a feed speed of the film has stabilized.

7. A camera according to claim 1, wherein said feed means comprises a motor.

8. A camera according to claim 1, wherein said working means comprises a magnetic head.

9. A camera according to claim 6, wherein the control means comprises means for deciding by voltage that the feed speed of said film has been stabilized.

10. A camera according to claim 6, wherein said control means comprises means for deciding by current that the feed speed of the film has been stabilized.

11. A camera according to claim 6, wherein said control means comprises decision means for deciding that the feed speed has stabilized when a large shift in the feed speed is detected.

12. A camera according to claim 11, wherein said working means comprises a magnetic head.

13. A camera according to claim 6, wherein said control means comprises decision means comprising a timer, said decision means deciding that the feed speed has stabilized when said timer counts a predetermined time period from a beginning of the film feed by said feed means.

14. A camera according to claim 13, wherein said working means comprises a magnetic head.

15. A camera according to claim 6, wherein said control means comprises means for initiating a control operation during an auto-leading operation of the film performed by said feed means.

16. A camera according to claim 6, wherein said control means comprises means for initiating a control operation during a one-frame winding operation of the film performed by said feed means.

17. A camera according to claim 6, wherein said control means comprises means for initiating a control operation during film rewinding by said feed means.

18. A camera using a film provided with a magnetic storage section, said camera comprising:
   (A) feed means for feeding the film, said feed means comprising means for performing a pre-winding operation;
   (B) working means for performing at least one of (i) writing data to the magnetic storage section of the film, and (ii) reading data from the magnetic storage section of the film, during feeding of the film by said feed means; and
   (C) control means for enabling said working means to operate after a feed speed of the film has stabilized.

19. A camera according to claim 18, wherein said control means comprises means for performing a control operation during a one-frame rewinding operation of the film performed by said feed means.

20. A control device for a camera using a film provided with a magnetic storage section, said control device comprising:
   (A) feed means for feeding the film;

(B) working means for performing at least one of (i) writing data to the magnetic storage section of the film, and (ii) reading data from the magnetic storage section of the film, during feeding of the film by said feed means; and (C) control means for enabling said working means to operate after a feed speed of the film has stabilized, said control means comprising decision means for deciding that the feed speed of the film has stabilized based on a change in the feed speed of the film, said decision means deciding that the feed speed has stabilized when a large shift in the feed speed is detected.

21. A control device according to claim 20, wherein said decision means comprises means for following a movement of the film.

22. A control device according to claim 20, wherein said feed means comprises a motor.

23. A control device according to claim 20, wherein said working means comprises a magnetic head.

24. A control device for a camera using a film provided with a magnetic storage section, said control device comprising:

(A) feed means for feeding the film;

(B) working means for performing at least one of (i) writing data to the magnetic storage section of the film, and (ii) reading data from the magnetic storage section of the film, during feeding of the film by said feed means; and (C) control means for enabling said working means to operate after a feed speed of the film has stabilized, said control means comprising decision means for deciding that the feed speed of the film has stabilized based on a fact that the film has been wound around a winding spool.

25. A control device for a camera using a film provided with a magnetic storage section, said control device comprising:

(A) feed means for feeding the film, said feed means comprising means for pushing out the film from a cartridge;

(B) working means for performing at least one of (i) writing data to the magnetic storage section of the film, and (ii) reading data from the magnetic storage section of the film, during feeding of the film by said feed means; and (C) control means for enabling said working means to operate after a feed speed of the film has stabilized.

26. A control device according to claim 25, wherein said control means comprises means for deciding by voltage that the feed speed of the film has been stabilized.

27. A control device according to claim 25, wherein said control means comprises means for deciding by current that the feed speed of the film has been stabilized.

28. A control device according to claim 25, wherein said control means comprises means for initiating a control operation during an auto-loading operation of the film performed by said feed means.

29. A control device according to claim 25, wherein said control means comprises means for initiating a control operation during a one-frame winding operation of the film performed by said feed means.

30. A control device according to claim 25, wherein said control means comprises means for initiating a control operation during a rewinding operation of the film performed by said feed means.

31. A control device for a camera using a film provided with a magnetic storage section, said control device comprising:

(A) feed means for feeding the film, said feed means comprising means for performing a prewinding operation (B) working means for performing at least one of (i) writing data to the magnetic storage section of the film, and (ii) reading data from the magnetic storage section of the film, during feeding of the film by said feed means; and (C) control means for enabling said working means to operate after a feed speed of the film has stabilized.

32. A control device according to claim 31, wherein said control means comprises means for performing a control operation during a one-frame rewinding operation of the film performed by said feed means.

33. A camera using a film provided with a magnetic storage section, said camera comprising:

(A) feed means for feeding the film;

(B) working means for performing at least one of (i) writing data to the magnetic storage section of the film, and (ii) reading data from the magnetic storage section of the film, during feeding of the film by said feed means; and (c) control means for detecting at least one of (i) a film feeding speed, and (ii) a film feeding acceleration, said control means enabling said working means to operate when the detected at least one of film feeding speed and film feeding acceleration varies by an amount larger than a predetermined level.

* * * * *

UNITED STATES PATENT AND TRADEMARK OFFICE
CERTIFICATE OF CORRECTION

PATENT NO. : 5,481,323          Page 1 of 5
DATED : January 2, 1996
INVENTOR(S) : Akira EGAWA, et al.

It is certified that error appears in the above-indentified patent and that said Letters Patent is hereby corrected as shown below:

ITEM [57] - ABSTRACT:

Line 5, "controlling," should read --controlling--.

SHEET 3 - FIGURE 2B:

"MEMBERER" should read --MEMBER--.

SHEET 5 - FIGURE 6:

"MEMBERER" should read --MEMBER--.

COLUMN 2:

Line 9, "disclose 8" should read --discloses--;
　　Line 35, "feed" should read --feed operation--;
　　Line 51, "Speeds" should read --speeds--;
　　Line 53, "same" should be deleted; and,
　　Line 55, "respectively;" should read --respectively--.

COLUMN 6:

Line 52, "accompany" should read --to accompany--; and,
　　Line 57, "Of" should read --of--.

COLUMN 7:

Line 19, "comprisnig" should read --comprising--.

UNITED STATES PATENT AND TRADEMARK OFFICE
CERTIFICATE OF CORRECTION

PATENT NO. : 5,481,323
DATED : January 2, 1996
INVENTOR(S) : Akira Egawa, et al.

It is certified that error appears in the above-indentified patent and that said Letters Patent is hereby corrected as shown below:

COLUMN 8

Line 58, "section 21," should read --gear 21,--; and,
    Line 59, "22 and 29" should read --gear 22 and ratchet claw member 29--.

COLUMN 10:

Line 60, "using-the" should read --using the--.

COLUMN 12:

Line 21, "of predetermined" should read --of winding of the film 34. If it is decided that the predetermined--;
    Line 22, "winding of the film 34" should be deleted;
    Line 23, If it is decided that the" should be deleted; and,
    Line 35, "starred," should read --started--.

COLUMN 13:

Line 14, "a waited" should read --awaited.--; and,
    Line 32, "Step: 22." should read --Step 22.--.

COLUMN 16:

Line 30, "FIGS. 33" should read --FIG. 33--.
Column 19, line 47, "downwards" should be deleted; and,
    line 54, "slidably" should read --slidable--.

UNITED STATES PATENT AND TRADEMARK OFFICE
CERTIFICATE OF CORRECTION

PATENT NO. : 5,481,323　　　　Page 3 of 5
DATED : January 2, 1996
INVENTOR(S) : Akira EGAWA, et al.

It is certified that error appears in the above-indentified patent and that said Letters Patent is hereby corrected as shown below:

COLUMN 20:

Line 3, "push as" should read --pushes--.

COLUMN 21:

Line 46, "same has" should be deleted; and,
Line 47, "not become predetermined time T1, has elapsed" should read --predetermined time T1 has elapsed,--.

COLUMN 22:

Line 38, "over-" should read --to over---; and
Line 39, "comer" should read --come--.

COLUMN 24:

Line 15, "downwards moved" should read --moved downwards--.

COLUMN 26:

Line 10, "stabled," should read --stabilized,--.

COLUMN 28:

Line 18, ""V2." should read --$v_2$.--;
Line 20, "v2/v1xt0" should read --$v_2/v_1 x t_0$--; and,
Line 27, "(n%31M)" should read --(n-M)--.

UNITED STATES PATENT AND TRADEMARK OFFICE
CERTIFICATE OF CORRECTION

PATENT NO. : 5,481,323
DATED : January 2, 1996
INVENTOR(S) : Akira EGAWA, et al.

It is certified that error appears in the above-indentified patent and that said Letters Patent is hereby corrected as shown below:

COLUMN 30:

Line 25, "frequency f" should read --frequency f,--; and
    Line 26, "section" should read --section,--.

COLUMN 31:

Line 28, "affection" should read --effect--; and
    Line 49, "to" should be deleted.

COLUMN 33:

Line 1, "so limited" should read --limited to--.

COLUMN 34:

Line 38, "auto-leading" should read --auto-loading--.

UNITED STATES PATENT AND TRADEMARK OFFICE
CERTIFICATE OF CORRECTION

PATENT NO. : 5,481,323
DATED : January 2, 1996
INVENTOR(S) : Akira Egawa, et al.

It is certified that error appears in the above-indentified patent and that said Letters Patent is hereby corrected as shown below:

Column 36, line 22, "tion" should read --tion;--.

Signed and Sealed this

Ninth Day of July, 1996

Attest:

BRUCE LEHMAN

Attesting Officer

Commissioner of Patents and Trademarks